United States Patent [19]

Morris et al.

[11] 3,805,251

[45] Apr. 16, 1974

[54] DATA PROCESSING APPARATUS FOR A PRINTING SYSTEM

[75] Inventors: Floyd D. Morris, Pennsauken; Barry S. Rich, Cherry Hill, both of N.J.

[73] Assignee: Ultronic Systems Corp., Morrestown, N.J.

[22] Filed: July 21, 1972

[21] Appl. No.: 274,107

[52] U.S. Cl. .................................. 340/172.5, 101/93
[51] Int. Cl. .................................................. G06f 3/14
[58] Field of Search ..................... 340/172.5; 101/93

[56] References Cited

UNITED STATES PATENTS

| | | | |
|---|---|---|---|
| 3,648,245 | 3/1972 | Dodds et al. | 340/172.5 |
| 3,648,251 | 3/1972 | Serracchioli | 340/172.5 |
| 3,525,079 | 8/1970 | Cuccio | 340/172.5 |
| 3,596,254 | 7/1971 | Highleyman et al. | 340/172.5 |
| 3,611,301 | 10/1971 | Parks | 340/172.5 |
| 3,573,740 | 4/1971 | Berger et al. | 340/172.5 |
| 3,656,427 | 4/1972 | Foley | 340/172.5 X |
| 3,377,622 | 4/1968 | Burch et al. | 340/172.5 |

*Primary Examiner*—Paul J. Henon
*Assistant Examiner*—Mark Nusbaum
*Attorney, Agent, or Firm*—Peter Xiarhos; Elmer J. Nealon; Norman J. O'Malley

[57] ABSTRACT

Data processing printout system for providing hard copy of information originating from a computer or from video display terminals. The data processing printout system includes a printer controller having a memory storage unit for storing messages originating from the computer or from the video display terminals. Messages stored in the memory storage unit are continuously extracted therefrom and applied to printers connected to the printer controller for providing the desired hard copy. There are no special allocated or assigned spaces in the memory storage unit for messages originating from the computer or from the video display terminals. It is possible for several messages to be stored in the memory storage unit at any given time to be printed out by a single printer. In this case, the messages are printed out by the printer in the same sequence in which the messages were entered and stored in the memory storage unit, that is, in chronological sequence, even though the messages may not be stored in contiguous areas of the memory storage unit and may possibly be interspersed with messages intended for other printers.

Each of the video display terminals is assigned to a particular one of the printers for providing the hard copy of messages originating from the video display terminal. The computer may cause messages to be printed by any one of the printers. The printers may be of different types, for example, of the thermal or impact type and of the character or line printer type.

8 Claims, 33 Drawing Figures

PATENTED APR 16 1974 3,805,251

SHEET 06 OF 13

CASE I — REF LC BIT ONLY (MQC=MQR)

CASE II — TWO LC BITS IN A QUADRANT (MQC=MQR)

CASE III — LC BITS IN DIFFERENT QUADRANTS (MQC≠MQR)

CASE IV — TWO LC BITS IN A QUADRANT (REVERSED)

CASE I

CASE II

CASE III

CASE IV

CASE V

CASE VI

PATENTED APR 16 1974

3,805,251

SHEET 13 OF 13

DATA PROCESSING APPARATUS FOR A PRINTING SYSTEM

BACKGROUND OF THE INVENTION

The present invention relates to a data processing printout system, and, more particularly, to a data processing printout system including a printer controller for providing printer hard copy of information originating from a computer or from video display terminals.

Various data processing printout systems for achieving printer hard copy of information originating from a computer or from video display terminals are known to those skilled in the art. In one well-known data processing printout system, information originating from a computer or from a video display terminal is processed into a message form by a display controller and stored in a storage unit. The message is then supplied by appropriate control logic circuitry to an associated printer to provide the desired hard copy. While this type of system operates in a generally satisfactory manner, it has several shortcomings which limit its usefulness for a variety of applications, particularly clustered printer applications. For example, the storage unit of the above system is capable of storing only a single message at any given time. It is not possible, therefore, to successively generate and store in a single storage unit several messages to be sent to a particular printer and printed out in succession. In addition, it is not possible in the above system to initiate a printout instruction to print out a particular message until the printer has finished printing out the previous message. The above limitations on storage space and its utilization place rather severe restraints on the frequency of usage of the system. The assignment of storage space and control logic circuitry to the video display terminals (and the computer) on a one-to-one basis furthermore leads to a significant amount of hardware, particularly in multiple printer applications, and, consequently, to a high cost.

Other limitations of the abovedescribed system exist in the areas of processing of new-line characters, formatted printouts, and error correction. In the abovedescribed system, new-line characters, which are employed in computer messages or in video display terminal messages to indicate the start of new lines in a hard copy printout, are applied to the storage units and subsequently decoded for use by the appropriate printers. To accomplish this decoding requires that decoder circuitry be provided for each of the printers. This increases the basic hardware cost of the system.

Formatted printouts in the abovedescribed system are limited to exact reproductions of formatted information displayed on the display surface of the video display terminals. Thus, it is not possible to provide hard copy of only selected portions of formatted information displayed at the video display terminals, for example, variable-field information, or to perform corrections at the video display terminals which will later be reflected in the final printouts.

Error correction in the above system is limited to resetting a storage unit in the event an error occurs with respect to a message stored therein. The entire message is erased, whether segmented or not. It is not possible, therefore, to erase only a single erroneous segment of a segmented message.

BRIEF SUMMARY OF THE INVENTION

Briefly, in accordance with the present invention, a data processing apparatus is provided for use in a data processing printout system.

The data processing apparatus of the invention includes a plurality of data processing units and a plurality of sources of messages. By way of example, the data processing units may be printers and the sources of messages may be video display terminals. Each of the sources of messages is assigned to one of the plurality of data processing units and is operable to originate message to be processed by that data processing unit. An input control means receives the messages originating from the plurality of sources of messages and loads the messages in sequence into a storage means. As a result, the messages are stored in sequence in the storage means. A cycling means operates to cause the contents of the storage means to be applied cyclically to an output connection. An extraction means associated with the plurality of processing units operates to receive the contents of the storage means applied to the output connection and to extract and apply to each of the plurality of data processing units the messages intended therefor.

BRIEF DESCRIPTION OF THE DRAWING

Various objects, features, and advantages of a data processing printout system in accordance with the present invention will be apparent from the following detailed discussion together with the accompanying drawing in which.

DETAILED DESCRIPTION OF THE INVENTION

Figure 1:
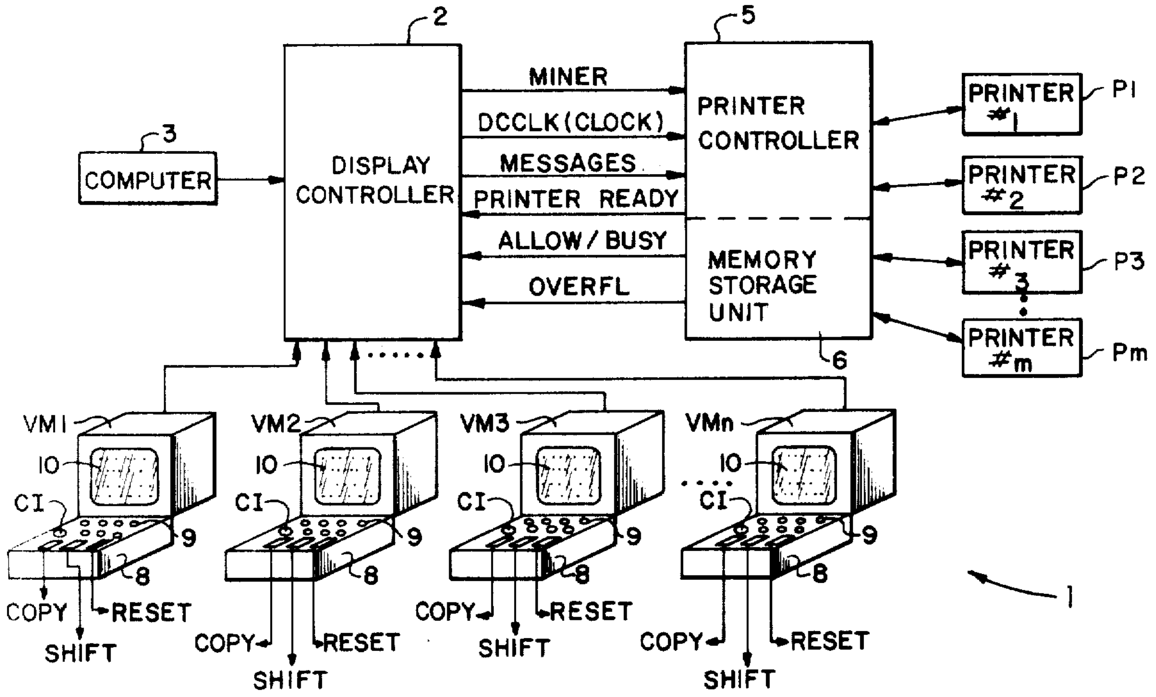
FIG. 1 is a block diagram, partly in pictorial form, of a data processing printout system in accordance with the invention.

Data Processing Printout System General Description — (FIG. 1)

Referring now to FIG. 1, there is shown a data processing printout system 1 in accordance with the present invention. As shown in FIG. 1, the data processing printout system 1 includes a display controller 2, a computer 3, a plurality of video display terminals VMl–VMn, a printer controller 5, and a plurality of printers Pl-Pm. The display controller 2 is arranged to receive information from the computer 3 or from the video display terminals VMl-VMn, in the form of multi-character messages, and to process these messages for subsequent use by the printer controller 5 and the printers Pl–Pm. Typically, the display controller 2 sequentially scans or polls the computer 3 and the video display terminals VMl–VMn to determine whether messages are waiting to be processed by the display controller 2 to then be transferred to the printer controller 5 for use thereby. An input to the printer controller 5, designated in FIG. 1 as "MESSAGES", is used for transferring messages to the printer controller 5 from the display controller 2.

As will be described in detail hereinafter, the printer controller 5 contains a memory storage unit 6 for storing messages originating from the computer 3 and from the video display terminals VMl-VMn. In accordance with the invention, only messages of a length less than a predetermined maximum permissible length, whether originating from the computer 3 or from the video display terminals VMl–VMn, are allowed to be stored in the memory storage unit 6 for subsequent use by the printers Pl-Pm. This maximum permissible message length is made to be at least equal to the maximum amount of information which may be displayed at any one time by any one of the video display terminals VMl-VMn. Messages originating from the computer 3 to be stored in the memory storage unit 6 are also confined to this maximum permissible length. In the event sufficient empty contiguous space is deemed to exist in the memory storage unit 6 for storing a message having a length up to the aforementioned maximum permissible length, an ALLOW signal is produced by the printer controller 5 and applied to the display controller 2 over an input "ALLOW/BUSY" to the display controller 2. The ALLOW signal informs the display controller 2 that the memory storage unit 6 has space for a message, originating from either a video display terminal or from the computer 3, having a length up to the maximum permissible length. Otherwise, a BUSY signal is sent by the printer controller 5 to the display controller 2, over the "ALLOW/BUSY" input to the display controller 2, to inform the display controller 2 that no message may be sent to the printer controller 5 at this time, that is, until an ALLOW signal is produced by the printer controller 5.

Messages supplied by the display controller 2 to the printer controller 5, under the conditions outlined above, are also accompanied by clock signals. These clock signals, which are supplied by the display controller 2 to the printer controller 5 over a "DCCLK" (*D*isplay *C*ontroller *CLocK*) input to the printer controller 5 are employed in the printer controller 5 for establishing various timing signal sequences for the processing of messages received therein. These signal timing sequences will be described in detail hereinafter.

The various hard copy printout operations of the printers Pl–Pm are initiated either at the video display terminals VMl–VMn or by the computer 3. In accordance with the invention, each of the video display terminals VMl–VMn, by virtue of internal physical connections, is assigned to one, and only one, of the printers Pl–Pm whereby a message originating from a given one of the video display terminals VMl–VMn is printed out only by the printer to which it is assigned. Due to the nature of the system timing, it is not possible for one of the video display terminals VMl–VMn to be assigned to more than one of the printers Pl–Pm. However, it is possible for more than one of the video display terminals VMl–VMn to be assigned to a particular one of the printers Pl–Pm in which case the number of printers Pl–Pm to be used in the system for printing out messages originating from the video display terminals VMl–VMn is less than the number of video display terminals. The computer 3 may originate messages to be ultimately printed out by any one of the printers Pl–Pm.

As shown in FIG. 1, each of the video display terminals VMl–VMn includes a keyboard 8. Each of the keyboards 8 includes a number of keys 9 by which information may be obtained from the computer 3 and displayed, in formatted or non-formatted form, on a display surface 10 (e.g., a CRT display surface). The keys 9 may also be used for deriving and moving a cursor across the display surface 10, for placing special symbols (e.g., new line symbols) on the display surface 10, and for performing a variety of other conventional functions well known to those skilled in the art. At such time as it is desired to obtain a hard copy of the information displayed on the display surface 10 of a particular video display terminal, whether the information is in formatted or non-formatted form, a COPY key provided on the keyboard 8 is depressed by the operator of the video display terminal. A SHIFT key may also be depressed by the operator, together with the COPY key, for performing special justified format printout operations, to be described in detail hereinafter. Each time a COPY key on a keyboard 8 of a video display terminal is depressed to initiate a hard copy printout operation, an associated copy indicator CI is illuminated and remains illuminated until the message originating from the video display terminal has been transferred from the display controller 2 to the printer controller 5. Assuming that the printer for which the message is intended is ready, as indicated by a signal produced by the printer and coupled by the printer controller 5 to the display controller 2 over a "PRINTER READY" input to the display controller 2, and also that sufficient space for a message exists in the memory storage unit 6 in the printer controller 5, as described earlier, the message from the video display terminal is transferred by the display controller 2 to the printer controller 5 and stored in the memory storage unit 6. If the printer is not ready, the copy indicator CI is caused to flash by the display controller 5. A copy request may be terminated by the operator, if a message has not yet been transferred to the printer controller 5, by depressing a RESET key provided on each of the keyboards 8.

The data processing printout system 1 of FIG. 1 also functions in the presence of error conditions and remedies these error conditions to prevent incorrect or otherwise improper messages from being printed out by the printers Pl–Pm. For example, if a message originating from the computer 3 or from one of the video display terminals VMl–VMn has a length exceeding the aforementioned maximum permissible length, due, for example, to the presence of an error condition in the message causing the excessive message length, and an attempt is made to load this message into the memory storage unit 6 in the printer controller 5, the excessive length of the message is detected in the printer controller 5. The printer controller 5 then sends an "overflow" signal to the display controller 2, over an "OVERFL" (*OVERFL*ow) input to the display controller 2, to terminate the transfer of the message, and proceeds to erase so much of the message as was undesirably loaded into the memory storage unit 6 prior to the detection of the overflow condition. The printer controller 5 also remedies other types of error conditions with respect to messages originating from the computer 3. For example, if a parity error exists in a message originating from the computer 3, and some part of the message is stored in the memory storage unit 6, a "MINER" (*M*essage *IN ER*ror) signal indicating the presence of the error condition is sent by the display controller 2 to the printer controller 5 over a "MINER" input to the printer controller 5. The printer controller 5 operates in response to the "MINER" error signal to erase so much of the entire message as was undesirably loaded into the memory storage unit 6 prior to the receipt of the MINER error signal. Provision may also be made in the printer controller 5 for erasing from the memory storage unit 6 only a single segment of a multi-segment computer message, as determined to be in error, leaving other segments of the computer message intact and undisturbed in the memory storage unit 6. The abovedescribed error conditions and the corresponding corrections therefor will be described in greater detail hereinafter.

The data processing printout system of FIG. 1, with the exception of the printer controller 5, may be implemented by a variety of arrangements known to those skilled in the art. For example, the display controller 2 may be a Videomaster 7700 Display Controller, a product manufactured by Ultronic Systems Corporation, Moorestown, New Jersey. The video display terminals VMl–VMn may be Videomaster 7700 video display terminals, also products manufactured by Ultronic Systems Corporation. The above-mentioned Ultronic equipment is described in "Ultronic Videomaster 7700 Cluster Display System—Principles of Operation", Copyright 1971. With the aforementioned Videomaster 7700 Display Controller, up to twenty-four Videomaster 7700 video display terminals may be used. The computer 3 may be any general-purpose programmable computer, for example, an IBM 360 or an IBM 370 computer. The printers Pl–Pm may be of several possible types readily available commercially, for example, of the thermal or impact type, and of the character or line printer type. In any given data processing printout system, the printers Pl–Pm may be all of the same type or any combination or mixture of the abovementioned types.

PRINTER CONTROLLER — GENERAL — (FIG. 2)

Figure 2:
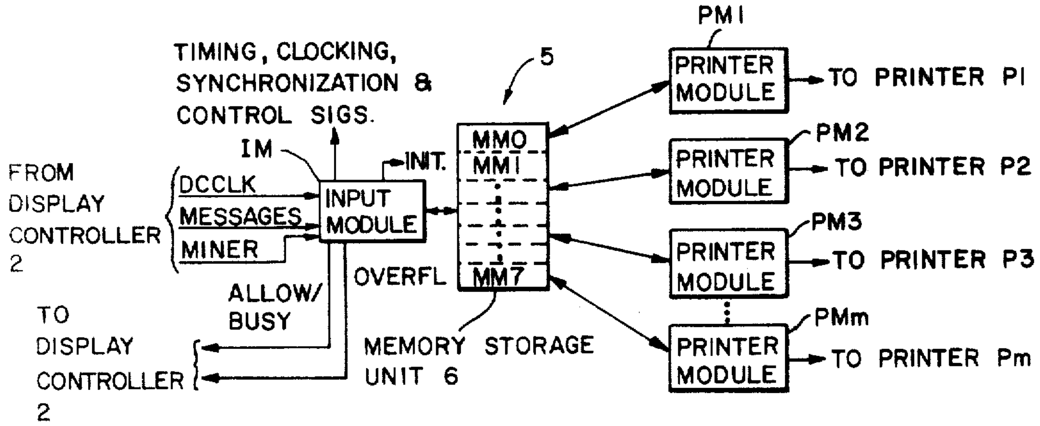
FIG. 2 is a block diagram of a printer controller employed in the data processing printout system of FIG. 1.

FIG. 2 illustrates in simplified schematic block diagram form the general elements comprising the printer controller 5 of the present invention. The printer controller 5 comprises the aforementioned memory storage unit 6, an input module IM coupled to the memory storage unit 6, and a plurality of printer modules PMl–PMm coupled to the memory storage unit 6 and to corresponding ones of the printers Pl–Pm.

Figure 5:
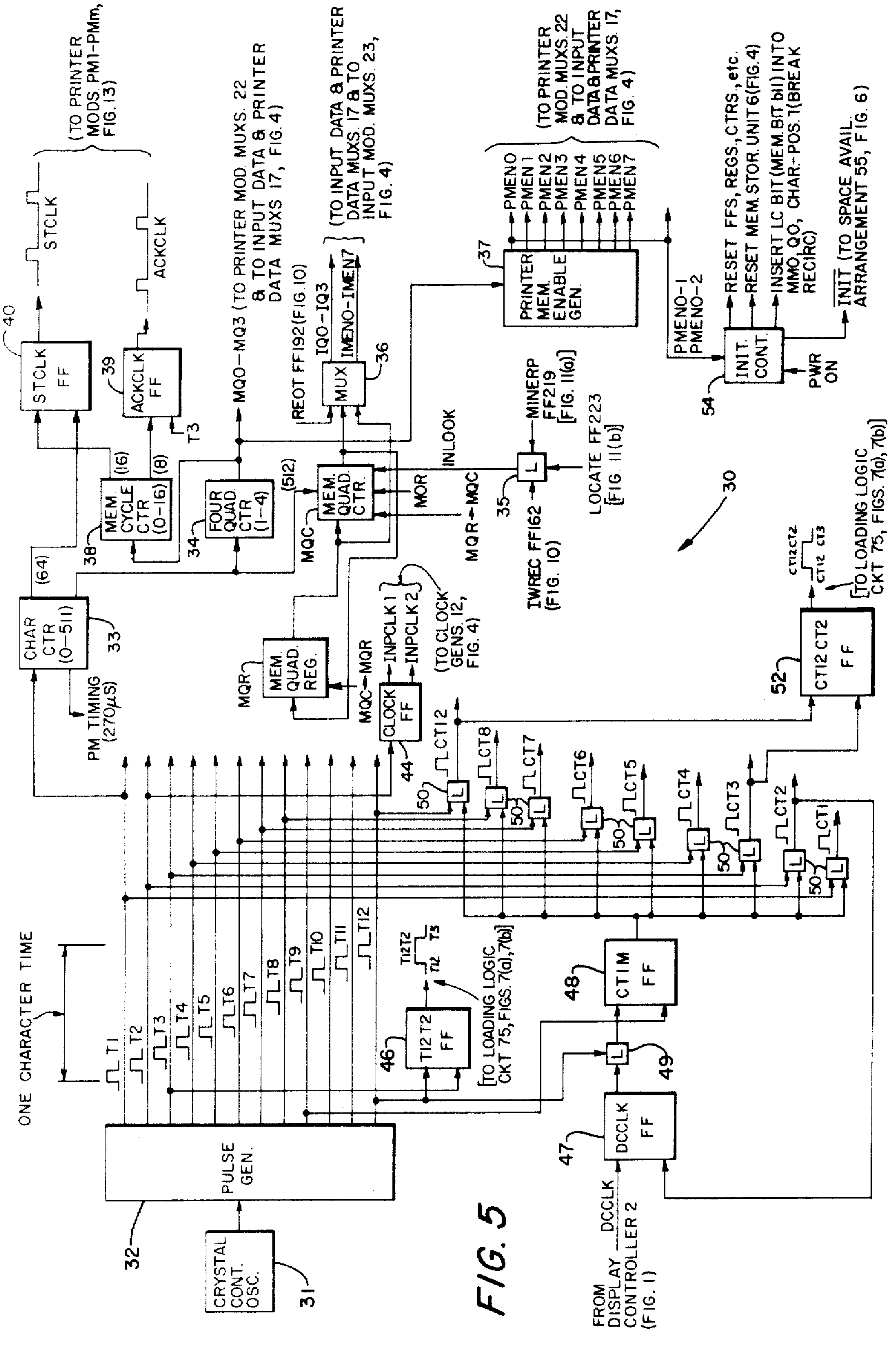
FIG. 5 is a block diagram of a timing and control unit employed in the printer controller for providing system timing, clocking, synchronization and control.
Figure 6:
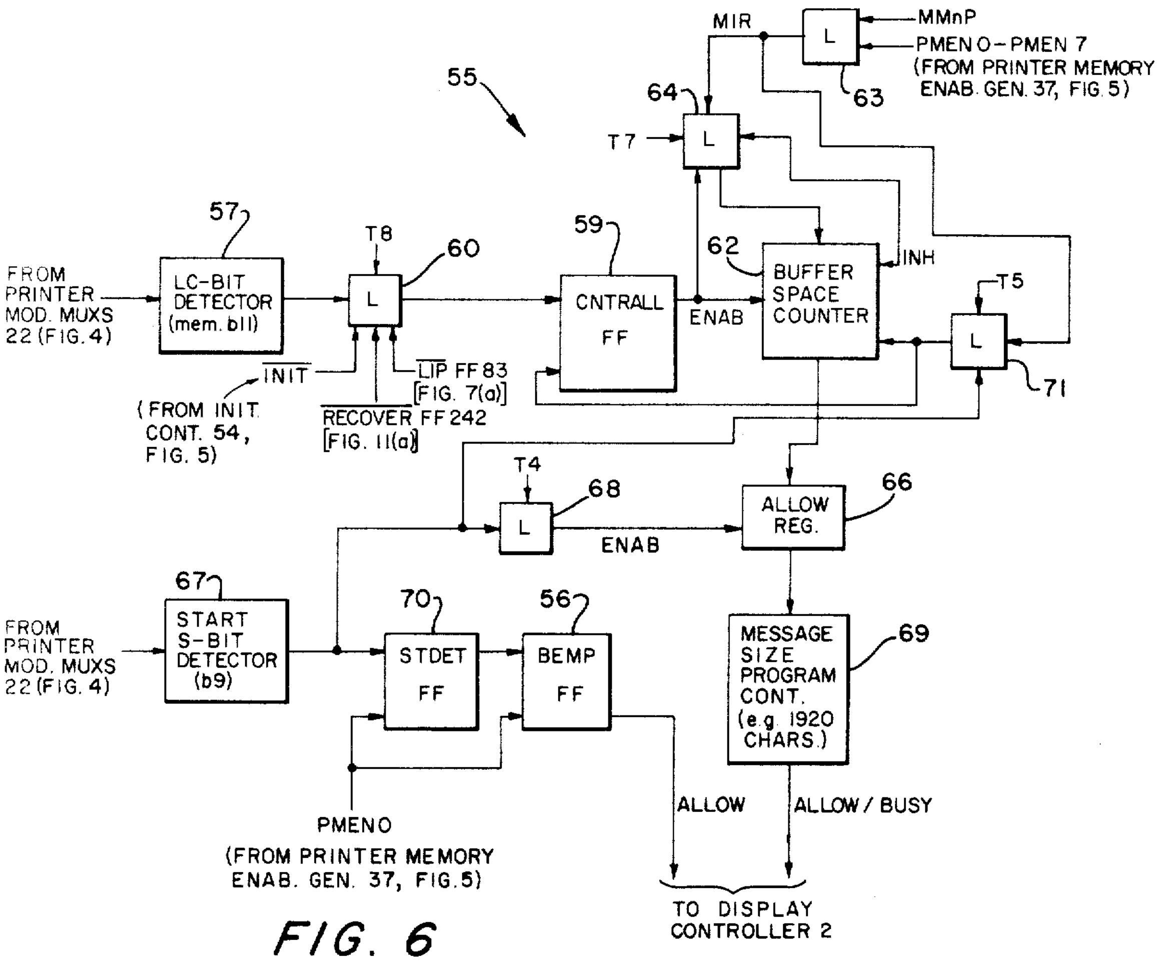
FIG. 6 is a block diagram of a space availability arrangement employed in the printer controller for determining the availability of storage space in the memory storage unit for storing messages from the display controller.
Figure 7A:
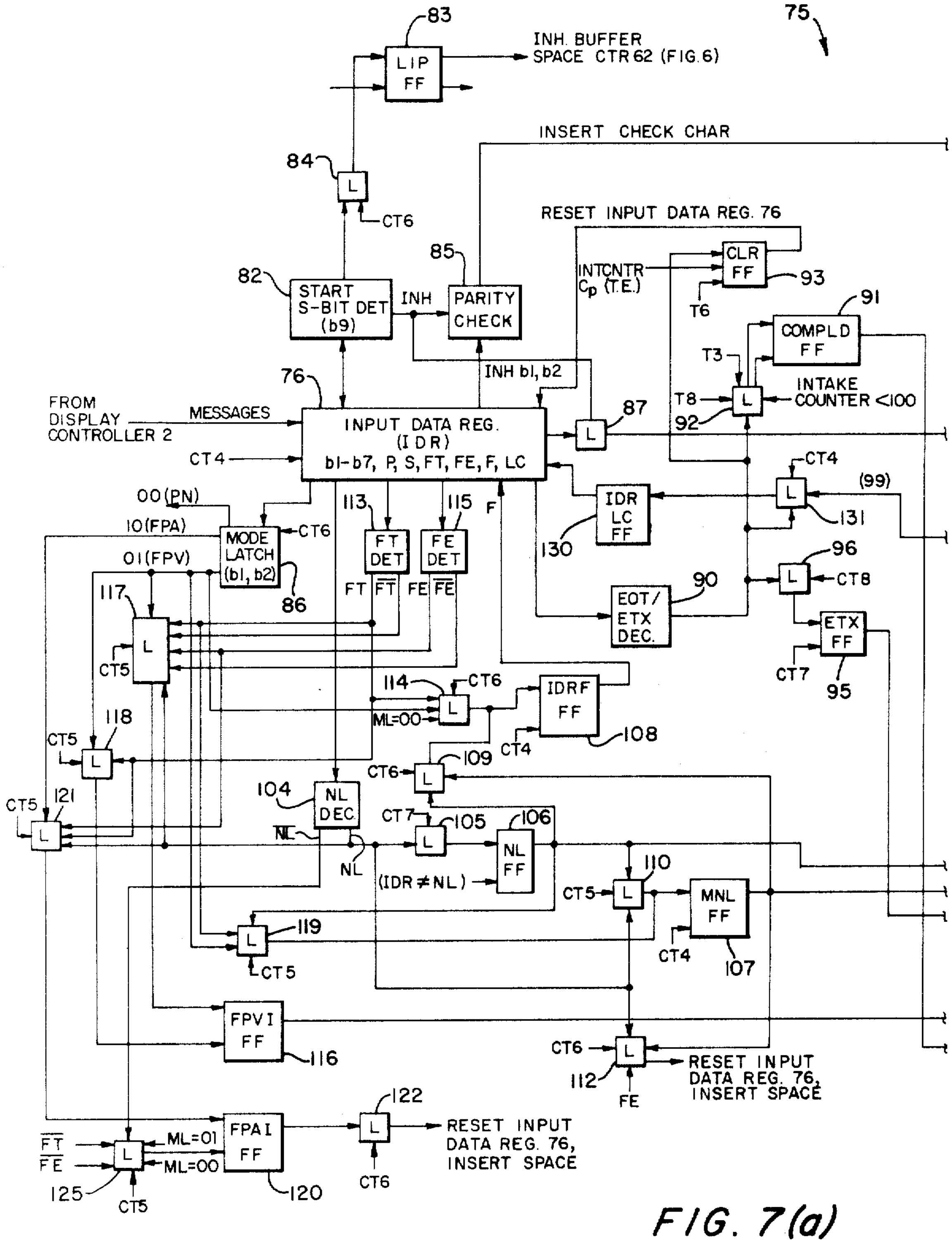
FIGS. 7*a* and 7*b*, when taken together, are a block diagram of a loading logic circuit employed in the printer controller for processing messages from the display controller prior to application to the memory storage unit.
Figure 7B:
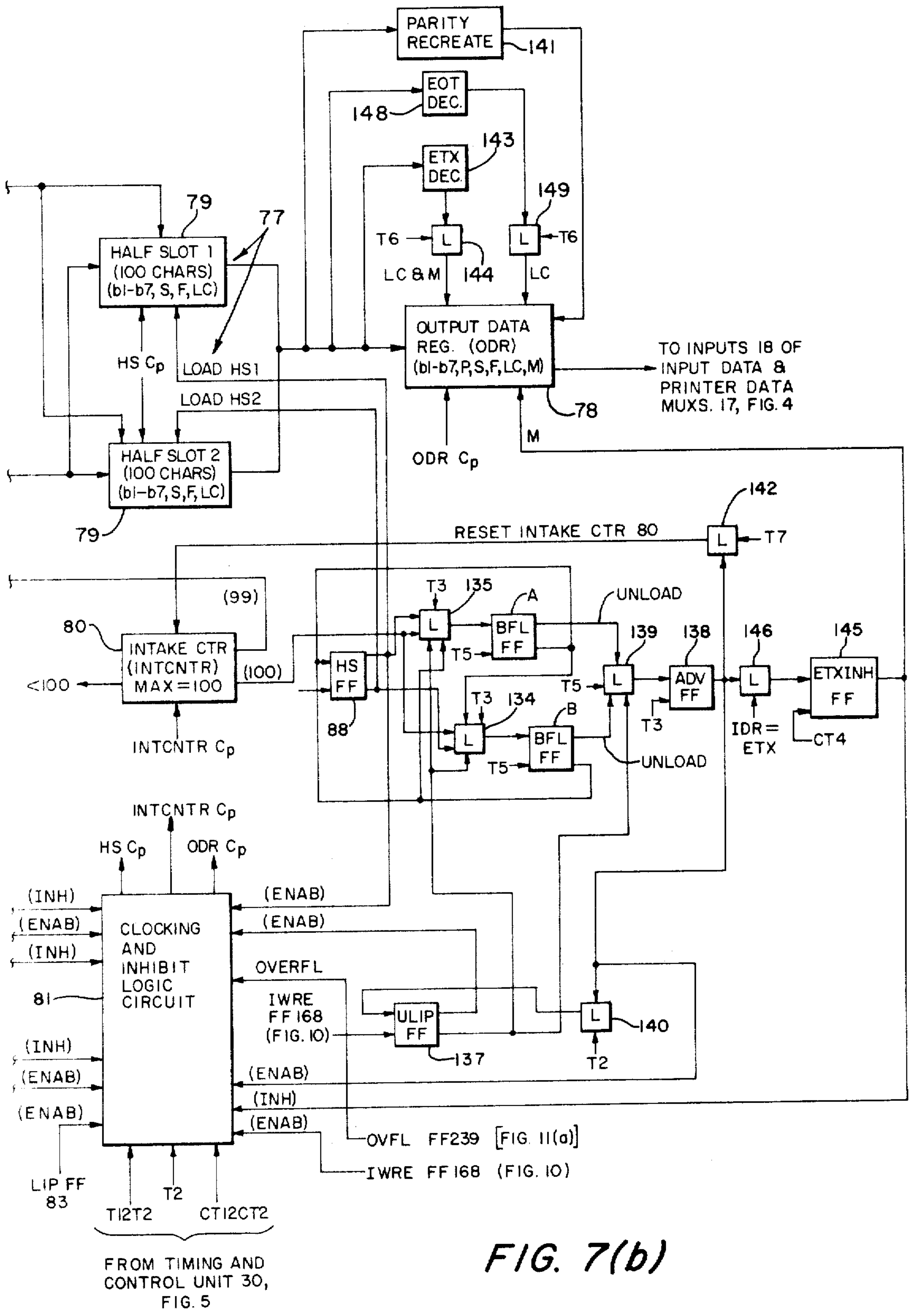
Figure 10:
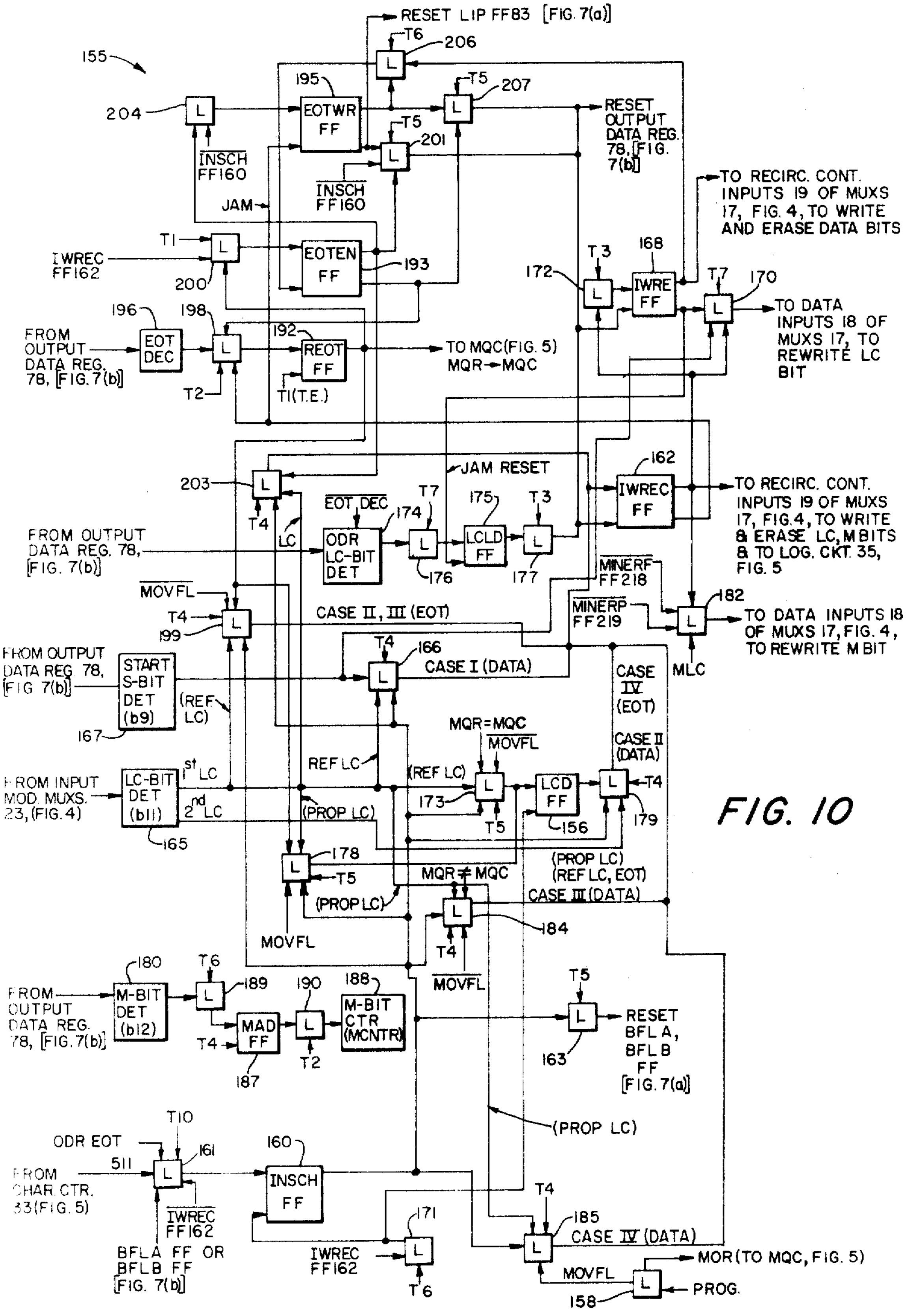
FIG. 10 illustrates a search and write unit employed in the printer controller for locating storage points in the memory storage unit for writing messages into the memory storage unit.
Figure 11A:
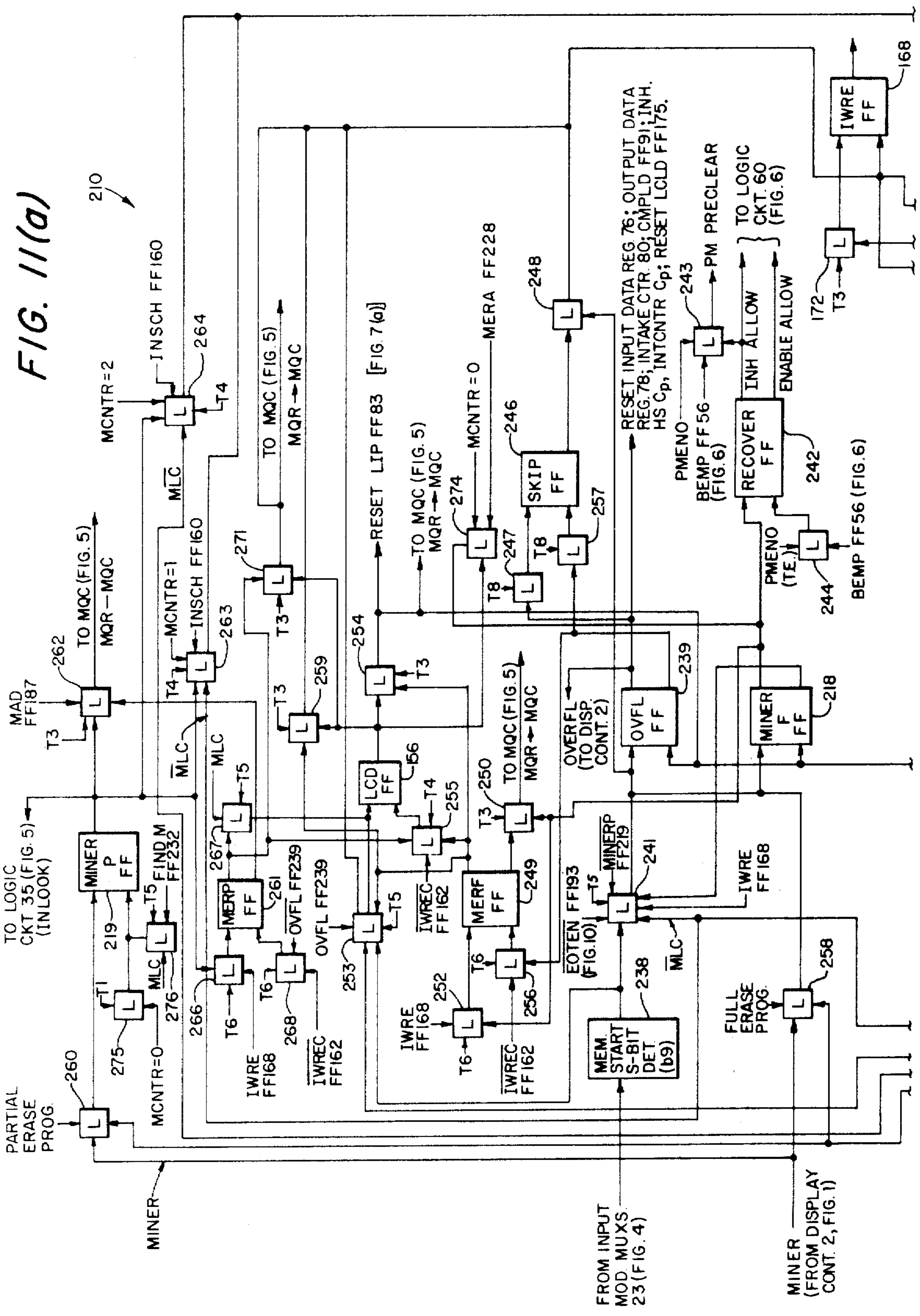
FIGS. 11*a* and 11*b*, when taken together, are a block diagram of an error conditions and M-bit-erase unit employed in the printer controller for erasing erroneous messages or segments of multi-segment messages stored in the memory storage unit and for erasing specific control bits (M bits) employed in segmented messages from the display controller and originating from the computer.
Figures 11B, 11C, 11D:
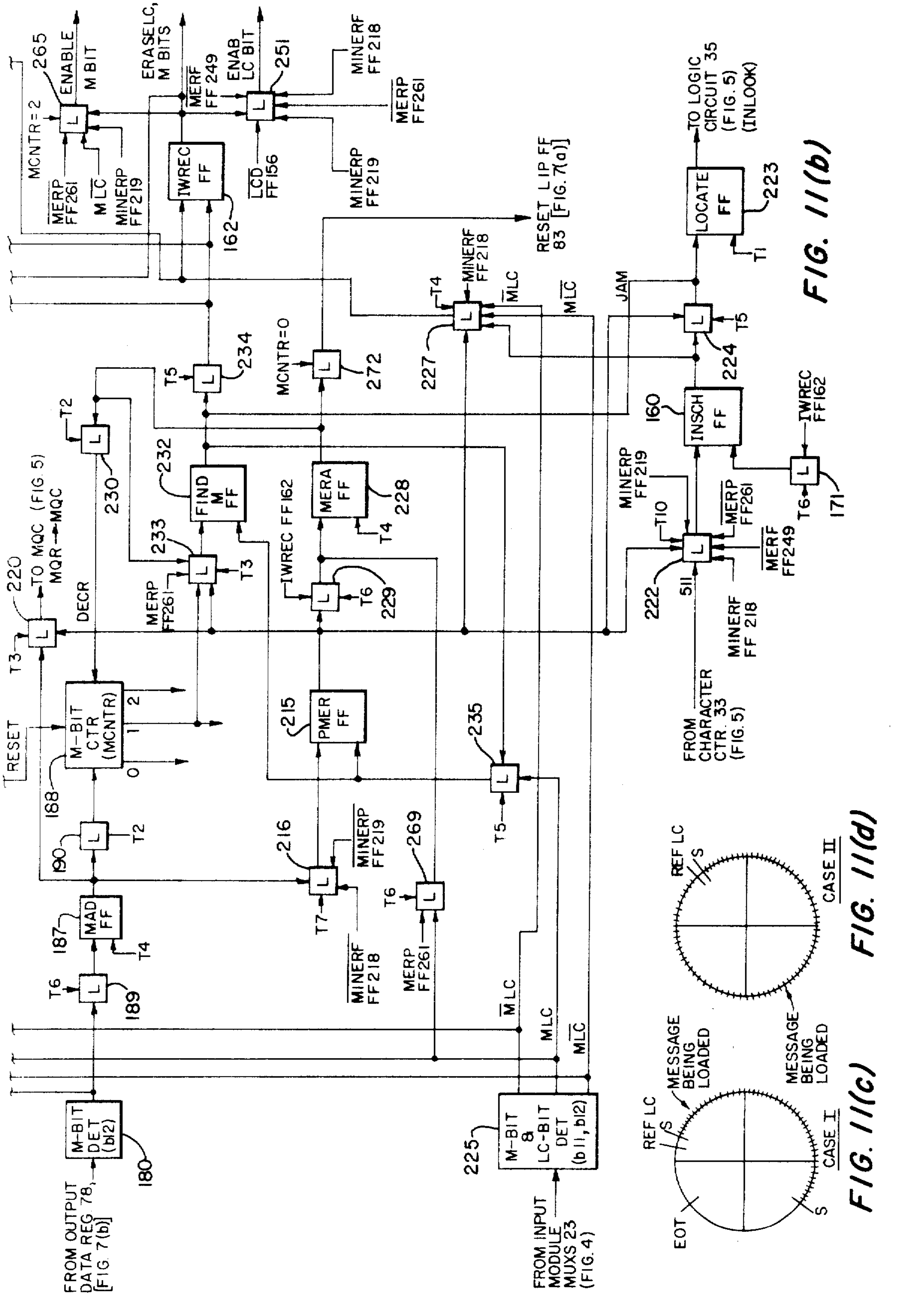

The input module IM is employed in the present invention to control and coordinate the majority of the operations performed by the various components of the system. Only one input module IM is required in a system irrespective of the number of printers used. The functions of the input module IM are summarized briefly hereinbelow, and will be explained in greater detail hereinafter in connection with FIGS. 5 through 12.

a. To establish timing, clocking, synchronization, and control signals for the system. The DCCLK (*D*isplay *C*ontroller *CL*oc*K*) signals produced by the display controller 2 and received by the input module IM are employed to accomplish many of the above functions. The portion of the input module IM used for the above purpose is shown in FIG. 5.

b. To initialize the entire printer controller 5 prior to its initial operation. This initialization operation, indicated at "INIT" in FIG. 2, includes the initial resetting of logic elements employed in the printer controller 5 such as flip-flops, registers, and counters; the initial resetting, or erasing, of the memory storage unit 6; and the establishing of the necessary initial operating condition for the memory storage unit 6 in preparation for receiving and storing its initial (first) message (originating from the computer 3 or from one of the video display terminals VM*l*–VM*n*). The portion of the input module IM used to accomplish the above functions is shown in FIG. 5.

c. To determine the availability of empty space in the memory storage unit 6 for storing a message originating from the computer 3 or from one of the video display terminals VM*l*–VM*n* having a length up to the predetermined maximum permissible length. This maximum permissible length is made to be at least equal to the maximum amount of information which may be displayed at any one time by any one of the video display terminals VM*l*–VM*n*. By way of example, for the aforementioned Ultronic Videomaster 7700 video display terminals, this maximum amount of display information may be 1920 characters. Messages originating from the computer 3 to be stored in the memory storage unit 6 and then printed out by the printers P*l*–P*m* are limited in length to the aforementioned maximum permissible length. If sufficient empty space for a message is deemed to exist, an ALLOW signal is produced by the input module IM and applied to the display controller 2. The display controller 2 operates in response to the ALLOW signal to transfer a message (originating from the computer 3 or from one of the video display terminals VM*l*–VM*n*) to the input module IM. If sufficient space is not deemed to exist, a BUSY (not ALLOW) signal is produced by the input module IM and sent to the display controller 2 and prevents the display controller 2 from sending a message to the input module IM at this time, that is, until sufficient empty contiguous space becomes available in the memory storage unit 6 to cause the input module IM to send an ALLOW signal to the display controller 2. The portion of the input module IM for performing the above operations is shown in FIG. 6.

d. To load messages from the display controller 2 into the memory storage unit 6, provided, however, that an ALLOW signal was previously produced by the input module IM and sent to the display controller 2. The portion of the input module IM used for performing the above operation is shown in FIGS. 7(a), 7(b), and 10.

e. To detect messages of excessive length ("overflow" condition) due, for example, to error conditions and to cause erasure from the memory storage unit 6 of so much of a message as was loaded into the memory storage unit 6 prior to the detection of the overflow condition. The detection of the overflow condition causes an overflow (OVERFL) signal to be sent by the input module IM to the display controller 2 to signal the display controller 2 to discontinue sending the overflowing message. The OVERFL signal is also used in the input module IM to reset various critical elements involved in the loading of messages into the memory storage unit 6. The portion of the input module IM used to perform the above operations is shown in FIGS. 11(a) and 11(b).

f. To cause erasure from the memory storage unit 6 of messages, or segments thereof (in the case of multi-segment messages), originating from the computer 3 and deemed to be in error (e.g., parity error). The error condition is signalled to the input module IM by a MINER (*M*essage *IN ER*ror) signal from the display controller 2. The portion of the input module IM used to perform the above operations is shown in FIGS. 11(a) and 11(b).

The memory storage unit 6 contains the data storage area for messages to be printed out by the printers Pl–Pm. A significant feature of the memory storage unit 6 is that there are no special assigned or allocated areas within the memory storage unit 6 for messages originating from the computer 3 or from the video display terminals VM*l*–VM*n*. A message for a particular printer, whether originating from the computer 3 or from one of the video display terminals VM*l*–VM*n*, may be stored at any point, or storage area, in the memory storage unit 6. The principal factor controlling where a message is to be stored is where sufficient empty memory space is deemed to exist to store the message, as determined by the input module IM as briefly described hereinbefore.

In accordance with the arrangement and manner of operation of the memory storage unit 6, to be described in detail hereinafter, it is possible for several messages to be stored in the memory storage unit 6 at any given time to be printed out by a single one of the printers P*l*–P*m*. It is even possible for all of the messages in the memory storage unit 6 to be for a single one of the printers P*l*–P*m*. In either event, the messages are extracted from the memory storage unit 6 and printed out in the same sequence in which the messages were entered and stored in the memory storage unit 6, that is, in chronological sequence. This chronological printout of messages intended for the same printer is accomplished even though the messages may not be in contiguous areas of the memory storage unit 6 and may possibly be interspersed with messages intended for other ones of the printers P*l*–P*m*.

The storage capacity of the memory storage unit 6 is established to accommodate such factors as the number of video display terminals VM*l*–VM*n* employed in the system, the frequency of usage of the hard copy printout function, the particular needs of the users of the system, and the expected message volume. To this end, a modular approach is taken for the construction of the memory storage unit 6 whereby only the precise number of modules deemed to be necessary for a particular application are used. In FIG. 2, the memory storage unit 6 is shown as having eight memory modules, designated as MM0–MM7. This number is exemplary only and may be greater or less as determined by the particular application.

The abovementioned extraction of messages stored in the memory storage unit 6 is accomplished by the printer modules PM*l*–PM*m*. Each of the printer modules PM*l*–PM*m* continuously searches the memory storage unit 6, independently of the other printer modules, looking for messages intended for its associated printer. At such time as it locates a message intended for its associated printer, it extracts the message from the memory storage unit, one character at a time, and applies the characters to its associated printer to be printed out thereby. The above extraction operation is allowed to take place even though new messages are simultaneously being loaded into the memory storage unit 6 by the input module IM (assuming that sufficient memory space exists for the new messages) at a rate differing from the rate at which messages are extracted from the memory storage unit. The printer module also signals its associated printer to initiate any necessary new-line operations, as indicated by new-line information contained in the messages extracted by the printer module from the memory storage unit 6.

A significant result of the extraction of messages from the memory storage unit 6 by the printer modules PM*l*–PM*m* is that the extraction causes growing empty spaces to develop within the memory storage unit 6. The memory storage unit 6 may therefore be considered "data dynamic." As soon as enough free and contiguous space has been accumulated in the memory storage unit 6 for storing a message having a length up to the maximum permissible message length, as determined by the input module IM, an ALLOW signal is produced by the input module IM, as briefly described before, and applied to the display controller 2 to cause the display controller 2 to send the next available message to the input module IM to be entered and stored in the memory storage unit 6.

As stated earlier, each of the printers P*l*–P*m* prints out the messages intended therefor in the same sequence as they were entered into and stored in the memory storage unit 6. Therefore, depending on what messages for what printers are present in the memory storage unit 6 and the number and lengths of these messages, the printers P*l*–P*m* may operate concurrently, some may be operating while others are not, or none may be operating.

In order better to understand the manner in which messages produced by the display controller 2 are processed by the printer controller 5 in accordanc with the invention, typical forms of the messages produced by the display controller 2, originating from one of the video display terminals VM*l*–VM*n* or from the computer 3, will now be described.

Figures 3A, 3B, 3C, 3D:
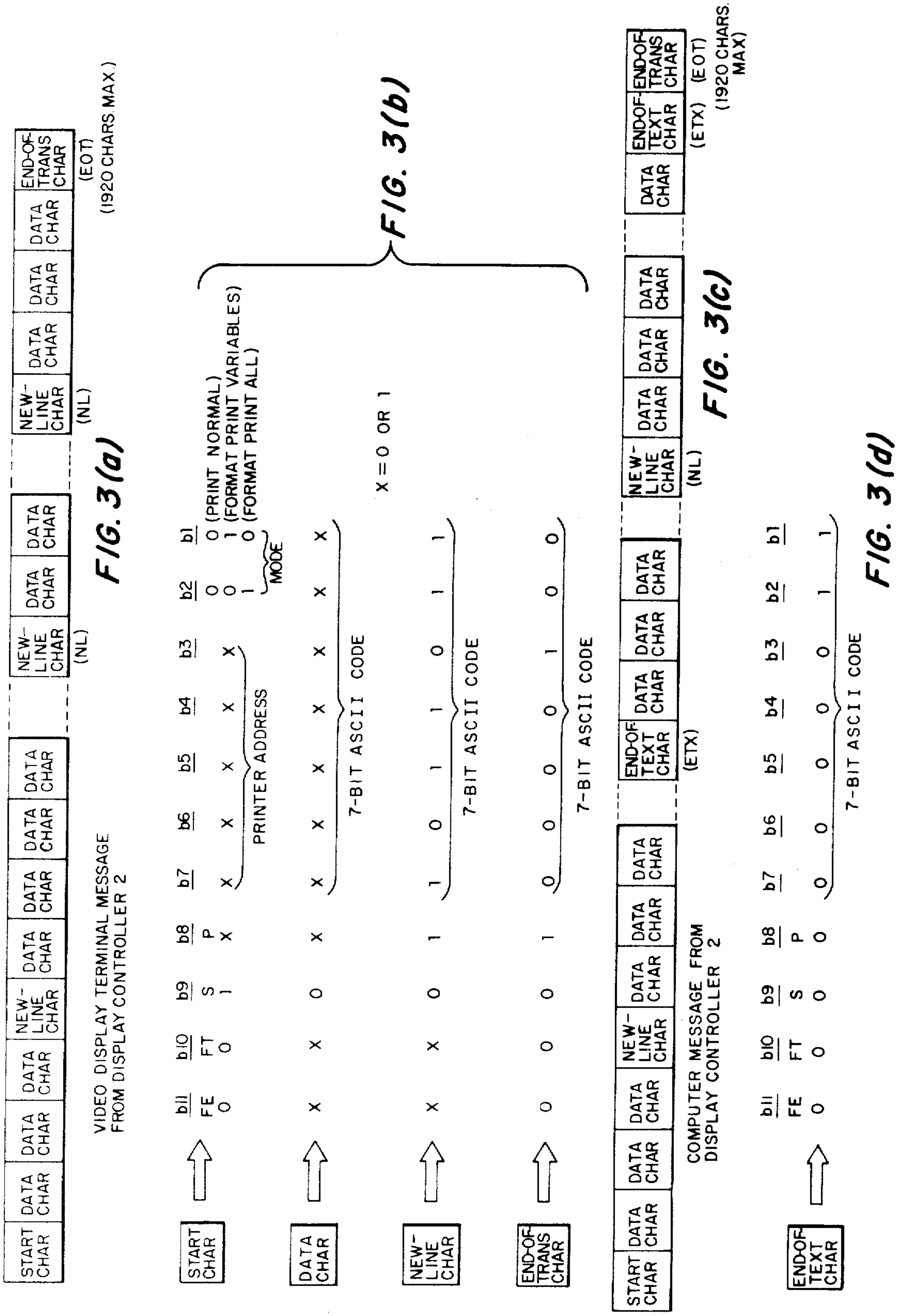
FIG. 3*a* is a diagrammatic representation of a message produced by a display controller employed in the data processing printout system and originating from a video display terminal.
FIG. 3*b* illustrates typical bit configurations of characters employed in a messages as shown in FIG. 3*a*.
FIG. 3*c* is a diagrammatic representation of a message produced by the display controller and originating from a computer.
FIG. 3*d* illustrates the bit configuration of a character employed in a message as shown in FIG. 3*c*.

VIDEO DISPLAY TERMINAL MESSAGE — [FIGS. 3(a), 3(b)]

FIG. 3(a) illustrates a typical form of a message produced by the display controller 2 and originating from one of the video display terminals VM*l*–VM*n*. As shown in FIG. 3(a), the video display terminal message comprises a serial arrangement of characters including a START character, DATA characters, NEW-LINE (NL) characters, and an END-OF-TRANSMISSION (EOT) character. The START character represents the first character of the message and contains the address of the printer which is to print out the message and the particular mode (format or non-format) of the printout. The END-OF-TRANSMISSION (EOT) character represents the last character of the message and indicates the end of the message. The DATA characters represent the information content of the message as desired to be presented in hard copy form by one of the printers P*l*–P*m*. These DATA characters are arranged in the message to correspond to the locations of letters, words, numbers, punctuation marks, blank spaces, symbols, etc., as presented on the display face 10 of one of the video display terminals VMl-VMn. The NEW-LINE (NL) characters, which may be considered special DATA characters, are inserted in the message with respect to the other characters whenever it is desired or necessary to perform new line operations. The maximum number of characters in a message, excluding the START and END-OF-TRANSMISSION characters, is determined by the size of the information-display area of the video display terminal from which the message originates. By way of example, for a video display terminal of the aforementioned Ultronic Videomaster 7700 type, the maximum message length may be established to be 1920 characters.

Each of the characters comprising the video display terminal message of FIG. 3(a) is represented by 11 parallel bits. The arrangements of the bits comprising the START character, a DATA character, the END-OF-TRANSMISSION (EOT) character, and a NEW-LINE (NL) character are shown in FIG. 3(b). In the START character, five bits, identified in FIG. 3(b) as bits *b3*–*b7*, are employed to indicate the binary address of the printer to which it is assigned and which is to print out the message. These five bits, which may be various combinations of ones and zeros, as indicated by the symbols X in FIG. 3(b), are sufficient to indicate up to a total of 32 different printer addresses. The START character also includes two bits, termed "mode" bits and identified as *b*1 and *b*2, for indicating the particular mode in which the message is to be printed out. As will be described fully hereinafter, there are three possible printout modes in accordance with the invention. In a first mode, termed a "Print Normal" mode, a message is printed out to correspond to the arrangement of non-formatted information displayed on the display surface 10 of a video display terminal or from the computer 3. Non-formatted information may be defined for purposes of the present invention as information caused to be presented on a display surface 10 by an operator which is not in the nature of a form, or information from the computer 3. As contemplated by the present invention, a "form" includes both fixed-field (non-variable) information written and displayed on a display surface 10 by the computer 3, and blank areas or spaces, also from the computer 3, into which the operator enters variable-field information from the keyboard 8 of his associated video display terminal. In the "Print Normal" mode, both of the mode bits *b*1 and *b*2 are made zero.

In a second mode, termed a "Format Print Variables" mode, a message is printed out to include only the variable-field information of form-type (formatted) information displayed on a display surface 10 of a video display terminal. In addition, the variable-field information is printed out in a left-margin justified (columnar) fashion. Provision may also be made in this mode in accordance with the invention for eliminating from the final printout any variable-field information not desired to appear in the final printout. This situation may arise, for example, if partially or wholly erroneous variable-field information is entered by an operator on the display surface 10 of a video display terminal. The mode bits *b*1 and *b*2 for the "Format Print Variables" mode are made 1 and 0, respectively.

In a third mode, termed a "Format Print All" mode, a message is printed out to include both fixed-field and variable-field information of form-type (formatted) information displayed on the display surface 10 of a video display terminal. As in the case of the "Format Print Variables" mode, provision may also be made in the "Format Print All" mode for eliminating from the final printout any variable-field information not desired to appear in the final printout. The mode bits *b*1 and *b*2 for the "Format Print All" mode are made 0 and 1, respectively. For the three printout modes described above, the "Print Normal" and "Format Print All" modes are initiated by the depression of a COPY key of a keyboard 8 of a video display terminal, and the "Format Print Variables" mode is initiated by the depression of a COPY key together with a SHIFT key.

In addition to the abovdescribed START character bits *b*1–*b*7, the START character includes a parity bit P, identified as bit *b*8; a START bit S, identified as bit *b*9; a so-called FORMAT TAB bit FT, identified as bit *b*10; and a so-called FORMAT ENTRY bit FE, identified as bit *b*11. The parity bit P (bit *b*8) is selected to achieve a particular system of parity for the bits *b*1–*b*7, for example, "even ones" parity. Since the printer address and mode bit information may differ from one START character to another, the parity bit P may be a 1 or a 0, as indicated by the symbol X in FIG. 3(b). The parity bit P is similarly selected for DATA characters so as to achieve even ones parity. The START bit S (bit *b*9) is made a 1 for the START character and 0 for all other characters, thereby distinguishing the START character from the other characters. The Format Tab (FT) and Format Entry (FE) bits (bits *b*10 and *b*11, respectively) are employed in conjunction with the mode bits *b*1 and *b*2 in achieving the aforementioned "Format Print Variables" and "Format Print All" modes of operation. The FT and FE bits, which will be described more fully hereinafter, are both made 0 for the START character and for the END-OF-TRANSMISSION (EOT) character, but have other combinations of bit values for DATA and NEW-LINE (NL) characters, as indicated in FIG. 3(b).

In each DATA character, bits *b*1–*b*7 are selected in accordance with a 7-bit ASCII code for representing a particular item of information, for example, a letter, number, punctuation mark, blank space, symbol, etc. Bits *b*1-*b*7 of the remaining characters shown in FIG. 3(b), namely, the NEW-LINE (NL) character and the END-OF-TRANSMISSION (EOT) character, represent special ASCII codes which are distinguishable from the codes represented by bits *b*1–*b*7 of the DATA characters.

COMPUTER MESSAGE — FIGS. 3(c) AND 3(d)

FIG. 3(c) illustrates a typical form of a message as produced by the display controller 2 and originating from the computer 3. The computer message is similar to a message originating from one of the video display terminals VMl–VMn with the exception that the computer message is sent to the printer controller 5 in one or more segments, these segments being separated by an END-OF-TEXT (ETX) character. FIG. 3(d) illustrates the bit configuration of an END-OF-TEXT character.

MEMORY STORAGE UNIT 6 — FIG. 4

Figure 4:
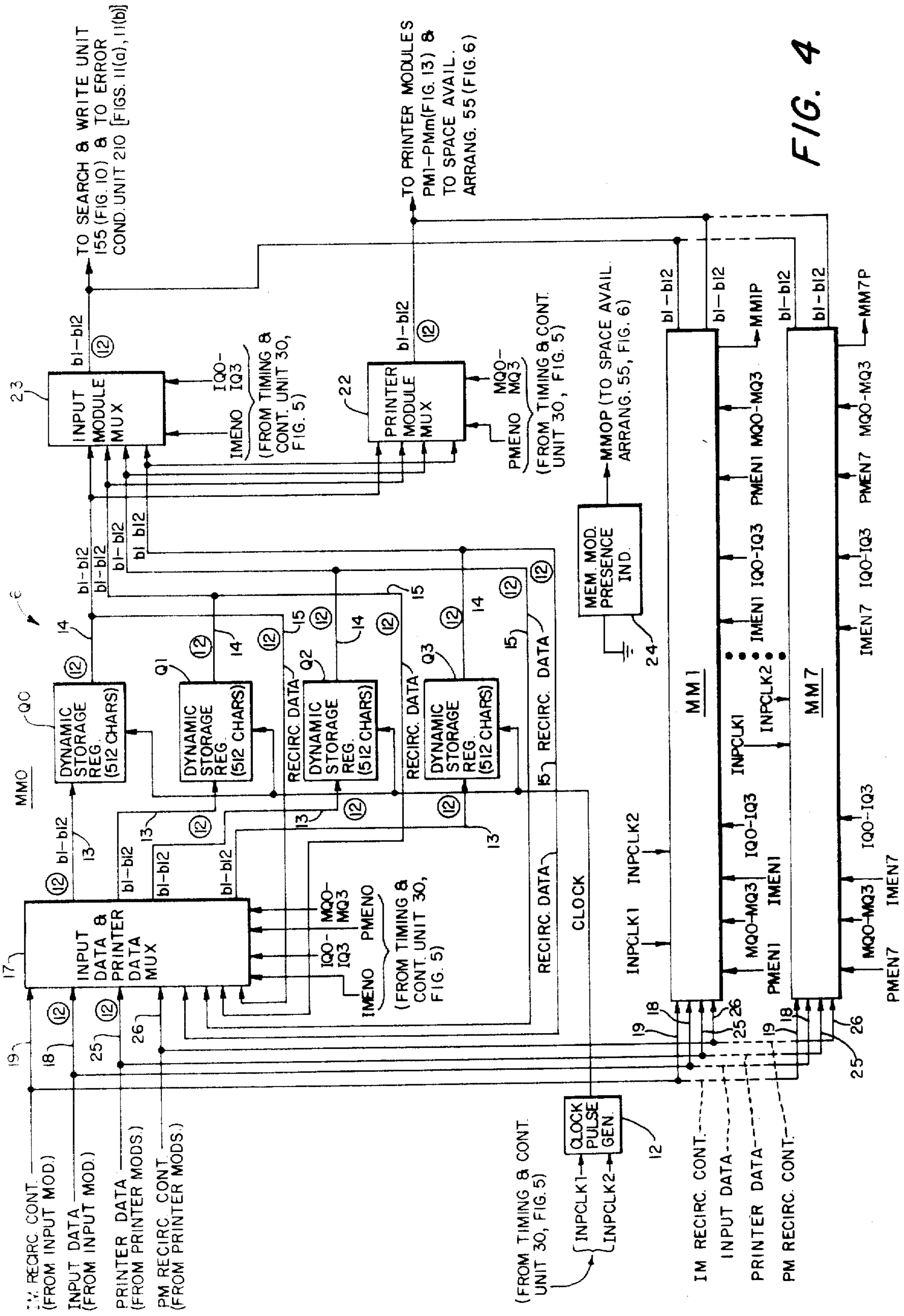
FIG. 4 is a block diagram of a memory storage unit employed in the printer controller in accordance with the invention for storing messages from the display controller.

Referring now to FIG. 4, there is shown in detail the memory storage unit 6 provided in the printer controller 5 of the invention. The memory storage unit 6 includes the aforementioned memory modules MM0–MM7. The memory modules MM0–MM7 are identical in construction and, for this reason, only one of the memory modules, namely, the first memory module MM0, is shown in detail in FIG. 4. Eight memory modules are shown in FIG. 4, however, it is to be appreciated that fewer or a greater number of memory modules may be present in any given system.

Figure 9:
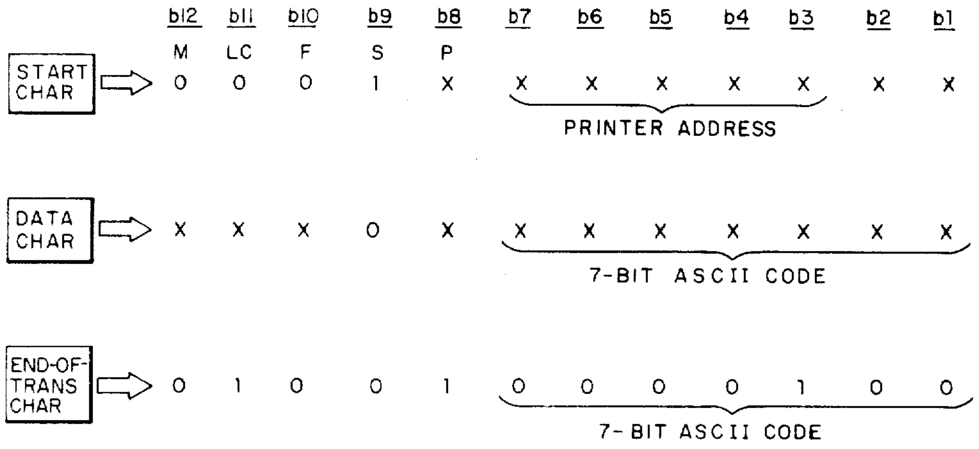
FIG. 9 illustrates typical bit configurations of characters of messages as processed by the loading logic circuit and applied to and stored in the memory storage unit.

Each of the memory modules MM0–MM7 comprises a plurality of dynamic storage registers Q0–Q3. These dynamic storage registers are employed in accordance with the invention to store the various messages originating from the computer 3 and from the video display terminals VM*l*–VM*n*, as processed by the input module IM. FIGS. 3(b) and 3(d) illustrate the form of the message characters prior to being processed by the input module IM and FIG. 9 illustrates the form of the message characters as processed in the input module IM to be stored in the registers Q0–Q3. Each of the dynamic storage registers Q0–Q3 is provided with an input 13. Characters of messages to be stored in a register are applied to the input 13 of the register and then caused to be clocked along the register to an output 14 and also to a recirculation path 15. The recirculation path 15 which is connected between the output 14 and the input 13 of the register through an input data and printer data multiplexer 17, may have one or two possible states, either an unbroken state or a broken state. When in the unbroken state, characters stored in the register are permitted to continuously recirculate between the output 14 and the input 13 of the register, whereby their loss or destruction is prevented. When in the broken state, the recirculation path 15 prevents the recirculation of characters between the output 14 and the input 13 of the register with the result that these characters are removed permanently from the register.

To store message characters (FIG. 9) from the input module IM into one of the dynamic storage registers Q0–Q3, the input data and printer data multiplexer 17 associated with the register in which the characters are to be applied is actuated, by means to be described below, and the characters are applied to a data input 18 of the actuated input data and printer data multiplexer 17. At the same time, a recirculation control signal from the input module IM is applied to a recirculation control input 19 of the input data multiplexer 17. The storage register into which the characters are to be applied and stored is then selected, by means also to be described below, to receive the message characters to be stored therein. The recirculation control signal then causes the recirculation path 15 associated with the selected register to be broken within the input data and printer data multiplexer 17, with the result that characters appearing at the output 14 of the register are no longer able to be applied to the input 13. The characters from the input module IM are then coupled by the input data and printer data multiplexer 17 to the input 13 of the register and clocked along the register, character by character, by means of periodic clock pulses applied to the register by a clock pulse generator 12. The clock pulse generator 12 is controlled by means of clocking signals INPCLK1 and INPCLK2 derived from a timing and control unit 30 (FIG. 5) provided in the input module IM. The timing and control unit 30 will be described in detail hereinafter.

The various registers Q0–Q3 of the memory modules MM0–MM7 are operated in succession to receive and store characters of messages from the input module IM. That is, the registers Q0–Q3 of the memory module MM0 are first operated in succession to receive and store characters therein, then the registers Q0–Q3 of the memory module MM1, etc. The successive operation of the memory modules MM0–MM7 to receive characters from the input module IM to be stored in their associated registers Q0–Q3 is achieved by means of enabling signals, designated IMEN0–IMEN7, derived from the timing and control unit 30 (FIG. 5). These IMEN0–IMEN7 signals are produced by the timing and control unit 30 in succession when the input module IM is loading characters into the memory storage unit 6 and correspond to the several multiplexers 17 of the memory modules MM0–MM7. Each of these signals is applied to a corresponding one of the multiplexers 17 to cause actuation of that multiplexer. The successive operation of the registers Q0–Q3 within each of the memory modules MM0–MM7 to receive and store characters therein is then achieved by means of enabling signals, designated IQ0–IQ3, also derived from the timing and control unit 30. A set of these IQ0–IQ3 enabling signals is present with each of the IMEN0–IMEN7 multiplexer enabling signals and causes each of the multiplexers 17 selected by its associated IMEN enabling signal to enable its registers Q0–Q3 in succession.

A typical capacity for each of the registers Q0–Q3 of each of the memory modules MM0–MM7 is 512 characters, each character having twelve parallel bits (*b*1–*b*12). Thus, each of the memory modules MM0–MM7 contains sufficient storage capacity (2048 characters) for storing a message having a length up to the maximum permissible length (e.g., 1920 characters). For the eight memory modules MM0–MM7 shown in FIG. 4, therefore, the total storage capacity is 16,384 characters. This storage capacity may be increased or decreased as desired by adding additional memory modules or by removing existing ones. Each of the registers Q0–Q3 may be conveniently implemented by 12 512-bit MOS register units arranged in parallel. These MOS register units are available commercially and are well known to those skilled in the art.

Each of the memory modules MM0–MM7 of FIG. 4 also comprises a printer module multiplexer 22 and an input module multiplexer 23. Each of the printer module multiplexers 22 operates to receive the message characters clocked to the outputs 14 of its associated registers Q0–Q3 and to transfer these message characters to the several printer modules PMl–PMm and also to a space availability arrangement 55 (FIG. 6). The printer module multiplexers 22 are operated in continuous succession. This successive operation is achieved by means of free-running enabling signals, designated PMEN0–PMEN7, produced in succession by the timing and control unit 30 and applied to the several printer module multiplexers 22 in succession. Each of the mutliplexer enabling signals PMEN0–PMEN7 is also accompanied by a set of successive free-running enabling signals, designated MQ0–MQ3, also produced by the timing and control unit 30. These enabling signals MQ0–MQ3 cause the particular printer module multiplexer 22 actuated by its associated PMEN signal to transfer the message characters from its associated registers Q0–Q3 to the printer modules PM*l*–PM*m* and to the space availability arrangement 55 in succession.

In accordance with the invention, the rate at which data in the various registers Q0–Q3 is accessed by the input module IM to write (or erase) data from the registers differs from the rate at which data in the registers is accessed by the printer modules PM*l*–PM*m* and the space availability arrangement 55. Due to the relatively slow operation of printers as compared with the operation of the input module IM, the rate at which data in the various registers Q0–Q3 is accessed by the printer modules PM*l*–PM*m* (and the space availability arrangement 55) is made to be less than the rate at which data is accessed by the input module IM. The above difference in access rates is effected by using the aforementioned IMEN and IQ signals for controlling accessing operations by the input module IM and by using the aforementioned PMEN and MQ signals for controlling accessing operations by the printer modules PM*l*–PM*m* and the space availability arrangement 55. The IMEN and IQ signals (which supply the memory module and register address) remain fixed when the input module IM searches the registers (to write or erase data), as will be more fully apparent hereinafter. As a result, a character appearing at the output of an input module multiplexer 23 recirculates and again appears at that output within a relatively short period of time, that is, the cycle time of a quadrant (or register). A typical value for this time is 540 microseconds. In contrast with the IMEN and IQ signals, the PMEN and MQ signals (which also supply the memory module and register address) are free-running and cyclic. As a result, a character appearing at the output of the printer module multiplexers 22 recirculates and again appears at that output within a relatively long period of time, that is, the cycle time of the entire memory. A typical value for this time is 17.3 milliseconds. The input module IM is therefore able to accommodate data from the display controller 2 at the relatively fast input speed by using the faster memory access rate, whereas the printer modules PM*l*–PM*m* are able to extract data (for printing) at a relatively slower speed (commensurate with printer requirements), and with less control logic, by using the slower memory access rate.

The printer modules PM*l*–PM*m*, to be described in greater detail hereinafter in connection with FIG. 13, process the various message characters received from the printer module multiplexers 22 to cause the appropriate ones of the printers P*l*–P*m* to print out the message characters in the desired manner. As will be readily apparent hereinafter, the printout of each message character from a register by a printer causes the character to be removed or extracted from the register, thereby leaving a vacant place in its stead. Thus, the memory storage unit 6 of FIG. 4 is "data dynamic." In accordance with the invention, as each message character is extracted from one of the registers Q0–Q3 and printed out, the START character, which is the first character extracted from a register, is placed by the printer module PM initiating the printout in the space in the register formerly occupied by the character which was printed out. As successive characters are removed from the register (or registers) by the printer module and printed out, the START character is caused successively to occupy the spaces in the register (or registers) formerly occupied by these characters. Thus, the START character is used as a "cursor" indicating that the next character to be printed follows it in the memory storage unit. The manner in which this START cursor operation takes place will be described in greater detail hereinafter. To write the START character into one of the registers Q0–Q3 of a memory module to replace a character caused to be printed out, the START character is applied to printer data inputs 25 of the several input data and printer data multiplexers 17 while, at the same time, a recirculation control signal is applied by the printer module to printer recirculation control inputs 26 of the input data and printer data multiplexers 17. At this time, however, only one of the registers in the memory and only one of the input data and printer data multiplexers 17 is enabled, namely, the register from which characters are being extracted and into which it is desired to place the START character and the multiplexer 17 associated with that register. As a result, the printer recirculation control signal causes the recirculation path associated with this register to be broken within the input data and printer data multiplexer 17 and the START character is then caused to be applied by the multiplexer 17 to the input 13 of the selected register and stored within the register.

The enabling of the input data and printer data multiplexers 17 and their associated registers Q0–Q3 to write START characters into the registers during START cursor operations, such as briefly described hereinabove, is accomplished by means of free-running PMEN0–PMEN7 and MQ0–MQ3 enabling signals (as are also employed by the printer module multiplexers 22) applied to the input data and printer data multiplexers 17. A different one of the PMEN0–PMEN7 enabling signals is applied to each of the input data and printer data multiplexers 17 to enable that multiplexer, as indicated in FIG. 4, and each of the PMEN0–PMEN7 enabling signals is accompanied by a set of MQ0–MQ3 enabling signals for enabling in succession the registers Q0–Q3 associated with that multiplexer.

As messages are extracted from the various memory modules MM0–MM7 and printed out by the appropriate ones of the printers P*l*–P*m*, as mentioned hereinbefore, growing areas of empty spaces are caused to develop in the memory modules MM0–MM7. As these growing areas of empty spaces develop, the aforementioned space availability arrangement 55 (FIG. 6) detects these areas by examining the output signals of the various printer module multiplexers 22. As discussed briefly hereinabefore, at such time as a determination is made by the space availability arrangement 55 that sufficient contiguous empty space exists in the memory modules MM0–MM7 to store a message having a length up to the maximum permissible length (e.g., 1,920 characters) a signal (ALLOW) is sent by the space availability arrangement 55 to the display controller 2 to signal the display controller 2 to send another message to the printer controller 5 to be stored in one or more registers Q0–Q3 of the memory modules MM0–MM7. In performing its operations, the space availability arrangement 55 makes use of a signal from each of the memory modules in the system indicating that the memory module is physically present in the system. This signal, designated generally as MM*n*P, is produced by a memory module presence indicator 24 provided in each memory module physically present in the system at such time as the memory module is actually placed in the system. The significance of these "memory presence" signals will be fully apparent hereinafter.

When a new message is sent by the display controller 2 in response to an ALLOW signal from the space availability arrangement 55, the exact location of the empty area in the memory modules MM0–MM7 within which the message is to be stored must be ascertained. This function is performed by a search and write unit 155 (FIG. 10) of the input module IM in conjunction with the aforemenitoned input module multiplexers 23. The input module multiplexers 23 operate to receive the various message characters clocked to the several outputs 14 of the registers Q0–Q3 of the memory modules MM0–MM7 and to transfer this information to the aforementioned search and write unit 155 to be examined thereby to locate where a particular message from the display controller 2 is to be stored. The abovementioned transfer of characters to the search and write unit 155 is accomplished by means of IMEN0–IMEN7 and IQ0–IQ3 enabling signals (as are also employed by the input data and printer data multiplexers 17). The IMEN0–IMEN7 signals are applied in succession to the input module multiplexers 23 to enable the input module multiplexers 23 in succession and, as each of the multiplexers 23 is enabled, the register Q0–Q3 associated therewith are caused to be enabled in succession by a set of the IQ0–IQ3 enabling signals. The abovementioned search and write unit 155 will be described in detail hereinafter.

The message characters appearing at the output of the input module multiplexers 23 are also employed in the input module IM, specifically, in an error conditions unit 210 [(FIGS. 11(a) and 11 (b) ], for causing the erasure from the memory module registers of any part of a stored message deemed to be in error, either due to a message "overflow" condition (in which the length of a given message exceeds the maximum permissible length) or due to a parity error from the computer 3, this latter conditon being signalled by the aforementioned "MINER" signal. The above erasure operations will be described in detail hereinafter.

Each character of a message stored in a register comprises twelve parallel bits (see FIG. 9). To simplify the drawing, the inputs, outputs, etc. of the various components of FIG. 4 have been marked by the symbol ⑫ to indicate the presence of 12 lines for handling the 12-bit characters.

TIMING AND CONTROL UNIT — FIG. 5

FIG. 5 illustrates the aforementioned timing and control unit 30 provided within the input module IM.

All timing for the printer controller 5 of the invention originates from a crystal-controlled oscillator 31. The crystal-controlled oscillator 31 produces a succession of pulses which are applied to a pulse generator 32. The pulse generator 32 operates in response to the pulses from the oscillator 31 to generate successive cycles of timing pulses T1–T12. One cycle of timing pulses T1–T12 is produced during the time of each character sent to the printer controller 5 by the display controller 2. The timing pulses T1–T12 are employed to control the timing of various ones of the electrical components of the system (e.g., logic circuits, flip-flops, counters, and registers) and also to derive other pulses to be used for timing, clocking, and synchronization purposes, as will be described hereinbelow.

The T1 timing pulses produced by the pulse generator 32 are applied to a character counter 33. The character counter 33 counts these T1 pulses and produces an output signal each time that a count of 512 is reached. This 512 count corresponds to the aforementioned number of characters that may be stored in any one of the registers Q0–Q3 employed in the memory storage unit 6 of FIG. 4. Each of the 512-count output signals produced by the character counter 33 is applied to a memory quadrant counter MQC. The memory quadrant counter MQC is arranged to be clocked by the 512-count output signals produced by the character counter 33 at such times as operations are being performed in the memory storage unit 6 (e.g., loading or erase operations). The performance of the above operations is indicated by an INLOOK signal produced by a logic circuit 35. The INLOOK signal is caused to be produced by the logic circuit 35 when certain critical flip-flops employed in the system [IWREC flip-flop 162, FIG. 10, LOCATE flip-flop 223, FIG. 11(b), and MINERP flip-flop 219, FIG. 11(a)] are operated in their set states, as will be described in detail hereinafter. The memory quadrant counter MQC is employed in accordance with the invention with a memory quadrant register MQR and a multiplexer 36 for producing the aforementioned enabling signals IMEN0–IMEN7 and IQ0–IQ3 for use in accessing the various registers of the memory storage unit 6. Before the loading of a message into the memory storage unit 6, the contents, or addresses, of the memory quadrant counter MQC and the memory quadrant register MQR are the same. These addresses are used by the multiplexer 36 to produce the appropriate combinations of the IMEN0–IMEN7 and IQ0–IQ3 enabling signals for addressing the particular memory modules of the memory storage unit 6 where a loading operation is to be initiated. As a loading operation takes place, the contents, or address, of the memory quadrant counter MQC changes, due to the aforementioned clocking of the memory quadrant counter MQC by the 512-count signals produced by the character counter 33 and due to the INLOOK signals produced by the logic circuit 35. The changes in the address of the memory quadrant counter MQC causes the multiplexer 36 to produce the appropriate ones of the IMEN0–IMEN7 and IQ0–IQ3 enabling signals required to accomplish the loading operation. As the above address changes take place with respect to the memory quadrant counter MQC, the address of the memory quadrant register MQR remains the same. Therefore, the memory quadrant register MQR is used to maintin the address of the starting point of the loading of a message into the memory storage unit 6 and the memory quadrant counter MQC is used to maintain an up-to-Date address of the memory module and quadrant (i.e., register) where the most recent character of a message has been loaded.

At various times in the operation of the printer controller 5 of the invention, specifically, in loading and erase operations, it becomes necesary to update the address of the memory quadrant register MQR with the address in the memory quadrant counter MQC. Similarly, it is sometimes necessary that the address of the memory quadrant register MQR be used in the memory quadrant counter MQC for accessing the memory storage unit 6. To accomplish a transfer of the address of the memory quadrant counter MQC to the memory quadrant register MQR, a signal, designated MQC → MQR, is applied to the memory quadrant register MQR; similarly, to accomplish a transfer of the address of the memory quadrant register MQR to the memory quadrant counter MQC, a signal, designated MQR → MQC, is applid to the memory quadrant counter MQC. It also becomes necessary at different times to select between the addresses of the memory quadrant counter MQC and the memory quadrant regiser MQR for deriving the necessary IMEN0–IMEN7 and IQ0–IQ3 enabling signals for accessing the memory storage unit 6. For example, in performing certain memory operations with respect to an EOT (END-OF-TRANSMISSION) character [see FIGS. 3(a) and 3(b)], the multiplexer 36 uses the address of the memory quadrant register MQR. This condition is indicated to the mutiplexer 36 by the set condition of a REOT flip-flop 192 (see FIG. 10) employed in EOT memory operations. At other times, that is, when the REOT flip-flop 192 is not set, the multiplexer 36 uses the address of the memory quadrant counter MQC for deriving the necessary IMEN0–IMEN7 and IQ0–IQ3 enabling signals for accessing the memory storage unit 6.

The memory quadrant counter MQC may also receive a MOR (Memory Out of Range) signal. The purpose of this signal will be explained hereinafter.

The various operations involving the memory quadrant counter MQC and the memory quadrant register MQR will be explained in greater detail hereinafter.

Each 512-count output signal produced by the character counter 33 is also applied to a four-quadrant counter 34. The four-quadrant counter 34 is arranged to produce an output signal each time that the character counter 33 has counted to 512. The four-quadrant counter 34 has a maximum count of 4, corresponding to the four registers (or "quadrants") Q0–Q3 employed in each of the memory modules MM0–MM7. Several cycles or sets of output signals are produced in succession by the four-quadrant counter 34, each set being designated as MQ0–MQ3 in FIG. 5. These signals are applied to the various printer module multiplexers 22 and to the input data and printer data multiplexers 17 (FIG. 4) provided in the memory modules MM0–MM7. As mentioned previously, these signals MQ0–MQ3 are employed as enabling signals to control the transfer of message characters from the various registers Q0–Q3 associated with the printer module multiplexers 22 to the printer modules PM*l*–PM*m* and to the space availability arrangement 55 and also as enabling signals to control the wiring of START (cursor) characters from the various printer modules PM*l*–PM*m* into the registers Q0–Q3. The successive sets of MQ0–MQ3 signals are also applied to a printer memory enable generator 37 and to a memory cycle counter 38.

The printer memory enable generator 37 operates in response to a predetermined number of sets of the signals MQ0–MQ3, specifically, eight sets, to produce a cycle of eight enabling signals, designated PMEN0–PMEN7. A different one of the enabling signals PMEN0–PMEN7 is initiated each time that the four-quadrant counter 34 starts a new count of 4. During each PMEN signal, a set of MQ0–MQ3 signals is produced by the four-quadrant counter 34. In accordance with the invention, eight enabling signals are produced by the printer memory enable generator 37 to correspond to the number of memory modules employed in the particular memory storage unit 6 shown in FIG. 4, that is, eight. Even if a smaller number of memory modules were to be employed in a given printer controller application, the printer memory enable generator 37 would still be used to produce all eight enabling signals, to permit a user to expand the number of memory modules in the printer controller at a later data should he so desire. The manner in which the "unused" enabling signals are processed in a printer controller having less than the maximum number (eight) of memory modules will be described hereinafter.

As described hereinbefore, the various enabling signals PMEN0–PMEN7 produced by the printer memory enable generator 37 are applied in succession to the printer module multiplexers 22 and to the input data and printer data multiplexers 17 and employed together with enabling signals MQ0–MQ3 to control the transfer of message characters from the various register Q0–Q3 to the various printer modules PM*l*–PM*m* (FIG. 13) and to the space availability arrangement 55 (FIG. 6) and also to control the loading of START (cursor) characters into the various register Q0–Q3. PMEN0 signals are also used for several other purposes, as will be described in detail hereinafter.

The memory cycle counter 38 operates in response to the successive sets of the signals MQO–MQ3 produced by the four-quadrant counter 34 to count these signals, over a count range of 0–16, and to produce output signals after each count of 8 and after each count of 16. After each count of 8, an ACKCLK (*ACK*nowledge *CL*oc*K*) flip-flop 39 is set and after each count of 16 a STCLK (*ST*art *CL*oc*K*) flip-flop 40 is set. In response to each count of 8 of the memory cycle counter 38, an ACKCLK signal is produced by the ACKCLK flip-flop 39 and, in response to each count of 16 of the memory cycle counter 38, a STCLK signal is produced by the STCLK flip-flop 40. By virtue of using the 8 and 16 counts of the memory cycle counter 38, the ACKCLK and STCLK signals are established to be displaced in phase by 180°. The ACKCLK flip-flop 39 is reset at T3 and the STCLK flip-flop 40 is reset by a count of 64 produced by the character counter 33. This count of 64 of the character counter 33 and the 0–16 count range of the memory cycle counter 38 are selected to achieve the particular form and relationship of the STCLK and ACKCLK signals. The STCLK and ACKCLK signals are utilized by the printer modules PM*l*–PM*n*, (see FIG. 13), as will be described in detail hereinafter. A PM timing signal (270$\mu$s clock), also produced by the character counter 33, is also used by the printer modules PM*l*–PM*n*, as will be described hereinafter. A significant advantage of generating the STCLK and ACKCLK signals in the timing and control unit 30 of FIG. 5 in accordance with the invention in that all of the printers P*l*–P*m* employed in the system may be driven from a single timing source, thereby eliminating the need for a separate timing circuit in each of the printer modules PM*l*–PM*m*.

The timing pulses T2 produced by the pulse generator 32 are applied to a clock flip-flop 44. The clock flip-flop 44 is toggled by the timing pulses T2 to produce the aforementioned INPCLK1 and INPCLK2 signals in alternation. As mentioned previously, the INPCLK1 and INPCLK2 signals are used to control the clock pulse generators 12 (FIG. 4) to cause the clock pulse generators 12 to produce clock signals for clocking message characters along the various registers Q0–Q3 provided in the memory storage unit 6.

Each timing pulse T12 produced by the pulse generator 32 during each cycle of T pulses is applied to a T12T2 flip-flop 46. This timing pulse sets the T12T2 flip-flop 46 and causes it to initiate an output pulse T12T2 at a time T12. The T12T2 pulse is terminated at a time T3 by resetting the T12T2 flip-flop 46 with a T3 timing pulse produced by the pulse generator 32. T12T2 pulses produced in the above fashion are employed in the system by a loading logic circuit 75 [FIGS. 7(a) and 7(b)] for performing various timing operations relative to the processing of messages prior to being loaded into and stored in the memory storage unit 6. The loading logic circuit 75 will be described in detail hereinafter.

The timing and control unit 30, in addition to establishing the internal timing pulses T1–T12 and T12T2, as described above, also establishes synchronization between these timing pulses and the timing of the display controller 2. This synchronization is achieved by means of various ones of the timing pulses T1–T12 and by means of DCCLK (*D*isplay *C*ontroller *CL*oc*K*) signals produced by the display controller 2. During the time of each message character sent by the display controller 2 to the printer controller 5, a DCCLK signal is applied to a DCCLK (*D*isplay *C*ontroller *CL*oc*K*) flip-flop 47. The DCCLK flip-flop 47 is set by this DCCLK signal. At a time T12, the set condition of the DCCLK flip-flop 47 causes a CTIM (*C*ontroller *TIM*ing) flip-flop 48 to be set by means of a logic circuit 49. The CTIM flip-flop 48, when set, produces an output signal which is applied to one input of each of a plurality of logic circuits 50. The timing pulses T1–T8 and T12 are applied to different ones of the logic circuits 50 via second inputs to the logic circuits 50. As a result, the logic circuits 50 produce a succession of CT output pulses CT1–CT8 and CT12. These pulses, which are now synchronized with the T1–T8 and T12 pulses, are also employed in the system for performing timing operations relative to the processing of messages prior to being loaded into and stored in the memory storage unit 6.

Two of the CT pulses produced by the logic circuits 50 during each CT cycle, namely, the CT12 and CT3 pulses, are employed for respectively setting and resetting a CT12CT2 flip-flop 52. When set (at CT12), the CT12CT2 flip-flop 52 initiates an output pulse CT12CT2; the CT12CT2 pulse is terminated when the CT12CT2 flip-flop 52 is reset (at CT3). CT12CT2 pulses produced in the above manner are, like the T12T2 pulses and the CT cycle pulses, employed in the system for performing timing operations relative to the processing of messages prior to being loaded into and stored in the memory storage unit 6. Each CT timing cycle as described above is terminated by resetting the CTIM flip-flop 48 by a T9 timing pulse and by resetting the DCCLK flip-flop 47 by a CT2 timing pulse.

The timing and control unit 30 of FIG. 5 also includes an initialization control 54. The initialization control 54, which is connected to the PMENO output of the printer memory enable generator 37, is used to initialize the printer controller 5. As system power is turned on, the initialization control 54 produces a first output signal for resetting various logic elements employed in the printer controller 5 such as flip-flops, registers and counters. When the first one of the PMENO signals (designated PMENO-1 in FIG. 5) is produced by the printer memory enable generator 37, after resetting the above-mentioned logic elements, the initialization control 54 produces a second output signal for erasing the memory modules MMO–MM7 provided in the memory storage unit 6. The erasure of the memory modules MM0–MM7 is accomplished simply by applying the second output signal produced by the initialization control 54 to the recirculation control inputs 19 of the various input data and printer data multiplexers 17 (FIG. 4). This output signal breaks recirculation of the registers Q0–Q3 provided in the memory modules MM0–MM7 with the result that the registers Q0–Q3 are placed in a reset condition. After the registers Q0–Q3 in the memory modules MM0–MM7 have been reset, the next PMENO signal (designated PMENO-2 in FIG. 5) produced by the printer memory enable generator 37, indicating the beginning of the first memory module MM0, causes the initialization control 54 to produce a special reference control bit, designated a reference LC (*L*ast *C*haracter) bit to be entered into the first character-storage position of the first register (or quadrant) Q0 of the first module MM0. Specifically, a memory bit *b*11 (see bit position *b*11 of FIG. 9) is set in this first character-storage position to represent the reference LC bit. As in the case of entering message characters into a memory module, the reference LC bit is entered into the first character storage position of the first memory module MM0 via the data input 18 of the input data and printer data multiplexer 17 associated with the memory module, while at the same time, recirculation of the register Q0 of the memory module is broken via the recirculation control input 19. As will be described in detail hereinafter, the reference LC bit is employed by the space availability arrangement 55 (FIG. 6) in the performance of its operations for determining whether an ALLOW signal should be sent to the display controller 2 to signal the display controller 2 to send a message to be stored in memory. The reference LC bit may then be used for data loading operations and also later for data erase operations (if necessary). Although it is preferred that the reference LC bit is placed in the first character-storage position of the first register Q0 (or "quadrant") of the first memory module MM0, as discussed above, it is also possible, by the selection of a different PMEN signal, to place the LC bit at any character-storage position within any one of the registers Q0–Q3 of any one of the memory modules MM0–MM7.

When no initialization operations are being performed by the initialization control 54, an output signal $\overline{INIT}$ is produced by the initialization control 54. This signal is employed by the space availability arrangement 55 (FIG. 6) as will be described hereinafter.

SPACE AVAILABILITY ARRANGEMENT (FIG. 6)

Figures 6A, 6B, 6C:
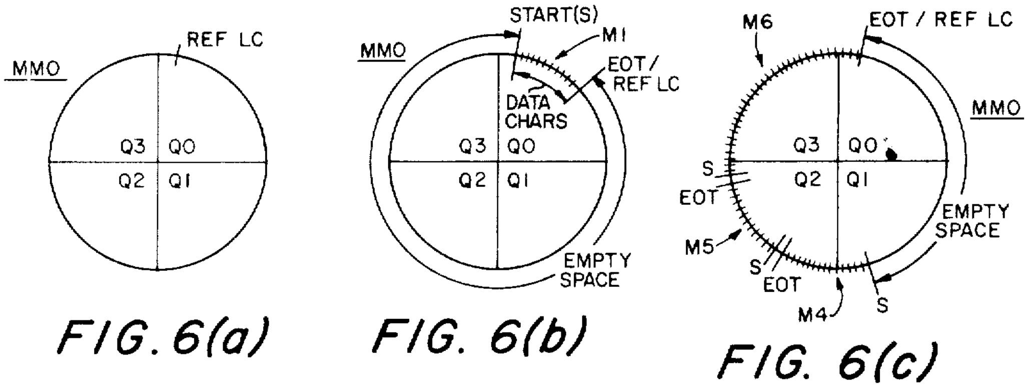
FIGS. 6*a* – 6*c* are pictorial aids which are useful in understanding the operation of the space availability arrangement of FIG. 6.

FIG. 6 illustrates the aforementioned space availability arrangement 55 provided in the input module IM in accordance with the invention. The purpose of the space availability arrangement 55, as stated hereinbefore, is to determine whether sufficient contiguous empty space exists in the registers of the memory modules MM0–MM7 for storing messages originating from the computer 3 or from one of the video display terminals VMl–VMn and each having a length up to a maximum permissible length (e.g., 1,920 characters, although message lengths of 960, 480, and 240 characters are also possible). In the event sufficient contiguous empty space is deemed to exist in one or more of the registers of the memory modules to store a message, an ALLOW signal is produced by the space availability arrangement 55 and applied to the display controller 2. The ALLOW signal enables the display controller 2 to transfer an available message to the printer controller 5 to be stored in the space in the register or registers of the memory modules as determined to be available by the space availability arrangement 55. The specific manner of operation of the space availability arrangement 55 will now be described. To simplify the following description, it is assumed that only a single memory module, specifically, the first memory module MM0, is present in the system and is to be examined by the space availability arrangement 55 to determine the existence of sufficient contiguous empty space for storing a message. The selection of the first memory module MM0 for the purposes of the following discussion will also permit a discussion of the manner in which the space availability arrangement 55 operates to generate an ALLOW signal following the placement of a reference LC bit (memory bit b11) in the first character-storage position of the first register (or quadrant) Q0 of the first memory module MM0 as a result of the aforedescribed initialization sequence. FIGS. 6(a)–6(c) illustrate typical conditions of the registers (or quadrants) Q0–Q3 of the memory module MM0 at different times during the course of its operation.

In FIG. 6(a), the memory module MM0 is shown in its initial operating condition in which it contains no messages therein. Only the reference LC bit (memory bit b11) is stored therein, in the first register Q0 (or quadrant), as previously established therein by the initialization control 54 (FIG. 5) as part of the overall initialization sequence for the printer controller 5. Since no message is in the memory module MM0 and space is clearly available for a message, it is required that an ALLOW signal be produced by the space availability arrangement 55. To accomplish this, a BEMP (*B*uffer *EMP*ty) flip-flop 56 is operated in a reset condition by a PMEN0 signal from the printer memory enable generator 37 (FIG. 5). When in the reset condition, the BEMP flip-flop 56 produces an ALLOW signal which is sent to the display controller 2. The display controller 2 operates in response to this ALLOW signal to send a message (originating from the computer 3 of from one of the video display terminals VM*l*–VM*n*) to be stored in the memory module MM0. Since the memory module MM0 has a typical capacity (e.g., 2,048 characters) greater than the maximum permissible length of a message from the display controller 2 (e.g., 1,920 characters), the message from the display controller 2 is readily loaded into and stored in the module MM0. This loading function is performed by the aforementioned loading logic circuit 75, FIGS. 7(a) and 7(b).

FIG. 6(b) depicts the conditions of the registers Q0–Q3 of the memory module MM0 after a typical initial message, designated M1, has been stored in the memory module MM0 and prior to that message being printed out. The message M1 includes a START character having an S bit (bit *b*9), DATA characters, and an EOT (END-OF-TRANSMISSION) character. The EOT character also has a reference LC bit (memory bit *b*11) appended to it. It is to be noted that the position of this reference LC bit differs from that shown in FIG. 6(a). This is due to the fact that the reference LC bit, as shown in FIG. 6(a), is caused to be "propagated" within the registers of the memory module MM0 as message characters are loaded into the registers. The specific manner in which a reference LC bit such as shown in FIG. 6(a) is propagated from one position to another position, such as shown in FIG. 6(b), will be described fully hereinafter in connection with the aforementioned loading logic circuit 75 of FIGS. 7(a) and 7(b) and also in connection with the search and write unit 155 of FIG. 10. After the message M1 has been stored in the memory module MM0, a determination is made by the space availability arrangement 55 as to whether a new message may be stored in the memory module MM0, (and other memory modules MM1–MM7, if present), following the initial message M1. This determination is accomplished by the space availability arrangement 55 by detecting the presence of the reference LC bit in the memory module MM0 and then counting the character positions following the reference LC bit and preceding an S bit (memory bit b9) of a START character. In the event 1,920 character positions are counted by the space availability arrangement 55 before reaching the START character position, the character position counting is terminated and an ALLOW signal is produced by the space availability arrangement 55 and sent to the display controller 2 when the START character position is finally reached. This ALLOW signal enables the display controller 2 to transfer a new message to be stored in the memory module MM0 (and other memory modules MM1–MM7, if present). If the START character position is reached before counting 1,920 character positions, no ALLOW signal is produced by the space availability arrangement 55, thereby indicating that insufficient memory space exists for a message. It is to be noted that in the case depicted in FIG. 6(b) in which only a single memory module (MM0) is employed in the system, all character-position counting takes place entirely within that module. The abovementioned ALLOW signal may or may not be produced by the space availability arrangement 55 depending on the length of the initial message M1 stored in the memory module MM0. If more than one memory module were employed in the system, as shown, for example, in FIG. 4, and with the START character in the first register Q0 of the memory module MM0, the reference LC bit and START character would be separated from each other through the character positions of the several memory modules and certainly would be separated by more than 1,920 character positions.

In the above-described operations, the reference LC bit (memory bit b11) is detected by an LC-bit detector 57. The LC-bit detector 57 is coupled to the outputs of the various printer module multiplexers 22 (FIG. 4) provided in the memory modules MM0–MM7 and therefore "sees" the same message characters as supplied to the printer modules PM*l*–PM*m* by the printer module multiplexers 22. When the LC-bit detector 67 "sees" the reference LC bit (derived from the register Q0 of the memory module MM0), this detection, together with certain other logic conditions, causes a CNTRALL (*Cou*N*T*e*R* *ALL*ow) flip-flop 59 to be set at T8, by means of a logic circuit 60. The abovementioned logic conditions are that no initialization operation is in progress, no "recovery" operation is in progress (due to error conditions), and no messages are in the process of being loaded into the memory module MM0. The lack of an initialization operation is indicated in FIG. 6 by an $\overline{\text{INIT}}$ input signal to the logic circuit 60 from the initialization control 54 (FIG. 5). The lack of a recovery operation and the lack of a message loading operation are indicated to the logic circuit 60 by the reset conditions of a RECOVER flip-flop 242 [FIG. 11(a)] and a LIP (*L*oad *I*n *P*rogress) flip-flop 83 [FIG. 7(a)]. The latter-mentioned flip-flops and their operation will be described in detail hereinafter.

When set, the CNTRALL flip-flop 59 enables a buffer space counter 62. The buffer space counter 62 is arranged to count the character positions following the reference LC bit. The conditions for allowing the buffer space counter 62 to count character positions are that the CNTRALL flip-flop 59 be set and that an MIR (*M*emory *I*n *R*ange) signal be present. An MIR signal is produced by a logic circuit 63 whenever a memory module is present in the system and a corresponding one of the PMEN0–PMEN7 signals is produced by the printer memory enable generator 37 (FIG. 5). Thus, if eight memory modules are employed in a given system, as shown, for example, in FIG. 4, an MIR signal is present for the entire time duration of the PMEN0–PMEN7 signals. If only a single memory module is employed in the system, as assumed for the present discussion relative to FIG. 6, an MIR signal is present only during the time of the PMEN0 signal and is suspended during the time of the subsequent PMEN1–PMEN7 signals. (It may be recalled that all of the PMEN0–PMEN7 signals are produced by the printer memory enable generator 37 irrespective of the number of memory modules, up to a total of eight, employed in the system). The presence of a memory module within the system is indicated to the logic circuit 63 by means of a memory module present signal MMnP produced by a memory module presence indicator 24, FIG. 4, provided in the memory module.

With the aforementioned MIR signal present and the CNTRALL flip-flop 59 set, the buffer space counter 62 is clocked, via a logic circuit 64, to increase its count by one at every T7. Each incrementing of the buffer space counter 62 at T7 while the MIR signal exists therefore corresponds to one character position. When the MIR signal is not present (that is, suspended, due to memory modules not present in the system), the buffer space counter 62 is inhibited from counting by the logic circuit 64, thereby preventing the buffer space counter 62 from including this "dead" time in its count and causing a false ALLOW signal to be produced. The counting by the buffer space counter 62 is allowed to resume when the MIR signal is again present.

The abovedescribed counting by the buffer space counter 62 continues until either 1,920 character positions have been counted or the START character has been detected. In the event the buffer space counter 62 counts to 1,920 character positions before the START character has been detected, an output signal is produced thereby and applied to the logic circuit 64 to inhibit the T7 pulses. This inhibiting of the T7 pulses, like the absence of an MIR signal, suspends the counting by the buffer space counter 62. The count of the buffer space counter 62 is subsequently transferred to an allow register 66 when the START character has been detected. The abovementioned detection of the START character is accomplished by a START S-bit detector 67. The START S-bit detector 67, like the LC-bit detector 57, is coupled to the outputs of the various printer module multiplexers 22 (FIG. 4) and "sees" the various message characters, including the START character, supplied by the printer module multiplexers 22 to the printer modules PM*l*–PM*m*. When the START S-bit detector 67 "sees" the START character, it detects the S bit (bit *b*9, FIG. 9) in the START character and produces an output signal. At T4, a logic circuit 68 causes the output signal produced by the START S-bit detector 67 to enable the aforementioned allow register 66 to receive the count (1,920) earlier established in the buffer space counter 62. At T5, with an output signal present from the START S-bit detector 67 and with an MIR signal present, the buffer space counter 62 is reset by means of a logic circuit 71. The CNTRALL flip-flop 59 is also reset at T5 by the logic circuit 71. A message-size program control 69, which is programmed to produce an output ALLOW signal only when the allow register 66 contains a 1,920 character position count, then detects the 1,920 count in the allow register 66 and thereupon produces an ALLOW signal. The ALLOW signal is sent to the display controller 2 to permit the transfer of another message.

In the event that the buffer space counter 62, in performing its character-position counting operations, as described above, does not reach a count of 1,920 before the START character is detected (by the START S-bit detector 67), the count then present in the buffer space counter 62 is transferred by the logic circuit 68, at T4, to the allow register 66. The buffer space counter 62 and the CNTRALL flip-flop 59 are reset at T5 (by the logic circuit 71) and, at that time, the message-size program control 69 examines the count then present in the allow register 66. Since the count in the allow register 66 at this time is less than 1,920, and ALLOW signal is not produced by the message-size program 69. The lack of an ALLOW signal from the message-size program control 69 is treated as a BUSY signal (printer controller busy signal) for preventing the initiation of the transfer of a new message from the display controller 2. The allow register 66 is updated by increasing counts of the buffer space counter 62 (caused by the extraction of data by the printer modules PM*l*–PM*m*) and an ALLOW signal is generated after sufficient empty space has been determined to exist.

The aforedescribed detection by the START S-bit detector 67 of the S bit in the START character also causes a STDET (*ST*art *DET*ect) flip-flop 70 to be set. The state of the STDET flip-flop 70 is transferred to the BEMP flip-flop 56. The BEMP flip-flop 56 produces an ALLOW signal independently of the allow register 66 when the STDET flip-flop 70 is not set, since this indicates that no S bits (hence, no messages) are in the memory and the memory is deemed to be empty. The BEMP flip-flop 56 is therefore essentially a "backwards" flip-flop, as it is active when no START character is in a memory module (MM0 in the present example) and inactive when a START character is in a memory module. The STDET flip-flop 70 is reset at every PMEN0 signal (corresponding to the beginning of the memory module MM0) produced by the printer memory enable generator 37.

FIG. 6(*c*) illustrates the condition of the memory module MM0 after several typical messages, designated M4–M6 have been stored therein and after an empty space has developed therein (as a result of one or more messages having been removed and sent to selected one of the printers P*l*–P*m*). The contiguous empty space in the memory module MM0 is between the reference LC bit and the next START character (looking at the memory module MM0 "clockwise" sequential). The space availability arrangement 55, as in the previous examples, operates to determine whether this empty space is sufficient to store 1,920 characters. Thus, the space availability arrangement 55 operates to count the number of character positions between (but not including) the reference LC bit and the next START character position. It then examines that count and determines whether it is sufficient to generate an ALLOW signal.

As stated previously, as the characters of a message are extracted from a particular memory module to be printed out, a START character is placed in the memory module and caused to move through the memory module as a "cursor" character. This propagatior of the START character causes the space or "distance" between itself and the reference LC bit to increase. In this case, the space availability arrangement 55 monitors the increases in the number of character positions between the reference LC bit and START character and permits an ALLOW signal to be produced (if one has not already been produced) at such time as 1,920 character positions have been counted and detected by the message-size program control 69. This operation of the space availability arrangement 55 therefore occurs in real time.

LOADING LOGIC CIRCUIT — FIGS. 7(a) AND 7(b)

FIGS. 7(*a*) and 7(*b*), when placed side by side [FIG. 7(*b*) to the right of FIG. 7(*a*)], illustrate the aforementioned loading logic circuit 75 provided in the input module IM in accordance with the invention. The loading logic circuit 75 is arranged to receive messages from the display controller 2, such as shown in FIGS. 3(*a*) and 3(*c*), and to process the characters of these messages into a form such as shown in FIG. 9 for loading into the registers Q0–Q3 of the various memory modules MM0–MM7. The messages are received from the display controller 2 as a result of ALLOW signals having been sent to the display controller 2 by the space availability arrangement 55 of FIG. 6, as described hereinbefore.

The loading logic circuit 75 includes an input data register 76, a static buffer 77, and an output data register 78. The static buffer 77 further comprises a pair of registers 79, designated hereinafter as half slots 1 and 2. Message characters from the display controller 2 are received and stored in succession in the input data register 76, processed therein, and then selectively loaded and stored in the half slots 1 and 2. The input data register 76 typically has a storage capacity of one character. The half slots 1 and 2 are each arranged to store a fixed number of characters processed in the input data register 76, for example, up to 100 characters each. The half slots 1 and 2 are also arranged to be loaded and unloaded in alternation. That is, as characters from the input data register 76 are loaded into one of the half slots, the other half slot unloads its contents into the output data register 78, and vice versa. The number of characters loaded into either one of the half slots is counted by means of an intake counter 80 which is clocked by a clocking and inhibit logic circuit 81 each time that a character is loaded into one of the half slots. The characters received by the output data register 78 are further processed therein before being applied to the appropriate register or registers of the memory modules MM0–MM7 to be stored therein. The output of the output data register 78 is connected to the inputs 18 of the various input data and printer data multiplexers 17 (FIG. 4) provided in the memory modules MM0–MM7. The output data register 78 has a typical storage capacity of one character.

The manner in which the various characters comprising a message produced by the display controller 2 and originating from the computer 3 or from one of the video display terminals VMl-Vmn are processed in the loading logic circuit 75 will now be described in detail.

a. START character

The START character, as shown in FIG. 3(b), is loaded into the input data register 76 on the leading edge of a CT4 pulse (from the timing and control unit 30, FIG. 5). When in the input data register 76, the S bit [(bit b9, FIG. 3(b)] of the START character is detected by a START S-bit detector 82. The detection of this S bit initiates all loading operations for the message of which the START character is the first character. At CT6, the detection of the S bit by the START S-bit detector 82 causes the aforementioned LIP (*L*oad *I*n *P*rogress) flip-flop 83 to be set by means of a logic circuit 84. The set condition of the LIP flip-flop 83 causes the operation of the buffer space counter 62 of FIG. 6 to be inhibited (via the logic circuit 60, FIG. 6), thereby inhibiting the generation of an ALLOW signal. The space availability arrangement 55 of FIG. 6 therefore sends a BUSY signal to the display controller 2 at this time. The LIP flip-flop 83 remains set (and an ALLOW signal is inhibited) until a message (including the START character, DATA characters, and the EOT character) has been fully loaded into the appropriate register or registers of the memory modules MM0–MM7. During the processing of the START character by the START S-bit detector 82, parity-checking operations are not performed (parity operations being performed only with respect to DATA characters). For this reason, a parity check circuit 85, which is employed for performing parity-checking operation on DATA character, is caused to be inhibited by the START S-bit detector 82.

At CT6, while the START character is in the input data register 76, a mode latch circuit 86 is loaded with the mode bits ***b*1 and *b*2 included in the START character. These mode bits *b*1 and *b*2 are used, together with FT and FE bits [FIG. 3(b)], to control the loading of DATA characters into the half slots 1 and 2 during format mode operations, as will be described in detail hereinafter. The mode bits *b*1 and *b*2 remain in the mode latch circuit 86 until a new message has been received. The various modes possible in the present invention and the bit conditions (*b*1, *b*2) in the mode latch circuit 86** for the various modes are as follows:

| Mode Latch Circuit 86 *b*2 | *b*1 | Mode | Use |
|---|---|---|---|
| 0 | 0 | Print Normal (PN) | Non-formatted display or computer copy; COPY key of keyboard **8** (FIG. 1) depressed |
| 0 | 1 | Format Print Variables (FPV) | Formatted display; COPY and SHIFT keys of keyboard **8** (FIG. 1) depressed |
| 1 | 0 | Format Print All (FPA) | Formatted display; SHIFT key of keyboard **8** (FIG. 1) depressed |

The mode bits ***b*1 and *b*2 are prohibited from entering a half slot from the input data register 76 by the START S-bit detector 82 and by means of a logic circuit 87.**

After the START character has been completely processed in the input data register 86, as described above, it is loaded into one of the half slots 1 and 2. The particular half slot into which the START character is to be loaded is determined by a HS (*H*alf *S*lot) flip-flop 88 which controls the loading and unloading operations of both half slots 1 and 2. Initially, that is, before any characters have been loaded into either half slot, the HS flip-flop 88 is in a reset condition, as established during the aforedescribed initialization sequence. With the HS flip-flop 88 in its reset condition, the half slot 2 is established as the first half slot to be loaded with characters, including the START character. The actual loading of the START character into the half slot 2 is accomplished by the application of a clock signal to the half slot 2 during the next CT cycle. At this time (CT12CT2), the set condition of the LIP flip-flop 83 causes the clocking and inhibit logic circuit 81 to produce a clock signal HS Cp which is applied to and clocks the half slot 2. The clocking of the half slot 2 causes it to receive and store the START character. The intake counter 80 is also clocked at this time by an Intcntr Cp clock signal from the clocking and inhibit logic circuit 81, to register that the first character (START character) has been loaded into the half slot 2.

b. DATA Characters

Each DATA character (including a NEW-LINE character) is applied to and stored in the input data register 76 at CT4 of its associated CT cycle. A DATA character may or may not be loaded into one of the half slots 1 and 2. Whether a DATA character is to be loaded into one of the half slots is determined by the mode established for the message (by the FT, FE, ***b*1 and *b*2 bits) of which the DATA character is a part, as will be described hereinafter. In the event a determination is made to load a DATA character into a half slot, the actual loading is accomplished by the set condition of the LIP flip-flop 83 and the CT12CT2 pulse of the CT cycle following the loading of the DATA character into the input data register 76. These latter conditions cause the clocking and inhibit logic circuit 81 to produce a clock signal HS Cp to be applied to the half slot. The DATA character is then entered into the half slot. A clock signal Intcntr Cp is also produced by the clocking and inhibit logic circuit 81 under the above conditions for incrementing the intake counter 80** to register the insertion of the DATA character into the half slot.

In the event a particular DATA character has a parity error (not even parity) associated therewith, this condition is detected by the parity check circuit 85 and a special check character (actually a coded ASCII character for a quotation mark") is inserted by the parity check circuit 85 into the appropriate half slot in place of the character having the bad parity. This special check character is caused to be printed out by the appropriate printer as a quotation mark.

c. ETX, EOT Characters

Each ETX and EOT character is received in the input data register 76 and loaded into one of the half slots 1 and 2. The processing of each of these characters, particularly after being loaded into one of the half slots 1 and 2, differs from that of START and DATA characters, as will now be described.

As mentioned before, and as indicated in FIG. 3(b), an ETX character is employed to end each segment of a message originating from the computer 3. This ETX character may be received in the input data register 76 with any number of characters, up to 99, already present in a particular half slot (the capacity of the half slot being 100, as stated before). The receipt of the ETX character causes the characters in the half slot (including the ETX character as the last character in the half slot) to be clocked, or "compressed load," to the "bottom" of the half slot. This compressed loading operation is necessary inasmuch as characters in a half slot are not permitted to be applied to the output data register 78 until the intake counter 80 reaches a count of 100. The compressed loading operation is accomplished by means including an EOT/ETX decoder 90 and a COMPLD (*COMP*ressed *L*oa*D*) flip-flop 91.

The ETX character in the input data register 76 is detected by the EOT/ETX decoder 90. At this point, the processing of the ETX character and the associated data characters present in the half slot becomes dependent on T pulses rather than CT pulses. At T8, with the count of the intake counter 80 less than 100, the EOT/ETX decoder 90 causes the COMPLD flip-flop 91 to be set by means of a logic circuit 92. With the COMPLD flip-flop 91 in its set state, T12T2 pulses are applied to the clocking and inhibit logic circuit 81, and cause the clocking and inhibit logic circuit 81 to produce corresponding HS Cp clock signals and Intcntr Cp clock signals to respectively clock the appropriate half slot and the intake counter 80. As a result of the HS Cp clock signals produced by the clocking and inhibit logic circuit 81, the ETX character in the input data register 76, which is also present at the input of the appropriate half slot, is caused to be clocked into the half slot and compressed loaded (by one or more positions) with its associated characters. The trailing edge (T.E.) of each Inccntr Cp clock signal produced by the clocking and inhibit logic circuit 81 as the above compressed loading operation takes place is also applied to a CLR (*CL*ea*R*) flip-flop 93. The CLR flip-flop 93 is set by the EOT/ETX detector 90 upon detecting the ETX character in the input data register 76. When clocked by an Intcntr Cp clock signal from the clocking and inhibit logic circuit 81, the CLR flip-flop 93 causes the input data register 76 to be reset. Resetting of the input data register 76 causes a space character (Δ in coded form) to be automatically established therein. This space character serves to replace the ETX character in the input data register 76 with the result that one or more unwanted additional ETX characters are prevented from being loaded into the half slot behind the ETX character already present in the half slot. Instead, one or more space characters (due to the clocking of the CLR flip-flop 93 by the Intcntr Cp clock signals) are clocked into the half slot behind the ETX character in the half slot. The CLR flip-flop 93 is reset at T6.

The abovedescribed compressed loading operation continues until the intake counter 80 has reached a count of 100. The COMPLD flip-flop 91 is then reset on the next T3, via the logic circuit 92. At the termination of the compressed loading operation with respect to the above-described half slot, it then becomes necessary to prevent the space character in the input data register 76 from being applied to the other half slot, during the next CT cycle, and preceding or prefacing the next computer message segment or an EOT character, either of which may follow an ETX character. The space character is prevented from entering the next half slot during the next CT cycle by the EOT-/ETX decoder 90 and by an ETX flip-flop 95. The EOT/ETX decoder 90, upon detecting the ETX character in the input data register 76, causes the ETX flip-flop 95 to be set, at CT8, via a logic circuit 96. The setting of the ETX flip-flop 95 prevents the clocking and inhibit logic circuit 81 from producing an HS Cp clock signal and an Intcntr Cp clock signal for respectively clocking the appropriate half slot and the intake counter 81 on the next CT cycle. Accordingly, the space character in the input data register 76 is prevented form being applied to the next half slot.

An EOT character is processed in the same manner as an ETX character with the sole exception that the ETX flip-flop 95 and the associated logic circuit 96 are not used. As stated previously, an EOT character is the last character of a message originating from the computer 3 or from one of the video display terminals VMI–VMn. Whenever an EOT character is loaded from the input data register 76 into a half slot, with the count in the intake counter 80 less than 100, a compressed loading of the EOT character and its associated characters takes place, as with an ETX character, until the intake counter 80 is incremented to a count of 100. The CLR flip-flop 93 is operated in the same manner as with an ETX character and one or more spaces are caused to be loaded into the appropriate half slot behind the EOT character. Since an EOT character represents the end of a message, it is not necessary to prevent a space character from entering the next half slot during the next CT cycle. Therefore, the ETX flip-flop 95 and the associated logic circuit 96 are not needed and are not used at this time.

d. NEW-LINE Characters

Each NEW-LINE (NL) character received is applied to and stored in the input data register 76 at CT4 of its associated CT cycle. A NEW-LINE character applied to the input register 76 is never loaded into a half slot. Instead, a so-called "F" bit, designated as bit *b*10 and representing a "new line" operation, is added to the next DATA character. Should the next DATA character also be a NEW-LINE character, it is replaced by a space character (Δ) having an F bit, and an F bit is added to the next DATA character. By way of a simple example of how the above operations take place, an incoming message such as shown at the left below is converted for insertion into a half slot to a form such as shown at the right below.

| Incoming Message | Converted |
|---|---|
| A | A |
| NL | B with F bit |
| B | Δ (space) with F bit |
| NL | C with F bit |
| NL | |
| C | |

The six characters of the incoming message are, as a result of not storing NEW-LINE characters in a half slot, reduced to four characters in the half slot. The printout of such a message is the same as would be produced by prior art printout arrangements in which NEW-LINE characters are actually stored in memory prior to initiating a printout operation. Thus, in contradistinction with prior art printout arrangements, the new line operations of the present invention lead to a conservation of storage space and, therefore, more effective use of this storage space. In addition, the new line operations of the present invention also provide the additional advantage over new line operations of prior art printout arrangements of not requiring a decode of a new line character by each logic area which controls a printer. In accordance with the present invention, all characters between a START character and an END-OF-TRANSMISSION (EOT) character are printable.

The above new line operations are accomplished by using, inter alia, a new line decoder 104, a NL (*N*ew *L*ine) flip-flop 106, a MNL (*M*ultiple *N*ew *L*ine) flip-flop 107, and an IDRF (*I*nput *D*ata *R*egister *F* bit) flip-flop 108. The operation of the above-mentioned components may be readily understood by considering how new line operations are performed on the message of the above example (A, NL, B, NL, NL, C). The character A is entered initially into the input data register 76. It is then transferred to one of the half slots (at CT12CT2 of the next CT cycle) and the NL character is entered into the input data register 76. This NL character is decoded by the new line decoder 104 and, at CT7, the NL flip-flop 106 is caused to be set by means of a logic circuit 105. Setting of the NL flip-flop 106 prevents the clocking and inhibit logic circuit 81 from applying HS Cp and Intcntr Cp clock signals to the half slot and to the intake counter 80, respectively, thereby preventing the NL character from being loaded into the half slot on the next CT cycle and also preventing the intake counter 80 from being incremented on the next CT cycle.

The character B now overwrites the NL character in the input data register 76. At CT6, the set condition of the NL flip-flop 106 causes the IDRF flip-flop 108 to be set by means of a logic circuit 109. Setting of the IDRF flip-flop 108 indicates that a new line operation must take place and causes an F bit (bit *b*10) to be added to the character B in the input data register 76. At CT7, the NL flip-flop 106 is reset inasmuch as a NL character is no longer in the input data register 76 and a new line decode (by the new line decoder 104) no longer exists. On the next CT cycle (at CT12CT2), the character B, with the added F bit, is loaded into the appropriate half slot and the intake counter 80 is incremented (due to the LIP flip-flop 83 being set and causing the clocking and inhibit logic circuit 81 to produce HS Cp and Intcntr CP clock signals). The second NL character is then loaded into the input data register 76. Since the second NL character does not overwrite the F bit previously added to the character B, this F bit is cleared in the input data register 76 by resetting the IDRF flip-flop 108 at CT4. The NL flip-flop 106 is again set, at CT7, as a result of the new line decoder 104 having decoded the second NL character.

At CT4 of the next CT cycle, the third NL character overwrites the second NL character. The condition of the new line decoder 104 is unaltered by the placing of the third NL character into the input data register 76. At CT5, with a new line decode by the new line decoder 104 and with the NL flip-flop 106 in a set condition, the MNL flip-flop 107 is caused to be set by means of a logic circuit 110. At CT6, with the MNL flip-flop 107 set, the input data register 76 is caused to be reset by means of a logic circuit 112. As stated hereinbefore, resetting of the input data register 76 automatically causes a space character (Δ, in coded form) to be generated therein. Also, at CT6, the set condition of the MNL flip-flop 107 causes the IDRF flip-flop 108 to be again set, via the logic circuit 109, and to add an F bit to the space character in the input data register 76. At CT7, the NL flip-flop 106 is clocked and remains set. On the next CT cycle, the set condition of the MNL flip-flop 107 allows the clocking and inhibit logic circuit 81 to produce an HS Cp clock signal for clocking the space character with the F bit into the appropriate half slot, and to produce an Intcntr Cp clock signal for appropriately incrementing the intake counter 80.

At CT4 of the next CT cycle, the character C overwrites the third NL character in the input data register 76 and, also at CT4, both the MNL flip-flop 107 and the IDRF flip-flop 108 are reset. The resetting of the IDRF flip-flop 108 causes the F bit in the input data register 76, which was not overwritten by the character C, to be reset. At CT6, with the NL flip-flop 106 set, the IDRF flip-flop 108 is again set, via the logic circuit 109, and an F bit is added to the character C in the input data register 76. The NL flip-flop 106 is reset at CT7 inasmuch as a new line decode is no longer present. With the resetting of the NL flip-flop 106, normal loading (of the character C) resumes on the next CT cycle.

One remaining new line condition remains to be examined. When copying a non-formatted message displayed on a display surface 10 of one of the video display terminals VM1–VMn, that is, when in the Print Normal mode, it is not possible for the display controller 2 to send FT (Format Tab) or FE (Format Entry) bits to the input data register 76. It may be recalled from an earlier discussion that FT and FE bits are used in conjunction with the mode bits *b*1 and *b*2 for achieving formatted printouts ("Format Print All" and "Format Print Variable" modes of operation). However, under certain normal operating conditions, a message from the computer 3 may contain a special character, designated an END-OF-MESSAGE (EOM) character (indicating the end of a message), which causes the display controller 2 to insert an FT bit with the next data character for the purpose of effecting a new line operation, in preparation for a new message sent during the same transmission sequence. When this data character with the FT bit is received in the input data register 76, the FT bit is detected by an FT detector 113. At this time, the mode bits b1 and b2 (in the mode latch circuit 86) are both 0, as a result of the START character for the computer message having its format mode bits *b*1 and *b*2 both 0. The FT detector 113 produces an output FT which, at CT6, causes the IDRF flip-flop 108 to be set by means of a logic circuit 114. Setting of the IDRF flip-flop 108, as in the previous example, indicates that a new line operation must take place and causes an F bit to be added to the character in the input data register 76. The above case is a special one and is the only one in which a format bit (FT) is sent by the display controller 2 to the input data register 76 in a Print Normal mode.

e. Print Normal (PN) Mode

In the Print (PN) Normal mode of operation, a message is printed out to correspond to non-formatted information as displayed on the display surface 10 of a video display terminal or information originating from the computer 3. As stated previously, non-formatted information may be defined for purposes of the present invention as information which is not in the nature of a form (e.g., an employment application form or a purchase order form). The Print Normal mode is initiated by depressing the COPY key of a keyboard 8 which causes a message, such as shown in FIG. 3(a) or FIG. 3(c), to be sent by the display controller 2 to the input data register 76 which corresponds to the information displayed on the display surface 10 of a video display terminal. A message in this mode may also be initiated by the computer 3 and contain information originating from the program being executed by the computer 3. The Print Normal mode is signified by the setting of both of the mode bits *b*1 and *b*2 of the START character included in the message to 0 [see FIG. 3(b)]. As previously described, these mode bits are caused to be applied to and stored in the mode latch circuit 86. They are then employed, as required, for the aforedescribed purpose of adding an F bit (new line bit) to a computer-text character present in the input data register 76. No other use is made of these mode bits in the performance of Print Normal operations.

f. Format Print Variables (FPV) Mode, [FIGS. 7(a), 7(b), 8(a) and 8(b)]

Figure 8A:
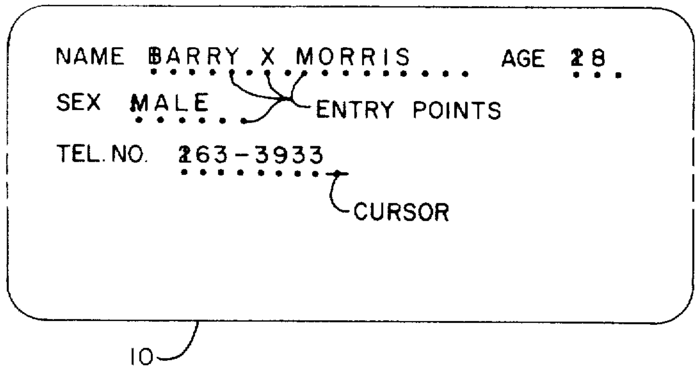
FIGS. 8*a* and 8*b* are pictorial representations of typical formatted displays, useful in understanding various format modes of operation of the data processing printout system of the invention.

As stated previously, in the Format Print Variables (FPV) mode of operation, a message is printed out by a printer to include only the variable-field information of form-type (formatted) information displayed on the display surface 10 of a video display terminal. In addition, the variable-field information is printed out in a left-margin justified (columnar) fashion. FIG. 8(a) illustrates a typical arrangement of form-type (formatted) information as displayed on the display surface 10 of a video display terminal. The formatted information displayed on the display surface 10 includes fixed-field information, represented by the designations "NAME," "AGE," "SEX," and "TEL. NO." and variable-field information, represented by the designations "BARRY X. MORRIS," "28," "MALE," and "263-3933." The basic form displayed on the display surface 10, comprising the aforementioned fixed-field information and the allowable variable-field entry points, are caused to be presented on the display surface 10 by the display controller 2 in response to an appropriate command initiated by the operator of the video display terminal (via the associated keyboard 8). The entry points following the fixed-field information are "filled in" by the operator by depressing the appropriate keys of the keyboard which causes the desired information to be displayed on the display surface 10. As indicated in FIG. 8(a), the first character of each variable-field entry is entered, or "written," over the colon which indicates the first character position of the variable field. The colon denotes the presence of an FT bit and is used as a convenience in instructing the operator where to begin an entry.

When the Format Print Variables mode of operation is initiated, by depressing the COPY key together with the SHIFT key, as stated hereinbefore, the display controller 2 sends a message to the input data register 76 which corresponds to the information displayed on the display surface 10. All characters displayed on the display surface 10 and preceding a cursor [see FIG. 8(a)] are caused to be represented in this message. Each character in the message corresponding to the first character of a variable-field entry is made to have an FT (Format Tab) bit [bit b10, FIG. 3(b)] and each other character in a variable field following the first such variable-field character is made to have an FE (Format Entry) bit [bit b11, FIG. 3(b)]. The characters in the message corresponding to the fixed-field information displayed on the display surface 10 are not made to have either FT or FE bits, thereby distinguishing fixed-field information in the message from variable-field information. The message sent to the input data register 76 by the display controller 2 also includes a START character, having its mode bits *b*1 and *b*2 set to 1 and 0, respectively, appropriate NEW-LINE characters (wherever needed), and an END-OF-TRANSMISSION (EOT) character. The EOT character is produced when the final position of the cursor is reached, as shown, for example, in FIG. 8(a). As discussed previously, the mode bits *b*1 and *b*2 of a START character, upon application to the input data register 76, are caused to be loaded into and stored in the mode latch circuit 86 (at CT6) for the entire duration of the message.

In accordance with the Format Print Variables mode of operation, only the message information corresponding to the variable-field information displayed on the display surface 10 is caused to be loaded into the half slots. All other message information (i.e., fixed-field message information) is excluded from the half slots. In addition, since the variable field information is to be printed out in a left-margin justified columnar fashion, appropriate new-line operations must also be established. The above operations are accomplished, inter alia, by the mode latch circuit 86, the earlier-described FT detector 113, an FE detector 115, an FPVI (*F*ormat *P*rint *V*ariables *I*nhibit) flip-flop 116, and the IDRF flip-flop 108 [see FIG. 7(a)]. The specific operation of these components will now be described.

As characters comprising the aforementioned message are loaded into the input data register 76, they are examined by the FT detector 113 and the FE detector 115 to determine whether they contain FT or FE bits. In the event a character has no FT or FE bit, as is the case with a fixed-field character, the absence of the FT bit is detected by the FT detector 113 and the absence of the FE bit is detected by the FE detector 115. Outputs $\overline{FT}$ and $\overline{FE}$ are produced by the FT detector 113 and the FE detector 115, respectively, signifying the above two conditions. An $\overline{FT}$ output from the FT detector 113 or an $\overline{FE}$ output from the FE detector 115, with the mode latch circuit 86 in a 01 state (that is, mode bit *b*1=1 and mode bit *b*2=0), causes the FPVI flip-flop 116 to be set, at CT5, by a logic circuit 117. With the FPVI flip-flop 116 set, the clocking and inhibit logic circuit 81 is inhibited from producing an HS Cp clock signal and an Intcntr Cp signal for respectively clocking the appropriate half slot and the intake counter 80. Thus, any character lacking the FT or FE bit (that is, a fixed-field character), is prevented from being loaded into a half slot.

To load variable-field information into a half slot, the FT bit of the first character of each variable-field is detected by the FT detector 113. For each FT bit detected in a variable-field character by the FT detector 113, an output FT is produced thereby. Each FT output from the FT detector 113, with the mode latch circuit 86 in the aforementioned 01 state, causes the FPVI flip-flop 116 to be reset, at CT5, by a logic circuit 118. Resetting of the FPVI flip-flop 116 allows the clocking and inhibit logic circuit 81 to produce an HS Cp clock signal and an Intcntr CP clock signal for respectively clocking a variable-field character into the appropriate half slot and for incrementing the intake counter 80.

Each FT output produced by the FT detector 113 causes a new line operation to take place. This new line operation is necessary to enable the various variable fields of the formatted display to be printed out in a left-margin justified (columnar) fashion. Each FT output produced by the FT detector 113, with the mode latch circuit 86 in the 01 state, causes the IDRF flip-flop 108 to be set, at CT6, by the logic circuit 114. As described before, setting of the IDRF flip-flop 108 indicates that a new line operation is to take place. Therefore, the setting of the IDRF flip-flop 108 causes an F bit (new line bit) to be added to the variable-field message character (corresponding to the first character of a variable field) then present in the input data register 76.

As a result of the above-described operations on the fixed-field and variable-field characters, and with normal processing of NEW LINE and EOT characters, the information displayed on the display surface 10 of FIG. 8(a) has the following sequence and form in a half slot:

START
B (with F bit)
A
R
R
Y
Δ
X
Δ
M
O
R
R
I
S
Δ
Δ
Δ
2 (with F bit)
8
Δ
M (with F bit)
A
L
E
Δ
Δ
2 (with F bit)
6
3
—
3
9
3
3
EOT When the above characters stored in the half slot are later caused to be printed out, the printout is as appears below:

BARRY X MORRIS
28
MALE
263-3933

Thus, while the information displayed on the display surface 10 of FIG. 8(a) is not presented in a columnar fashion, it can clearly be made to be so in the final printout, as indicated above.

Figure 8B:
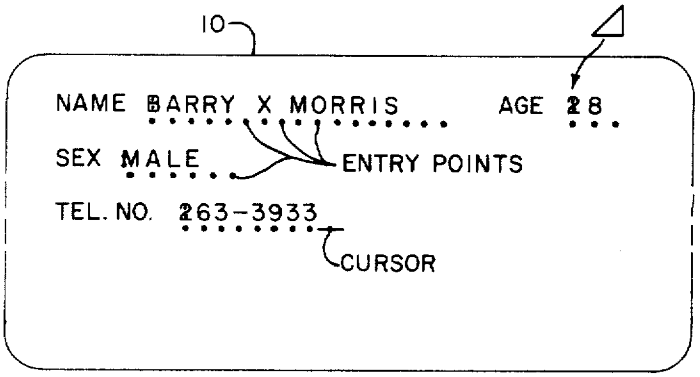

As previously stated, in the Format Print Variables mode of operation it is also possible to exclude from a final printout any variable-field information displayed on a display surface not desired to appear in the final printout. This situation may arise, for example, if erroneous variable-field information is caused to be entered by an operator on the display surface of a video display terminal. FIG. 8(b) illustrates a situation in which it is desired to eliminate from the final printout the variable-field display information "28." To accomplish this result, the operator causes a symbol Δ, designated a new line symbol, to be "written" over the character "2" of "28". When the COPY and SHIFT keys are depressed by the operator to initiate a printout, the display controller 2 sends a message to the input data register 76 identical to that sent in connection with the FIG. 8(a) display but having a NEW-LINE character in place of the character "2." In addition, since the new line symbol Δ is written over the first character ("2") of a variable field, the NEW-LINE character substituted for the " 2" character in the message is made to have an FT bit. The processing of the NEW-LINE character with the FT bit and subsequent message characters is achieved in the loading logic circuit 75 of FIGS. 7(a) and 7(b) by means including the FT detector 113, the FPVI flip-flop 116, the new line decoder 104, the NL flip-flop 106, the MNL flip-flop 107, and the IDRF flip-flop 108. As will now be described, detection of the NEW-LINE character having the FT bit causes the NEW-LINE character and all characters to the right of the NEW-LINE character to the end of the variable-field to be inhibited from being entered into a half slot and, instead to be replaced by a space character having an F bit. The storage of characters in the half slots resumes upon the occurrence of the next variable-field message character from the display controller 2 having an FT bit.

The NEW-LINE character is detected in the input data register 76 by the new line decoder 104 which, at CT7, causes the NL flip-flop 106 to be set, via the logic circuit 105. The FT bit in the NEW LINE character is detected by the FT detector 113. The output FT from the FT detector 113, with the mode latch circuit 86 in the 01 state, as before, and with a new line decode by the NL decoder 104, causes the FPVI flip-flop 116 to be set, at CT5, via the logic circuit 117. As before, the setting of the FPVI flip-flop 116 inhibits the clocking and inhibit logic 81 from producing an HS Cp clock signal for clocking a half slot and from producing an Intcntr Cp clock signal for incrementing the intake counter 80. The FT output from the FT detector 115 also causes two additional operations to take place. At CT5, with the mode latch circuit 86 in the 01 state and with the NL flip-flop 106 set, the MNL flip-flop 107 is set via a logic circuit 119. The setting of the MNL flip-flop 107 allows the clocking and inhibit logic circuit 81 to produce an HS Cp clock signal for clocking a character into a half slot and to produce an Intcntr Cp clock signal for incrementing the intake counter 80 during the next CT cycle. At CT6, of the present CT cycle, the setting of the MNL flip-flop 107 causes the input data register 76 to be reset, via the logic circuit 112. As before, resetting of the input data register 76 automatically causes a space character to be established therein. Also, at CT6, the FT output from the FT detector 115 causes the IDRF flip-flop 108 to be set, via the logic circuit 114. Setting of the IDRF flip-flop 108 causes an F bit to be added to the space character in the input data register 76 for establishing the necessary new line operation.

As a result of the above operations on the NEW-LINE character of the variable-field message information, and with normal processing of the other characters in the message, the information displayed on the display surface 10 of FIG. 8(b) has the following sequence and form in a half slot:

START
B (with F bit)
A
R
R
Y
Δ
X
Δ
M
O
R
R
I
S
Δ
Δ
Δ
Δ (with F bit)
M (with F bit)
A
L
E
Δ
Δ
2 (with F bit)
6
3
—
3
9
3
3
EOT When the above characters stored in the half slot are later caused to be printed out, the printout is as appears below:

BARRY X MORRIS
MALE
263-3933

Thus, while the entry "28" was originally displayed on the display surface 10 of FIG. 8(b), it has been eliminated from the final printout, as indicated above.

In the above example, it has been assumed that the first character of a displayed variable field has been overwritten by a new line symbol Δ. It is also possible in accordance with the Format Print Variables mode of operation to overwrite a character other than the first character of a variable field with a new line symbol Δ for the purpose of eliminating from the final printout all characters beginning with that new line symbol to the end of the variable field. In this case, a variable-field NEW-LINE character is sent by the display controller 2 to the input data register 76 having an FE bit rather than an FT bit. The variable-field NEW-LINE character is detected by the new line decoder 104 which then causes the NL flip-flop 106 to be set, in the same manner as described before. The FE bit in the NEW-LINE character is detected by the FE detector 115 and an output FE is produced thereby. The output FE from the FE detector 115, with the mode latch circuit 86 in the 01 state and with a new line decode by the NL decoder 104, causes the FPVI flip-flop 116 to be set, at CT5, via the logic circuit 117. The setting of the FPVI flip-flop 116 prevents the clocking and inhibit logic circuit 81 from producing HS Cp clock signals for clocking a half slot and from producing Intcntr Cp clock signals for incrementing the intake counter 80. Thus, the NEW-LINE character and the following characters in the variable field are prevented from being entered into a half slot.

g. Format Print All (FPA) Mode

As stated previously, in the Format Print All (FPA) mode of operation, a message is printed out by a printer to include both fixed-field and variable-field information of form-type (formatted) information displayed on the display surface 10 of a video display terminal. Thus, in a situation such as shown in FIG. 8(a), all the information displayed on the display surface 10 is caused to be printed out. In this respect, therefore, the Format Print All mode of operation is similar to the Print Normal mode in which all non-formatted information displayed on a display surface of a video display terminal or originating from the computer 3 is caused to be printed out. However, in accordance with the Format Print All mode of operation, provision is also made for excluding from a final printout any variable-field information displayed on a display surface not desired to appear in the final printout. This latter result is initiated in the same manner as earlier described in connection with FIG. 8(b) by placing a new line symbol Δ over the appropriate character in the variable field from which the desired elimination is to take place.

The Format Print All mode of operation is initiated, as mentioned hereinbefore, by depressing the COPY key of a keyboard 8 of a video display terminal. With the particular information display situation shown in FIG. 8(a), depression of the COPY key causes the display controller 2 to send a message to the input data register 76 which is the same as that sent to the input data register 76 during the Format Print Variables mode of operation with the exception that the mode bits *b1* and *b2* of the START character are set to 0 and 1, respectively. These mode bits, when applied to the input data register 76, are caused to be loaded into and stored in the mode latch circuit 86 (at CT6). However, since it is desired to store both fixed-field and variable-field character information in a half slot, no attempt is made at this time, by use of the mode bits of the mode latch circuit 86, to inhibit the clocking and inhibit logic circuit 81 from producing signals. Thus, all of the characters stored in the input data register 76 are permitted to be stored in a half slot.

Characters are excluded from a half slot in the Format Print All mode only in the aforementioned situation in which a new line symbol Δ appears in a variable field, for example, as shown in FIG. 8(b). In this case, a NEW-LINE character having an FT bit or an FE bit is applied to the input data register 76. The processing of this NEW-LINE character is accomplished by means including the mode latch circuit 86, the FT detector 113 or the FE detector 115, the new line decoder 104, the NL flip-flop 106, and an FPAI (*F*ormat *P*rint *A*ll *I*nhibit) flip-flop 120. The NEW-LINE character is detected by the new line decoder 104 which, at CT7, causes the NL flip-flop 106 to be set, via the logic unit 105. If the NEW-LINE character has an FT bit, the FT bit is detected by the FT detector 113 which operates to produce an output FT; if the NEW-LINE character has an FE bit instead of an FT bit, the FE bit is detected by the FE detector 115 which operates to produce an output FE. An output FT from the FT detector 113 or an output FE from the FE detector 115, with the mode latch circuit 86 in the 10 state and with an output from the NL decoder 104, causes the FPAI flip-flop 120 to be set, at CT5, by means of a logic circuit 121. Setting of the FPAI flip-flop 120 causes the input data register 76 to be reset, at CT6, by means of a logic circuit 122. The resetting of the input data register 76, as before, causes a space character to be automatically established therein. The FPAI flip-flop 120 is reset, by means of a logic circuit 125, whenever fixed-field characters are detected in the input data register 76 (as indicated by $\overline{FT}$ or $\overline{FE}$ outputs from the FT detector 113 or the FE detector 115, respectively), whenever the mode latch circuit 86 is not in the Format Print All mode (that is, the mode latch circuit 86 has a 01 or 00 state), or whenever there is no variable-field NEW-LINE character in the input data register 76 (as indicated by an $\overline{NL}$ output of the new line decoder 104).

h. Intake Counter, LC Bits

As discussed previously, the intake counter 80 is incremented once for each character loaded into a half slot and has a maximum count of 100. Due to the fact that a character is loaded into a half slot on the cycle following its application to the input data register 86, when the count of the intake counter 80 reaches 99, the last character of a block of characters to be loaded into a half slot is then in the input data register 76.

There are three conditions which can denote the end of a block of characters sent by the display controller 2. The first of these occurs when 100 characters have been put into a half slot, thereby filling the half slot completely. The other two conditions have already been discussed, under the section entitled "ETX, EOT Characters," and occur on the receipt of an ETX or an EOT character. ETX and EOT characters may be received with any number of message characters, up to 99, already present in a half slot and they indicate either the end of a computer message segment (in the case of an ETX character) or the end of an entire message (in the case of an EOT character). As discussed previously, either an ETX character or an EOT character causes a compressed load of the characters in a half slot (including the ETX character or the EOT character as the last character in the half slot) to the "bottom" of the half slot.

In accordance with the present invention, a special control bit, designated an LC (*L*ast *C*haracter) bit, is added to the last character of a block of characters loaded into a half slot. Thus, in the case of a 100th character loaded into a half slot as the last character of a block of characters, an LC bit is added to that 100th character. In the case of an ETX or EOT character loaded into a half slot as the last character of a block of characters, an LC bit is added to that ETX character or EOT character. As will be described in detail hereinafter, LC bits are used, together with the aforedescribed Ref LC bit established in the first character-storage position of the first register QO of the first memory module MMO (as a result of the initialization sequence), to load the various blocks of characters stored in the half slots into the memory modules MMO–MM7 and also to establish reference points for erasing from the memory modules MMO–MM7 any part of a message caused to be stored in the memory modules MMO–MM7 and deemed to be in error, either as a result of an excessive message length (overflow condition) or as a result of a parity error (MINER condition) in a message originating from the computer 3. In the case of the 100th character of a block of characters, an LC bit is added to the 100th character by means including the intake counter 80 and an IDRLC (*I*nput *D*ata *R*egister *LC*) flip-flop 130. More specifically, when the count in the intake counter 80 reaches 99, the 100th character is then in the input data register 76, and an LC bit is added to this character by setting the IDRLC flip-flop 130, at CT4, via a logic circuit 131. In the case of an ETX character or an EOT character representing the last character of a block of characters in a half slot, an LC bit is added to that character, while present in the input data register 76, by detecting the character (by means of the EOT/ETX decoder 90) and setting the IDRLC flip-flop 130, at CT4, again by means of the logic circuit 131. Each character having an LC bit added thereto is caused to be loaded into a half slot at such time as the appropriate clock signal HS Cp is applied to the half slot.

It is to be noted that after the various characters comprising a message have been loaded from the input data register 76 into a half slot, the characters have fewer bits while within the half slot than within the input data register 76. Specifically, characters in a half slot have 10 bits as opposed to 13 bits while in the input data register 76. This difference is due to the fact that three bits, namely, the P, FT and FE bits, are "discarded" from the input data register 76 after being used for performing the operations specified by these bits. Thus, bits *b*1–*b*7, P, S, FT, FE, F and LC may at different times be present in the input data register 76 while bits *b*1–*b*7, S, F, and LC may at different times be present in a half slot.

At such time as the intake counter 80 reaches a count of 100, as a result of a given half slot having been filled, one of a pair of BFL (*B*u*F*fer *L*oaded) flip-flops A and B is set to indicate that the half slot has been filled, and the HS flip-flop 88 is toggled to reverse the load and unload operations associated with the two half slots. More specifically, the BFL A flip-flop is set, at T3, by means of a logic circuit 135, when three conditions exist, namely, that the half slot 1 is loaded with a block of characters (the intake counter 80=100), the other BFL flip-flop (BFL B flip-flop) is in a reset state, and an ULIP (*U*nload *I*n *P*rogress) flip-flop 137 is in a reset state. The reset state of the ULIP flip-flop 137 indicates that no characters are being unloaded from the other half slot into the output data register 78. Similarly, the BFL B flip-flop is set, at T3, via a logic circuit 134, when the half slot 2 is loaded with a block of characters, the other BFL flip-flop (BFL A flip-flop is in a reset state, and the ULIP flip-flop 137 is in the reset state. The setting of either of the BFL flip-flops A and B causes the HS flip-flop 88 to be toggled by the reset output of the BFL flip-flop A or B with the result that the loading and unloading operations of the half slots 1 and 2 are reversed.

Once a BFL flip-flop A or B has been set, the characters in the associated half slot may be unloaded into the output data register 78.

i. Unloading Data From Half Slots Into Output Data Register

With either the BFL A or BFL B flip-flop set and with the ULIP flip-flop 137 in its reset state, an ADV (*AD*-*V*ance) flip-flop 138 is set at T5, via a logic circuit 139. At T7 after the ADV flip-Flop 138 has been set, three operations take place. The intake counter 80 is reset by means of a logic circuit 142 (for use in loading the next half slot), the half slot to be unloaded is clocked once at T12T2 by means of an HS Cp clocking signal from the clocking and inhibit logic circuit 81 and the output data register 78 is clocked once at T2, by means of an ODR Cp clocking signal from the clocking and inhibit logic circuit 81. The HS Cp and ODR Cp clocking signals are produced by the clocking and inhibit logic circuit 81 in response to the application thereto of pulses T12T2 and T2, respectively. The clocking of the half slot and the output data register 78 causes the first character stored in the half slot to be applied to the output data register 78. At T2, with the ADV flip-flop 138 set, the ULIP flip-flop 137 is set, via a logic circuit 140. The setting of ULIP flip-flop 137 indicates that a character has been transferred from the half slot to the output data register 78 to then be loaded into the memory storage unit 6 (FIG. 4). The ADV flip-flop 138 is reset at T3 and the data remains as is until the point in the memory storage unit 6 where the data is to be stored has been located, as will be described hereinafter in connection with FIG. 10. Parity is recreated on the data in the output data register 78 by a parity recreate circuit 141 (it being noted that no parity bit P is present in a half slot).

Once the location in the memory storage unit 6 for storing the data has been found, the half slot and the output data register 78 are clocked in the above described manner to transfer the block of data in the half slot into the output data register 78, character by character, and then into the memory storage unit 6. The data is loaded into the memory storage unit 6 so long as the ULIP flip-flop 137 is set and an IWRE (*I*nput *WR*ite *E*nable) flip-flop 168, FIG. 10, is set. The IWRE flip-flop 168, the purpose and operation of which will be described hereinafter, is set at such time as data is being loaded, or "written," into the memory storage unit 6 and enables the clocking and inhibit logic circuit 81 to produce its HS Cp and Intcntr Cp clocking signals (as indicated in FIG. 7(a) by the IWRE FF input to the clocking and inhibit logic circuit 81). The ULIP flip-flop 137 is reset (by the IWRE flip-flop 168) when the loading of a block of data into the memory storage unit 6 has been completed. The ULIP flip-flop 137 may, therefore, be set a number of times for a given message.

Two special cases in the unloading of data occur with respect to ETX characters and EOT characters. SInce it is desired that all characters between a START character and an EOT character be printable, ETX characters are never loaded into the memory storage unit 6. Each time that an ETX character is decoded at the output of a half slot while data is being unloaded from that half slot, an LC bit and a special control bit, designated an "M" bit (bit *b*12), are added, at T6, to the character then present in the output data register 78 and preceding the ETX character. The LC bit insures that the data character preceding the ETX character will be the last character loaded from the half slot into the output data register 78 and into the memory storage unit 6. The M bit acts as a message-segment separator for this message segment as will be more fully apparent hereinafter. The addition of the LC and M bits to the ETX character is accomplished by means of an ETX decoder 143 and a logic circuit 144 coupled to the outputs of the half slots 1 and 2 and to the output data register 78. The ETX character left in the half slot is clocked out of the half slot when a new data character is loaded into the half slot, but will not be "seen" by the output data register 78 since the output of the half slot will not be enabled at that time.

The above operation with respect to an ETX character varies slightly if the ETX character is to be the first character of a new half slot after the previous half slot has been filled with characters. In order for an LC bit and an M bit to be added to the character preceding the ETX character, at a time when the ETX character will not be present at the output of the half slot, an ETX-INH (*ETX INH*i-bit) flip-flop 145 is set by the set condition of the ADV flip-flop 138, via a logic circuit 146, at the time that the ETX character is present in the input data register 76 (IDR=ETX) and is detected by the EOT/ETX decoder 90. When set, the ETXINH flip-flop 145 prevents the clocking and inhibit logic circuit 81 from producing HS Cp and Intcntr Cp clock signals with the result that the ETX character is prevented from being loaded into the next half slot and prevented from being counted by the intake counter 80. An M bit is added to the DATA character preceding the ETX character when that DATA character enters the output data register 78, at T6, by means of the aforementioned ETX decoder 143 and the logic circuit 144. It is to be noted that an LC bit need not be added to the character preceding the ETX character in the above instance inasmuch as this character already has an LC bit added thereto, having been added thereto in the input data register 76 as a result of representing the 100th character of a block of characters loaded into a half slot. The ETXINH flip-flop 145 is reset at the next CT4.

An LC bit is also added to each character preceding an EOT character. This is accomplished, at T6, by means of an EOT decoder 148 and a logic circuit 149 coupled to the outputs of the half slots 1 and 2 and to the output data register 78. The output data register 78 is reset after an EOT character has been loaded into the memory storage unit 6. The LIP flip-flop 83 is also reset at this time [by means of an EOTWR (*EOT WR*ite) flip-flop 195, FIG. 10].

FIG. 9 illustrates the bit configurations of the various characters as stored within the output data register 78 and as loaded into the memory storage unit 6. As may be noted from FIG. 9, each of these characters comprises 12 (parallel) bits, representing the 12 bits *b*1–*b*12 previously described with respect to the memory storage unit 6 of FIG. 4.

Data Insertion From Output Data Register Into Memory Storage Unit 6 (FIG. 10)

FIG. 10 illustrates the aforementioned search and write unit 155 provided within the input module IM for determining the precise location in the memory storage unit 6 where data from the output data register 78 [FIG. 7(b)] is to be stored. All operations required to load data into the memory storage unit 6 and to accomplish normal "bookkeeping" operations are performed by the search and write unit 155.

Each time data is to be loaded into the memory storage unit 6, specifically, into one or more of the registers QO–Q3 of the memory modules MMO–MM7 provided in the memory storage unit 6, three basic operations are performed by the search and write unit 155. More particularly, the timing of the search and write unit 155 is synchronized with the timing of the memory storage unit 6, a search for an LC bit is initiated (to determine where the loading of data is to begin) and, finally, the data is loaded into one or more of the memory module registers. There may be four conditions existing between the placement of LC bits and memory division and it is considered worthwhile to examine these conditions before proceeding with a detailed description of the operation of the search and write unit 155. The four conditions are shown in FIGS. 10(a)–10(d) and are designated Cases I–IV, respectively.

Figure 10A:
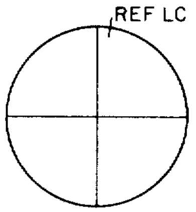
FIGS. 10*a* – 10*d* are pictorial aids which are useful in understanding the operation of the search and write unit of FIG. 10.

The conditions depicted in Case I [FIG. 10(a)] exist when loading the first half slot of data of a message in which case a reference LC bit is in the memory. This LC bit is found and rewritten. A block of data from a half slot is then written after the reference LC bit and the last data character is written into the memory with another LC bit, termed a "propagated" LC bit.

Figure 10B:
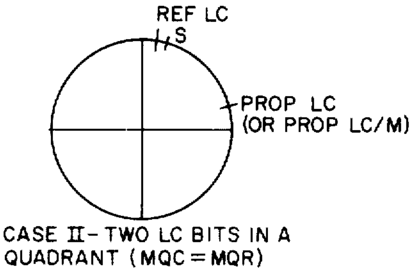

The conditions depicted in Case II [FIG. 10(b)] exist when data has been loaded into memory such that it is wholly contained in one register or "quadrant." A search of the quadrant is initiated to find the load point for the next half slot of data. The first (reference) LC bit is found and skipped, and the second (propagated) LC bit is then found and used for data loading purposes. An LCD (*LC D*etected) flip-flop 156, FIG. 10, is used to signal the detection of the second LC bit. When the second (propagated) LC bit is found, it is erased from the memory, and data is written into the memory commencing with the next sequential character position following the erased (propagated) LC bit. The last data character of the block of data is then written with a (new) propagated LC bit.

Figure 10C:
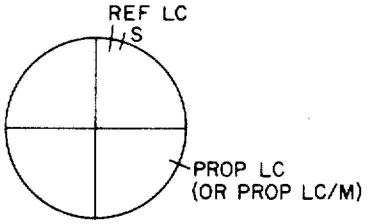

The conditions depicted in Case III [FIG. 10(c)] exist when data has been loaded into the memory such that the reference and propagated LC bits are in different registers or quadrants. In the particular situation illustrated by Case III of FIG. 10(c), a quadrant address of 1 (in binary form) from the memory quadrant counter MQC (FIG. 5), corresponding to the register Q1 of the memory module in which the propagated LC bit is present, is used by the search and write unit 155 to enter the register Q1 for data loading purposes. Due to the particular manner of use of the memory quadrant counter address to enter the register Q1 to write data, the abovementioned LCD flip-flop 156 is not needed in the situation depicted in Case III. When the propagated LC bit has been found, it is erased from the memory and data is written commencing with the next sequential character position following the erased propagated LC bit. The last DATA character of the next block of data is then written with a (new) propagated LC bit.

The conditions depicted in Case IV occur only when there is one memory module in the system and a 1,920 character message (as assumed in the description of the present invention) is received [by the input data register 76, FIG. 7(a)] from the display controller 2. In this case, the loading of the message into the memory module starts in the first quadrant or register (Q0) and continues around the registers (or quadrants) of the memory module so that characters at the end of the message are written in the beginning of the first register or quadrant (Q0). If more than one memory module were present in the system, the latter part of the message would be written in the first quadrant (Q0) of a different memory module. In the particular case (Case IV) illustrated in FIG. 10(d), the addresses of the memory quadrant counter MQC and the memory quadrant register MQR will be the same (as is also true in Cases I and II of FIGS. 10(a) and 10(b), respectively), but a so-called "memory overflow" condition, designated MOVFL, will exist. This memory overflow condition, which will be described in greater detail hereinbelow, prevents the LCD flip-flop 156 from causing the logic associated therewith from skipping over the first (propagated) LC bit found. Once the first (propagated) LC bit is found, it is erased and data written commencing with the next sequential character position following the erased propagated LC bit. The last DATA character is again written with a (new) propagated LC bit.

It will be apparent from the above brief discussion that at any given time it is possible to have only one or two LC bits in the entire memory. The latter condition occurs only if a message is in the process of being loaded into the memory. In that case, the first LC bit is considered the reference LC bit, as mentioned hereinbefore, and indicates that the message being loaded commences in the next character position. It provides a reference point should the message have to erased due to an error condition. The second LC bit is considered the "propagated" LC bit and indicates that the next half slot of data should be loaded into the memory beginning with the next character position. It is erased each time a new half slot of data is inserted and is automatically entered in the memory with the last data character of that half slot and so is, in effect, propagated. If no message is being loaded into the memory, only a reference LC bit is present.

In each of the cases depicted in FIGS. 10(a)–10(d), writing into the memory allow the memory quadrant counter MQC (FIG. 5) to be incremented each time the system timing progresses, or "ripples," from one quadrant to the next quadrant so that the system logic may keep track of which quadrant holds the propagated LC bit. In Case IV briefly described above, it is possible for the memory quadrant counter MQC to be incremented to counts corresponding to memory modules not present in the system. (It may also be recalled that PMENO–PMEN7 and MQ0–MQ3 signals are produced for memory modules not present in the system.) When the above situation occurs, fast action is required to insure that the message being loaded into the single memory module of Case IV continues to be loaded at the beginning of the memory module (where the space availability arrangement 55, FIG. 6, has assured free space exists) so that the message will effectively "wrap around" the memory module. Otherwise, the message would be lost. In accordance with the present invention, when only a single memory module is employed in the system, a logic circuit 158, FIG. 10, is programmed to provide a "memory out of range" output signal (MOR), previously mentioned with respect to the memory quadrant counter MQC of FIG. 5, and a "memory overflow" (MOVFL) output signal. The MOR output signal causes the memory quadrant counter MQC to be reset (to memory module MMO, quadrant 0) at such time as the memory quadrant counter MQC counts to a memory module not present in the system. The MOVFL output signal is then produced to indicate that a reversal of LC bits exists in the single memory module (Case IV), that is, that the propagated LC bit precedes the reference LC bit. In situations where more than a single memory module is present in the system, the MOVFL output signal is not present, this latter condition being indicated in FIG. 10 by $\overline{MOVFL}$.

The operation of the search and write unit 155 to load data into the memory storage unit 6, under the conditions illustrated in Cases I–IV, will now be described in detail.

Finding Last Previous LC Bit — Case I — FIG. 10(a)

As stated previously in connection with Case I, FIG. 10(a), to load the first block of data from a half slot into the memory where only the reference LC bit is present, the reference LC bit must first be found, rewritten, and the block of data then written after the reference LC bit. The distinguishing factor of the data to be written after the reference LC bit is that the first character is a START character, the S bit of which is set (to 1, FIG. 9) in the output data register 76 [FIG. 7(b)]. To locate the reference LC bit, an INSCH (*IN*put *Sear**CH*) flip-flop 160 is set to enable a search of the register (defined by the IMEN and IQ address) of the memory for the reference LC bit. The INSCH flip-flop 160 is set at T10 by means of a logic circuit 161. The logic conditions causing the INSCH flip-flop 160 to be set at this time are that a BFL flip-flop BFL A or BFL B flip-flop, FIG. 7(b)] be set, an IWREC (*I*nput *WR*ite *E*nable, *C*ontrol bits) flip-flop 162 be reset, and a count of 511 be present in the character counter 33 of FIG. 5. The reset state of the IWREC flip-flop 162 indicates that no control bits (LC or M) are then being written into or erased from the memory. The character count of 511 in the character counter 33 represents the last character position in a quadrant and causes the search for the reference LC bit to commence on the next T cycle with the first character position of the quadrant addressed by the memory quadrant counter MQC. Thus, the character count of 511 establishes synchronization between the timing of the search and write unit 155 and the timing of the memory. At each T5, with the INSCH flip-flop 160 set, the BFL flip-flop (A or B) is reset by means of a logic circuit 163.

Upon setting the INSCH flip-flop 160, the contents of the memory, as presented at the outputs of the input module multiplexers 23 of the memory, are examined by an LC-bit detector 165. When the reference LC bit (bit b11) is presented at the output of one of the input module multiplexers 23, it is detected by the LC-bit detector 165 and an output signal is produced thereby and applied to a logic circuit 166. The logic circuit 166 also receives a signal from a START S-bit detector 167 which detects the S bit (bit b9) in the START character of the block of data (the first block of data) which is to be written after the reference LC bit. The S bit of the START character is detected by the START S-bit detector 167 while the START character is present in the output data register 78 [FIG. 7(b)]. At T4, with the INSCH flip-flop 160 set, and with the aforementioned signals received from the LC-bit detector 165 and from the S-bit detector 167, the logic circuit 166 operates to produce an output signal to cause the aforementioned IWREC flip-flop 162 to be set. Setting of the IWREC flip-flop 162 causes an output signal to be produced thereby and to be applied to the recirculation control input 19 of the particular input data and printer data multiplexer 17 of the memory then being addressed by the memory quadrant counter MQC. This output signal causes the recirculation of the reference LC bit to be broken. (The output signal produced by the IWREC flip-flop 162 is also used to break the recirculation of an M bit, but since no M bit is present in the addressed memory module at this time (Case I), the breaking of the recirculation of this bit in the memory has no noticeable effect on the present operations).

At T7, with the START S-bit detector 167 producing an output signal, the set condition of the IWREC flip-flop 162 and the reset condition of the IWRE (*I*nput *WR*ite *E*nable, data) flip-flop 168 cause an output signal to be produced by a logic circuit 170. This output signal is applied to the data input 18 of the input data and printer data multiplexer 17 then being addressed by the memory quadrant counter MQC and causes the reference LC bit to be rewritten.

With the IWREC flip-flop 162 set, the INSCH flip-flop 160 is reset at T6 by means of a logic circuit 171. The resetting of the INSCH flip-flop 160 is accomplished since it is no longer required that the memory be searched for an LC bit.

With the reference LC bit rewritten and the IWREC flip-flop 162 set, data may now be inserted into the memory, starting with the next sequential character position following the rewritten reference LC bit.

Inserting Half Slot of Data — Case I — FIG. 10(a)

After the IWREC flip-flop 162 has been set, the IWRE flip-flop 168 is set, at T3, by means of a logic circuit 172. When set, the IWRE flip-flop 168 produces an output signal which is applied to the recirculation control input 19 of the particular input data and printer data multiplexer 17 of the addressed (by the memory quadrant counter MQC) memory module. This output signal causes the recirculation of the data portion of the addressed register of the memory module to be broken. As a result, the first block of data from a half slot, which is applied (via the output data register 78) to the data input 18 of the input data and printer data multiplexer 17 of the addressed memory module, is caused to be loaded into the appropriate addressed register of the memory module. The loading of this data into the memory module is initiated by means of T12T2 and T2 pulses and by the set condition of the IWRE flip-flop 168 which cause the clocking and inhibit logic circuit 81 [FIG. 7(a)] to produce the necessary HS Cp and ODR Cp clock signals for respectively clocking the half slot and the output data register 78. The clocking provided by the clocking and inhibit logic circuit 81 is now logically synchronized to the clocking of the memory. The data from the half slot may now be written into the memory starting with the character position following the rewritten reference LC bit, As the data is written into the memory, the set condition of the IWREC flip-flop 162 causes the INLOOK signal to be produced whereby the memory quadrant counter MQC is permitted to be clocked by the system timing.

The above writing of data is caused to be terminated when the last character of the data is present in the output data register 78. This last character has an LC bit which is detected by an ODR LC-bit detector 174. At T7, the ODR LC-bit detector 174 causes an LCLD (*LC* bit *LoaDed*) flip-flop 175 to be set by a logic circuit 176. The setting of the LCLD flip-flop 175 indicates that the last data character of a half slot is being loaded into a memory module. At T3, with the LCLD flip-flop 175 set, the IWREC flip-flop 162 and the IWRE flip-flop 168 are caused to be reset, by means of a logic circuit 177. The resetting of the IWRE flip-flop 168 then causes the LCLD flip-flop 175 to be jammed reset, thereby terminating the loading of the half slot data into the memory module.

Figure 10D:
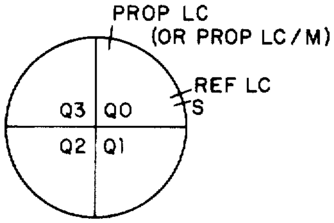

Finding LC Bit for Previous Half Slot Cases II, III, IV — FIGS. 10(b) – 10(d)

After one or more blocks of half slot data have been stored in memory, for example, as shown in any one of FIGS. 10(b) – 10(d), additional blocks of half slot data may be stored. To accomplish this result, the LC bit for the previous block of half slot data must first be found after which the next block of half slot data may be stored. The manner in which this next block of half slot data is stored is different for each of the three Cases II, III, and IV shown in FIGS. 10(b) – 10(d), respectively, as will now be described.

In the situation represented by FIG. 10(b), Case II, the storage of a new block of half slot data is initiated by setting the INSCH flip-flop 160. This flip-flop is set in exactly the same manner as described before, and the BFL flip-flop (A or B) is reset in exactly the same manner as described before. In Case II, the half slot data is wholly contained in a single register or quadrant in which case the address contained in the memory quadrant counter MQC (which keeps track of the quadrant where the last character of a block of data has been stored) and the address of the memory quadrant register MQR (which keeps track of the quadrant where the loading of a block of data begins) are the same (that is, MQC=MQR). The first LC bit detected by the LC-bit detector 165 after the INSCH flip-flop 160 is set, therefore, will be the reference LC bit and must be skipped so as to prevent its erasure. This reference LC bit is skipped by using the aforementioned LCD flip-flop 156. More specifically, at such time as the reference LC bit is detected by the LC-bit detector 165 with the INSCH flip-flop 160 set, and the logic condition MQC=MQR exists (indicating that the two LC bits, namely, the reference and propagated LC bits, are in the same quadrant), the LCD flip-flop 156 is set at T5, by means of a logic circuit 173. An additional condition for setting the LCD flip-flop 156 is that the logic condition MOVFL ("memory overflow") does not exist. As mentioned previously, a MOVFL condition may exist only when a single module is present in the system, as represented, for example, by Case IV, FIG. 10(d).

When the second (propagated) LC bit is detected by the LC-bit detector 165, with the INSCH flip-flop 160 set, the set condition of the LCD flip-flop 156 causes the IWREC flip-flop 162 to be set, at T4, via a logic circuit 179. The setting of the IWREC flip-flop 162 causes recirculation of the second (propagated) LC bit to be broken with the result that the (propagated) LC bit is erased. In the event an M bit accompanies the propagated LC bit, the recirculation of the M bit is also broken in the same manner as the propagated LC bit. However, with the IWREC flip-flop 162 set, and with a MINERF flip-flop 218 and a MINERP flip-flop 219 [FIG. 11(a)] both reset (indicating that no erasures are in progress), the M bit is rewritten in memory by means of a logic circuit 182. The logic circuit 182 operates to produce an output signal which is then applied to the data input 18 of the multiplexer 17 of the addressed memory register with the result that the M bit is rewritten. At T6, with the IWREC flip-flop 162 set, the INSCH flip-flop 160 is reset by the logic circuit 171 inasmuch as it is no longer needed to locate the (propagated) LC bit from which point the loading of new data is to start. The LCD flip-flop 156 is also reset at T6 by the logic circuit 171. Data may now be written into memory in the next character position following the just-erased (propagated) LC bit, in the same manner as earlier described under the section entitled "Inserting Half Slot of Data."

In the situation represented by FIG. 10(c), Case III, the storage of a new block of half slot data is once again initiated by setting the INSCH flip-flop 160, in the same manner as earlier described. In Case III, the two LC bits, that is, the reference and propagated LC bits, are in different quadrants with the result that the addresses contained in the memory quadrant counter MQC and in the memory quadrant register MQR are not the same (that is, MQC ≠ MQR). In this case, the quadrant (or register) accessed by the memory quadrant counter MQC is the quadrant in which the propagated LC bit is present and, for this reason, the first LC bit detected by the LC-bit detector 165 with the INSCH flip-flop 160 set is the propagated LC bit. When the first (propagated) LC bit is detected by the LC-bit detector 165 with the INSCH flip-flop 160 set, and with the logic conditions MQC ≠ MQR and $\overline{MOVFL}$ present (the latter indicating that a message "wrap-around" condition is not present in the system), the IWREC flip-flop 162 is set at T4 by means of a logic circuit 184. The setting of the IWREC flip-flop 162 causes the (propagated) LC bit to be erased, in the same manner as earlier described. In the event an M bit accompanies the LC bit, recirculation thereof is broken, but it is rewritten by the logic circuit 182, as described previously. At T6, with the IWREC flip-flop 162 set, the INSCH flip-flop 160 is reset inasmuch as it is no longer needed to locate the (propagated) LC bit at which point the loading of new data is to start. Data may now be written into memory in the next character position following the just-erased (propagated) LC bit.

In the situation represented by FIG. 10(d), Case IV, the storage of a new block of half slot data is also initiated by setting the INSCH flip-flop 160. As mentioned previously, Case IV represents a situation in which only one memory module is present in the system and a 1,920-character message (as assumed in the description of the present invention) is received (by the input data register 76) from the display controller 2. In this case, the loading of the message into the memory module may start in the first quadrant and continue through the succeeding quadrants so that characters at the end of the message are written in the beginning of the first quadrant. Thus, the message "wraps around" the memory module with the result that the first LC bit detected by the LC-bit detector 165 is the propagated LC bit. In Case IV, the aforementioned MOVFL (memory overflow) condition is present, as established by the aforedescribed logic circuit 158.

When the propagated LC bit is detected by the LC-bit detector 165 with the INSCH flip-flop 160 set, and with the MOVFL signal present, the IWREC flip-flop 162 is set at T4 by means of a logic circuit 185. The setting of the IWREC flip-flop 162 causes the recirculation of the (propagated) LC bit to be broken with the result that the LC bit is erased. At T6, the INSCH flip-flop 160 is reset, in the same manner as earlier described. In the event an M bit accompanies the (propagated) LC bit, the recirculation thereof is broken (as with the propagated LC bit) but is rewritten by means of the logic circuit 182. New data is then written into the single memory module (in an area that the space availability arrangement 55, FIG. 6, has determined that sufficient contiguous empty space exists for the new data).

Counting M Bits

In those cases where M bits accompany LC bits in characters to be loaded into memory, the M bits are detected and counted, up to a maximum of two. These operations are performed by means shown in FIG. 10 including an M-bit detector 180, a MAD (*M* bit *AD*d) flip-flop 187, and an M-bit counter (MCNTR) 188. An M bit present in the output data register 78 is detected by the M-bit detector 180 and, at T6, the MAD flip-flop 187 is set by means of a logic circuit 189. The setting of the MAD flip-flop 187 indicates that the M bit is about to be entered into memory. At T2, with the MAD flip-flop 187 set, the M-bit counter is caused to be incremented by means of a logic circuit 190 to register the presence of the M bit. The MAD flip-flop 187 is reset at the next T4. After a first segment of a message having an M bit has been loaded into memory, the subsequent successful loading of a new segment, also with an M bit, establishes a new "plateau," up to which all data has been insured as valid. The M bit of the first segment of the message is important in that it is used as a reference point from which the second segment may be erased should that segment be deemed to be in error. If the second segment is not in error, the previous M bit of the first segment is erased leaving only the second M bit in memory. The maximum possible count in the M-bit counter 188 is, therefore, two, and this count is reduced to one by means of the error conditions and M-bit erase unit 210 of FIGS. 11(*a*) and 11(*b*). The manner in which this count reduction is accomplished in the M-bit counter 188 will be described hereinafter in connection with the error conditions and M-bit erase unit 210.

Insertion of EOT Character Into Memory

The insertion of an EOT character into memory is not treated in the same manner as the insertion of data characters. The insertion of an EOT character is accomplished in three stages, each under the control of a separate flip-flop. In the first stage of operations, the reference LC bit is located in memory and erased since the insertion of the EOT character will establish a new reference LC point for the next message. This first stage of operations is under the control of the aforementioned REOT (*R*eceived *EOT*) flip-flop 192 (see multiplexer 36, FIG. 5). In the second stage of operations, the only remaining LC bit in memory, that is, the propagated LC bit, is found with the last inserted data character in memory and also erased, thereby establishing the new load point for the EOT character. This stage is under the control of an EOTEN (*EOT EN*able) flip-flop 193. In the third state of operations, the EOT character with an LC bit (the new reference LC bit) is written into memory in the character position immediately following the last data character. The third stage of operations is under the control of an EOTWR (*EOT WR*ite) flip-flop 195.

To perform the insertion of the EOT character in memory, it is required, as before, that the INSCH flip-flop 160 be set. This is accomplished as before, by the logic circuit 161, at the end (T10) of a character count of 511 but with the additional requirement that the EOT character be present in the output data register 78 (ODR=EOT), as detected by an EOT decoder 196. At T2, with the IWREC flip-flop 162 reset, and with the EOTEN flip-flop 193 reset, the detection of the EOT character in the output data register 78 by the EOT decoder 196 causes the REOT flip-flop 192 to be set, via a logic circuit 198. The abovementioned reset condition of the EOTEN flip-flop 193 indicates that no operations with respect to the EOTEN flip-flop 193 are in progress. The REOT flip-flop 192, when set, causes the contents of the memory quadrant register MQR to be used as the memory address to "return" the logic to the quadrant where the message began, which also contains the reference LC bit. This operation was briefly mentioned hereinbefore in connection with the discussion of the multiplexer 36 of FIG. 5. The setting of the REOT flip-flop 192 also sets the stage for setting the IWREC flip-flop 162.

The IWREC flip-flop 162 may be set during EOT character insertion in two different ways. The first way corresponds to situations such as represented by Cases II and III, FIGS. 10(b) and 10(c), respectively, in which the first LC bit detected (by the LC-bit detector 165) after the INSCH flip-flop 160 has been set is the reference LC bit. The second way of setting the IWREC flip-flop 162 corresponds to the situation such as represented by Case IV, FIG. 10(d), in which the first LC bit detected (by the LC-bit detector 165) after the INSCH flip-flop 160 has been set is the propagated LC bit, which must be skipped so that the reference LC bit may be located and acted upon. In situations such as represented by Cases II and III, the detection of the reference LC bit by the LC-bit detector 165, with both the INSCH flip-flop 160 and the REOT flip-flop 192 set, and no memory overflow condition ($\overline{MOVFL}$) present, causes the IWREC flip-flop 162 to be set at T4 via a logic circuit 199. In the situation such as represented by Case IV, the detection of the first (propagated) LC bit, with both the INSCH flip-flop 160 and the REOT flip-flop 192 set, and with the memory overflow (MOVFL) condition present, causes the LCD flip-flop 156 to be set at T5 by a logic circuit 178. When the second (reference) LC bit is next detected by the LC-bit detector 165, the set condition of the LCD flip-flop 156 causes the IWREC flip-flop 162 to be set at T4 by the logic circuit 179. As before, the setting of the IWREC flip-flop 162 causes the INSCH flip-flop 160 and the LCD flip-flop 156 to be reset at T6 via the logic circuit 171. The setting of the IWREC flip-flop 162, in either of the two ways discussed above, causes the recirculation of the reference LC bit to be broken with the result that the reference LC bit is erased. The first stage of operations in the insertion of the EOT character into memory is now complete, and the second stage of operations begins.

At the next T1, with both the IWREC flip-flop 162 and the REOT flip-flop 192 set, the EOTEN flip-flop 193 is set by means of a logic circuit 200. Once the EOTEN flip-flop 193 has been set, the trailing edge (T.E.) of the T1 pulse (which also corresponds to the leading edge of the T2 pulse) causes the REOT flip-flop 192 to be reset. At T3, as always, the set condition of the IWREC flip-flop 162 causes the IWRE flip-flop 168 to be set via the logic circuit 172. However, it is not desired at this point that the IWREC flip-flop 162 or the IWRE flip-flop 168 be set, for, if allowed to remain set, they would cause erasure of the beginning of the message present in memory following the just-erased reference LC bit. The IWREC flip-flop 162 and the IWRE flip-flop 168 are not required to be set until the LC bit with the last data character stored in memory has been located. Thus, at T5, with the EOTEN flip-flop 193 set, and with both the EOTWR flip-flop 195 and the INSCH flip-flop 160 reset, the IWREC flip-flop 162 and the IWRE flip-flop 168 are caused to be reset by means of a logic circuit 201. It is no longer required that the memory quadrant register MQR maintain its old (reference quadrant) address, as the address of the memory quadrant counter MQC will become the reference point for the next message. Thus, at T4, with the EOTEN flip-flop 193 set, the memory quadrant register MQR is updated by transferring the address in the memory quadrant counter MQC to it. Resetting of the REOT flip-flop 192 has already restored this address as the one to be used to access the memory for the operations now to take place.

The same logic conditions which caused the INSCH flip-flop 160 to be set in the first stage of the operations for inserting the EOT character in memory now cause that flip-flop to again be set. There can now be only one LC bit in memory, namely, the propagated LC bit, (in the addressed quadrant) and therefore only one way to again set the IWREC flip-flop 162. At T4, the detection of the propagated LC bit (by the LC bit detector 165) and the set conditions of the EOTEN flip-flop 193 and the INSCH flip-flop 160 cause the IWREC flip-flop 162 to be set by means of a logic circuit 203. The INSCH flip-flop 160 will then be reset at T6 (by the logic circuit 171). As before, the setting of the IWREC flip-flop 162 causes the recirculation of the propagated LC bit to be broken with the result that the LC bit is erased from memory. (If an M bit accompanies the LC bit, recirculation thereof is also broken but it is rewritten by the logic circuit 182). The resetting of the INSCH flip-flop 160 with the EOTEN flip-flop 193 set, now causes the EOTWR flip-flop 195 to be set, by means of a logic circuit 204. The above operations conclude the second stage of operations for inserting the EOT character into memory.

On the next T3 following the setting of the IWREC flip-flop 162, the IWRE flip-flop 168 is set (via the logic circuit 172), and the IWREC flip-flop 162 and the IWRE flip-flop 168 are not reset at T5 (since the logic circuit 201, which previously reset the IWREC flip-flop 162 and the IWRE flip-flop 168, is incapable of this action with the EOTWR flip-flop 195 in its set condition). The EOTEN flip-flop 193 is, however, reset at T6, with the IWRE flip-flop 168 set and with the EOTWR flip-flop 193 set, by means of a logic circuit 206. With the IWRE flip-flop 168 set, the EOT character is now written into memory with a new (reference) LC bit. At the next T5, with the EOTEN flip-flop 193 reset and with the EOTWR flip-flop 195 set, the IWRE flip-flop 168 and the IWREC flip-flop 162 are reset by means of a logic circuit 207. The operation of the logic circuit 207 will also cause the output data register 78 [FIG. 7(a)] to be reset. With the IWREC flip-flop 162 reset, the EOTWR flip-flop 195 is jammed reset, causing the LIP flip-flop 83 [FIG. 7(a)] to be reset. The entire load cycle for the message under discussion is now complete and the space availability arrangement 55 (FIG. 6) is freed to determine if enough contiguous empty space now exists in memory to generate an ALLOW signal for a new message from the display controller 2.

ERROR CONDITIONS AND M-BIT ERASE UNIT 210 FIGS. 11(a) – 11(j)

FIGS. 11(a) and 11(b), when placed one above the other, [FIG. 11(a) above FIG. 11(b)], illustrate the aforementioned error conditions and M-bit erase unit 210 in accordance with the invention. The error conditions and M-bit erase unit 210 is employed to erase M bits accompanying segments of multi-segment messages originating from the computer 3 and also to erase from memory entire messages or segments thereof deemed to be in error, either as a result of an overflow (OVERFL) condition or as a result of a parity error (MINER condition) in a message originating from the computer 3. In FIGS. 11(a) and 11(b), various components are shown which were also shown in other figures. Their inclusion in FIGS. 11(a) and 11(b) is believed helpful in explaining the purpose and operation of the error conditions and M-bit erase unit 210.

ERASURE OF PREVIOUS M BITS

As mentioned previously under the section entitled "Counting M Bits," as segments of computer messages including M bits are loaded into memory, these M bits are detected (by the M-bit detector 180) and then counted in the M-bit counter (MCNTR) 188, up to a maximum count of 2. Each M bit indicates the end of a successfully received segment of data from the computer 3 and is required in the event an error occurs in the reception of the message and the segment is to be erased. Each time a new segment of a message is successfully received and stored, the M bit of the previous segment is erased, thereby establishing a new "plateau" of valid data within a segemented message. The maximum count of 2 of the M-bit counter 188 is reduced to 1 to establish the aforementioned new "plateau." The manner in which the maximum count of 2 in the M-bit counter 188 is reduced to 1 will now be described in detail.

At such time as data characters have been written into memory (see section entitled "Inserting Half Slot of Data") and the MAD flip-flop 187 has been operated to cause the M-bit counter 188 to establish a count of 2 therein (see section entitled "Counting M Bits"), A PMER (*P*revious *M* bit *ER*ase) flip-flop 215 is set, at T7, by means of a logic circuit 216. Additional conditions required by the logic circuit 216 for setting the PMER flip-flop 215 are that the aforementioned MINERF (*M*esssage *IN ER*ror *F*ull) flip-flop 218 and the aforementioned MINERP (*M*essage *IN ER*ror *P*artial) flip-flop 219 be reset, as indicated in FIG. 11(b) by the logic conditions $\overline{\text{MINERF}}$ FF and $\overline{\text{MINERP}}$ FF, respectively. The reset conditions of the MINERF flip-flop 218 and the MINERP flip-flop 219 indicate that no error conditions exist and that no erasure of data is to take place. At T3, with both the PMER flip-flop 215 and the MAD flip-flop 187 set, the memory quadrant counter MQC is caused to be operated, via a logic circuit 220, to receive the contents, or address, of the memory quadrant register MQR. With this transfer, a search may now be started in the reference quadrant, that is, the quadrant containing the reference LC bit, to look for the previous M bit, that is, the M bit preceding the M bit which resulted in the count of 2 in the M-bit counter 188. At the end (T10) of a character count 511 from the character counter 33 (FIG. 5), the set condition of the PMER flip-flop 215 causes the INSCH flip-flop 160 to be set via a logic circuit 222, thereby initiating the search for the previous M bit, starting with the reference LC bit quadrant.

With the INSCH flip-flop 160 set, and with the PMER flip-flop 215 set, a LOCATE flip-flop 223 is caused to be set at T5 by means of a logic circuit 224. When set, the LOCATE flip-flop 223 causes the logic circuit 35, FIG. 5, to produce an INLOOK signal which is then applied to the memory quadrant counter MQC. The INLOOK signal allows the memory quadrant counter MQC to be incremented as the system timing (including the counting by the character counter 33, FIG. 5) "ripples" through quadrants. This incrementing is required because the previous (to-be-erased) M bit may be in neither the quadrant represented by the address of the memory quadrant register MQR or the address previously contained in the memory quadrant counter MQC. It is, therefore, necessary to start searching for this M bit in the reference quadrant and to ripple through quadrants (as required) until it is located.

As the above search takes place, the M bit without the LC bit ($\overline{MLC}$) is detected by an M-bit and LC-bit detector 225 and, at T4, with both the PMER flip-flop 215 and the INSCH flip-flop 160 set, the IWREC flip-flop 162 is set by means of a logic circuit 227. When set, the IWREC flip-flop 162 causes the recirculation of the M bit to be broken with the result that the M bit is erased. The setting of the IWREC flip-flop 162 in the above manner, that is, with the PMER flip-flop 215 set and an M bit being detected in memory without an LC bit, eliminates a potential problem, namely, the erasure of an LC bit, which could otherwise occur if a message were placed in memory in a situation such as shown in Case IV of FIG. 10(d) in which the M bit with the propagated LC bit (MLC) is seen prior to the M bit (to be erased) without an LC bit ($\overline{MLC}$).

The set condition of the IWREC flip-flop 162 causes the INSCH flip-flop 160 to be reset at T6, by means of the logic circuit 171. Also, at T6, with the IWREC flip-flop 162 set and with the PMER flip-flop 215 set, a MERA (*M* bit *ERA*se) flip-flop 228 is caused to be set by means of a logic circuit 229. The MERA flip-flop 228, when set, indicates that an M bit is being erased and causes the M-bit counter 188 to be decremented from 2 to 1, at T2, by means of a logic circuit 230. The set condition of the MERA flip-flop 228, together with the set condition of the PMER flip-flop 215, also causes a FINDM (*FIND* M bit) flip-flop 232 to be set, at T3, by means of a logic circuit 233. When set, the FINDM flip-flop 232 causes the LOCATE flip-flop 223 to be jammed set to allow the memory quadrant counter MQC to proceed to the quadrant where the last data character has been loaded (with the new M bit). At T3, also, the set condition of the IWREC flip-flop 162 causes the IWRE flip-flop 168 to be set (via the logic circuit 172). However, it is not desired that either of these flip-flops be set at this time since this would cause the undesirable erasure of data in memory and, so, at T5, they are caused to be reset, via a logic circuit 234, by the set condition of the FINDM flip-flop 232. The MERA flip-flop 228 is reset at T4 of the above T cycle.

When the new M bit has been reached in memory, the set condition of the FINDM flip-flop 232 causes the PMER flip-flop 215 and, subsequently, the FINDM flip-flop 232 itself, to be reset, at T5, by means of a logic circuit 235, thereby indicating that the previous M bit has been erased from memory and a new plateau of valid data has been achieved. All conditions are now ready for the acceptance of a new half slot of data.

ERROR CONDITIONS

There are two types of error conditions which result in alteration of the normal sequence of loading data into memory. An "overflow" condition results if an incoming message, due to an error condition, is longer than the available space for the message in the memory. The space availability arrangement 55, FIG. 6, by generating an ALLOW signal, insures that a message not longer than the programmed maximum [see section entitled "Space Availability Arrangement 55 (FIG. 6)"] can be accepted. The criterion for establishing the overflow condition is that no message being loaded into memory is allowed to overwrite valid data already in memory.

A second type of error condition is signalled by the receipt of the aforementioned signal MINER (*M*essage *IN ER*ror) from the display controller 2. A MINER signal is received in the event a parity error exists with respect to a computer-generated message. In accordance with the present invention, so much of a message as may have been loaded into memory or only a segment of a multi-segment message as may have been loaded into memory and deemed to be in error may be erased from the memory. In the former case, the earlier-mentioned MINERF flip-flop 218 is employed and, in the latter case, the earlier-mentioned MINERP flip-flop 219 is employed. A MINER signal will be active at the time that an M bit (caused by an ETX character) is in the output data register 78 [FIG. 7(b)] to be used for the loading the segment of the message with respect to which the error is detected.

Two of the above three conditions for the erasure of data from memory, namely, the overflow condition and the MINERF condition, may be considered catastrophic for the message being loaded, as the message is completely erased and various key components of the loading logic circuit 75 [FIGS. 7(a) and 7(b)] and of the search and write unit 155 (FIG. 10) are undesirably caused to be returned to their quiescent (or reset) states. To effect loading of more data, the display controller 2 must transfer a new message. MINERP erasures are also susceptible to the above catastrophic results when the data erased is the first segment of a message with respect to which a parity error is detected. When this segment is erased, no portion of the message remains in memory.

OVERFLOW CONDITION — FIGS. 11(c), 11(d)

An overflow condition is signalled by the noting of valid data already in the memory in a character position into which the next data character of a message to be loaded is to be written. When this situation occurs, loading must be terminated immediately (by resetting the IWREC flip-flop 162 and the IWRE flip-flop 168) so that the existing data character in the memory is not overwritten. There are two ways, represented by Cases I and II and shown in FIGS. 11(c) and 11(d), respectively, in which an overflow condition may occur. In Case I, FIG. 11(c), an overflow condition is signalled by "seeing" an S bit of a START character of another message while in the process of writing data into memory (see section entitled "Inserting Half Slot of Data"). Case II represents a condition in which a message being loaded is the only one in the memory. In this case there are no other S bits in the memory and the reference LC bit is "seen" to signal an overflow condition. If this reference LC bit were permitted to be erased, there would be no LC bit in the memory and all frame of reference for the system would be lost and the system would not operate in its intended manner.

As discussed previously, at any time that data is being written into memory, the IWRE flip-flop 168 is set. The detection of an S bit (bit b9) in memory while data is being written into the memory, Case I, FIG. 11(c), is achieved by a memory START S-bit detector 238 which examines the outputs of the input module multiplexers 23 (FIG. 4). The detection of an LC bit (bit b11) in memory while data is being written into the memory, Case II, FIG. 11(d), is achieved by the M-bit and LC-bit detector 225 which also examines the outputs of the input module multiplexers 23. The above-mentioned detection of either an S bit or an LC bit while data is being written into memory, that is, while the IWRE flip-flop 168 is set, causes an OVFL (*OV*er *FL*ow) flip-flop 239 to be set at T5 by means of a logic circuit 241. Additional conditions required for the setting of the OVFL flip-flop 239 are that both the MINERF flip-flop 218 and the MINERP flip-flop 219 be reset and also that the EOTEN flip-flop 193 (FIG. 10) be reset. The reset states of both the MINERF flip-flop 218 and the MINERP flip-flop 219 indicate that no message erasures are then in process. The reset state of the EOTEN flip-flop 193 indicates that an EOT character insertion operation is not in process (during which an LC bit would be erased). At the same time that the OVFL flip-flop 239 is set, the MINERF flip-flop 218 is also set, to commence the erasure of the overflow message in memory. The setting of the MINERF flip-flop 218 also causes a RECOVER flip-flop 242 to be set. The RECOVER flip-flop 242 is required because, in an error condition requiring the erasure of a full message (or the only segment of a computer message in the memory, the special case of MINERP), it may be possible for a printer module having an address corresponding to the message to hang up and eventually hang the memory. This could occur if a printer module is trying to erase a so-called "Start Mark" bit, to be described in detail hereinafter in connection with FIG. 13, which it has written with the START character of this message and this character (START character) has already been removed from memory. The RECOVER flip-flop 242 is used to recover from this damaging condition. Specifically, it will inhibit generation of an ALLOW signal (see logic circuit 60, FIG. 6) until such time as the memory contains no more S bits (the BEMP flip-flop 56, FIG. 6, is active), indicating that the other messages in the memory (if any) have been extracted by their printer modules and printed. All these printer modules will then be in the reset state and only that printer module having an address corresponding to the erased message may be hung. With both the BEMP flip-flop 56 and the RECOVER flip-flop 242 set, a PMENO signal (from the printer memory enable generator 37, FIG. 5) causes a printer module preclear signal to be issued by a logic circuit 243 to all printer modules to reset the various components comprising the printer module which may be hung. With the BEMP flip-flop 56 set, the RECOVER flip-flop 242 is reset by the trailing edge (T.E.) of the PMENO signal via a logic circuit 244. The reset RECOVER flip-flop 242 then enables an ALLOW signal to be produced and sent to the display controller 2.

Also effected at this time by the same logic conditions which caused the OVFL flip-flop 239 to be set (see logic circuit 241), together with the reset condition of a SKIP flip-flop 246, to be described hereinafter, is the resetting of the IWREC flip-flop 162 and the IWRE flip-flop 168 by a logic circuit 248. The resetting of the IWREC flip-flop 162 and the IWRE flip-flop 168 stops the breaking of recirculation of memory data so that valid data, indicated by the S bit or LC bit present at the output of one of the input module multiplexers 23 (FIG. 4), is not erased or lost.

When set, the OVFL flip-flop 239 sends an overflow signal (OVERFL, see FIGS. 1 and 2) to the display controller 2 to instruct it to cease transfer of that message (and to monitor the status of an ALLOW signal to determine when a new message may be sent). The set condition of the OVFL flip-flop 239 also causes the operations performed by various critical components in the system to be terminated. More specifically, the set condition of the OVFL flip-flop 239 causes the resetting of the input data register 76, the output data register 78, the intake counter 80, the COMPLD flip-flop 91 [all shown in FIGS. 7(a) and 7(b)], the LCLD flip-flop 175 (FIG. 10), and also causes HS Cp clock signals to the half slots 1 and 2 of the static buffer 92 to be inhibited (as indicated by the OVFL FF input to the clocking and inhibit logic circuit 81).

Erasure of a message begins from, and includes, the START character of the errant message to, but not including, the START character of the next message [Case I, FIG. 11(c)] or the reference LC bit [Case II, FIG. 11(d)]. At T8 after the OVFL flip-flop 239 has been set, the aforementioned SKIP flip-flop 246 is set by means of a logic circuit 247. The SKIP flip-flop 246 is used so that erasure will not end with the START character of the errant message, as soon as erasure begins.

This erasure would otherwise be caused at this time by the existence of the same conditions that caused the establishing of the OVERFL condition (i.e., the output of the logic circuit 241). The resetting of the IWREC flip-flop 162 and the IWRE flip-flop 168 (to immediately stop erasure) is not allowed since the set condition of the SKIP flip-flop 246 prevents an output from being produced by the logic circuit 248. It is possible, therefore, to skip over this START character as an indication for ending the erasure.

At T3, with the MINERF flip-flop 218 set and with a MERF (*M*essage *ER*ase *F*ull) flip-flop 249 reset, the contents of the memory quadrant register MQR are caused to be transferred to the memory quadrant counter MQC by means of a logic circuit 250. This transfer causes the memory quadrant counter MQC to address the reference quadrant. The set condition of the MINERF flip-flop 218 and the reset condition of the MERF flip-flop 249 also enable the INSCH flip-flop 160 to be set, by means of the logic circuit 222, in synchronization with the beginning of the reference quadrant, that is, at the end (T10) of character count 511. When the reference LC bit is found (i.e., an $\overline{M}$CL output is present from the M-bit and LC-bit detector 225), the set conditions of both the MINERF flip-flop 218 and the iNSCH flip-flop 160 cause the IWREC flip-flop 162 to be set at T4 by means of the logic circuit 227. At T6, the set condition of the IWREC flip-flop 162 causes the INSCH flip-flop 160 to be reset.

The setting of the IWREC flip-flop 162 causes the recirculation of the reference LC bit to be broken. However, with both the IWREC flip-flop 162 and the MINERF flip-flop 218 set, and with the MERF flip-flop 249 reset, the reference LC bit is rewritten in memory by means of a logic circuit 251. The IWRE flip-flop 168 is set, as normally done, at the next T3 (via the logic circuit 172). With the MINERF flip-flop 218 set and the IWRE flip-flop 168 set, the MERF flip-flop 249 is set at T6 by means of a logic circuit 252, and erasure of the errant message proceeds.

The T5 of this same cycle is the time when the START S bit of the errant message is present (at the output of the input module multiplexer 23) and would, if not for the set condition of the SKIP flip-flop 246, cause both the IWREC flip-flop 162 and the IWRE flip-flop 168 to be reset.

When a subsequent START S bit is detected in memory (the first such START S bit, with the MERF flip-flop 249 set). [Case I, FIG. 11(c)], or the LC bit is detected in memory [Case II, FIG. 11(b)] and with the OVFL flip-flop 239 set, the LCD flip-flop 156 is set at T5 by means of a logic circuit 253. The IWRE flip-flop 168 and the IWREC flip-flop 162 are also reset at this time by the logic circuit 253 to immediately halt erasure. The S bit or the LC bit will, therefore, remain untouched in the memory. At the next T3, the set conditions of the LCD flip-flop 156 and the MERF flip-flop 249 cause the OVFL flip-flop 239, the MINERF flip-flop 218, the LIP flip-flop 83 [FIG. 7(a)], and the M-bit counter 188 to be reset, by means of a logic circuit 254, and further cause the contents of the memory quadrant register MQR to be transferred to the memory quadrant counter MQC to again initialize the memory quadrant counter address to the reference quadrant, where the next message is to be written. The resetting of the LIP flip-flop 83 is accomplished so that a new input message can be accepted. The M-bit counter 188 is reset since no M-bits remain in the memory.

At T4, with the IWREC flip-flop 162 reset and with the MERF flip-flop 249 set, the LCD flip-flop 156 is reset by means of a logic circuit 255. With both the IWREC flip-flop 162 and the OVFL flip-flop 239 reset, the MERF flip-flop 249 is reset at T6 by means of a logic circuit 256. With the OVFL flip-flop 239 reset, the SKIP flip-flop 246 is reset at T8 by means of a logic circuit 257.

The overflow message is now fully erased, with no effect on the other messages in the memory and the input module logic (subject to the "recover" condition described above) is ready to accept a new message.

MINERF Operation

As noted previously, a MINERF operation is performed to cause erasure from memory of an entire computer message. The MINERF operation is initiated at the end of operations for inserting half slot data into memory (see section entitled "Inserting Half Slot Data") while a MINER signal is present from the display controller 2 indicating the existence of a parity error. As mentioned previously, a MINER signal is active at the time that an M bit (caused by an ETX character) is in the output data register 78 to be used for loading into memory the segment of the message in which the parity error was detected.

The MINERF operation is functionally similar to the aforedescribed operations for correcting for an overflow condition. In the MINERF operation, however, all data from, but not including, the reference LC bit without an M bit to, and including, the propagated LC bit with an M bit are erased from memory.

In performing the MINERF operation, the M bit (bit b12) in the output data register 78 [FIG. 7(b)] is detected by the M-bit detector 180. Upon detection of the M bit, a logic circuit 258, which receives the MINER signal from the display controller 2 and which is programmed for a MINERF operation, when such an error occurs, causes the MINERF flip-flop 218 to be set. The setting of the MINERF flip-flop 218 at this time indicates that a parity error has been detected in a computer-originated message and that the erasure of the message is now to begin. As with an overflow operation, the set condition of the MINERF flip-flop 218 and the reset condition of the MERF flip-flop 249 cause the contents of the memory quadrant register MQR to be transferred to the memory quadrant counter MQC, at T3, by means of the logic circuit 250. With this transfer, the memory quadrant counter MQC is made to contain the address of the reference quadrant. The set condition of the MINERF flip-flop 218, as before, also causes the RECOVER flip-flop 242 to be set. Also, as with an overflow operation, the above conditions of the MINERF flip-flop 218 and the MERF flip-flop 249 allow the INSCH flip-flop 160 to be set, by means of the logic circuit 222, at the end (T10) of character count 511. When the reference LC bit (the LC bit without an M bit) is found, with both the MINERF flip-flop 218 and the INSCH flip-flop 160 in their set states, the IWREC flip-flop 162 is caused to be set (by means of the logic circuit 227). The recirculation of the reference LC bit is therefore broken. However, with both the IWREC flip-flop 162 and the MINERF flip-flop 218 set, and with the MERF flip-flop 249 reset, the reference LC bit is rewritten by means of the logic circuit 251. The INSCH flip-flop 160 is then reset, as before, at T6 (via the logic circuit 171). At T3 after the IWREC flip-flop 162 has been set, the IWRE flip-flop 168 is set by means of the logic circuit 172. With both the MINERF flip-flop 218 and the IWRE flip-flop 168 in their set states, the MERF flip-flop 249 is set at T6, by means of the logic circuit 252, and erasure proceeds. The next LC bit seen in the memory (by the M-bit and LC-bit detector 225) with the MERF flip-flop 249 set, results in the setting of the LCD flip-flop 156 at T5, by means of the logic circuit 253. Erasure is not halted at this point, however, as occurs in an overflow operation. This LC bit is erased, and with both the LCD flip-flop 156 and the MERF flip-flop 243 in their set states, the IWREC flip-flop 162 and the IWRE flip-flop 168 are both reset at T3 by means of a logic circuit 259. As for the overflow condition, the MINERF flip-flop 218, the LIP flip-flop 83 [FIG. 7(a)] and the M-bit counter 188 are reset (by the logic circuit 254), and the contents of the memory quadrant register MQR is transferred to the memory quadrant counter MQC at this time. The LCD flip-flop 156 and the MERF flip-flop 249 are then reset in the same manner as for an overflow operation. With the resetting of the LCD flip-flop 156 and the MERF flip-flop 249, the MINERF operation is complete with the result that the errant message has been fully erased and the input module logic (subject to the aforementioned "recover" condition) is ready to accept and process a new message.

MINERP Operation

As stated previously, a MINERP operation is executed to perform the erasure of only a single errant segment of a computer-originated message. As with a MINERF operation, the MINERP operation is initiated at the end of operations for inserting a half slot of data into memory (see section entitled "Inserting Half Slot of Data") while a MINER signal is present from the display controller 2 indicating the existence of a parity error. Six possible configurations of data in the memory may exist at the outset of a MINERP operation. These configurations are depicted in FIGS. 12(a)–12(f) and are designated as Cases I–VI. The six configurations shown in FIGS. 12(a)–12(f) may be divided, easily, into two classifications. In Cases I, II and III, only one segment of a message has been loaded and the erasure is to occur from, but not including, the LC bit without the M bit to, and including the LC bit with the M bit. In cases IV, V and VI, more than one segment of a message has been loaded into memory and the erasure will occur from, but not including, the M bit without an LC bit to, and including the LC bit with the M bit. It is to be noted that Cases III and VI [FIGS. 12(c) and 12(f), respectively] each represent a situation in which only a single memory module is present in the system and the message stored therein has "wrapped around" the memory module.

In Cases I, II, and III, the starting point for the erasure of a message segment is signalled if the M-bit counter 188 has a count of 1 therein, corresponding to the only M bit present in the memory. In Case IV, V and VI, the starting point for the erasure of a message segment is signalled if the M-bit counter 188 has a count of 2 therein, corresponding to the two M bits present in the memory. In each of the above two classifications, the erasure is halted by the same indication, that is, the detection of an LC bit with an M bit.

In performing the MINERP operation, the M bit (bit b12) present in the output data register 78 [FIG. 7(b)] is detected by the M-bit detector 180. Upon detection of the M bit by the M-bit detector 180, a logic circuit 260, which receives the MINER signal from the display controller 2 and which is programmed for a MINERP operation, when such an error occurs, causes the MINERP flip-flop 219 to be set. The setting of the MINERP flip-flop 219 indicates that a parity error has been detected with respect to a segment of a computer-originated message and that the erasure of the message segment is now to begin. With the MINERP flip-flop 219 set, and also with the MAD flip-flop 187 set (as a result of an M-bit counting operation) and with a MERP (*M*emory *ER*ase, *P*artial) flip-flop 261 reset, the memory quadrant register MQR is operated to transfer its address to the memory quadrant counter MQC, at T3, via a logic circuit 262. With this transfer, the memory quadrant counter MQC now addresses the reference quadrant. The set condition of the MINERP flip-flop 219 and the reset condition of the MERP flip-flop 261 also allows the INSCH flip-flop 160 to be set, by means of the logic circuit 222, at the end (T10) of character count 511. Since the point at which the erasure is to begin may not be in the reference quadrant (as is true for Cases V and VI), some means must be provided for allowing the memory quadrant counter MQC to "ripple" to the quadrant where erasure is to begin. To this end, the MINERP flip-flop 219, when set, enables the logic circuit 35, FIG. 5, to allow the signal INLOOK to be applied to the memory quadrant counter MQC to allow it to ripple to the quadrant where erasure is to begin.

Figure 12A:
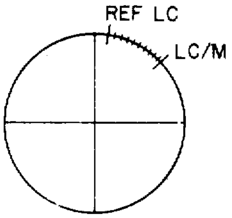
FIGS. 11*c* and 11*d* and FIGS. 12*a* – 12*f* are pictorial aids which are useful in understanding various operations of the error conditions and M-bit erase unit of FIGS. 11*a* and 11*b.
Figure 12B:
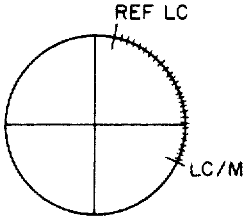
Figure 12C:
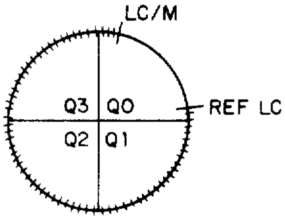
Figure 12D:
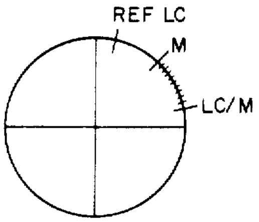
Figure 12E:
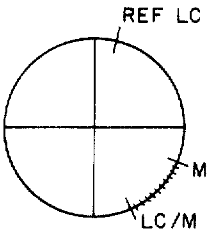
Figure 12F:
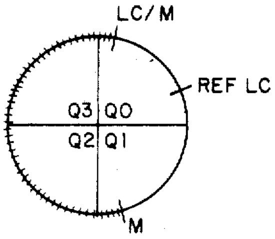

With both the MINERP flip-flop 219 and the INSCH flip-flop 160 set, the detection of an LC bit without an M bit, with the M-bit counter 188 having a count of 1 therein [these conditions corresponding to Cases I–III, FIGS. 12(a)–12(c), respectively], causes the IWREC flip-flop 162 to be set at T4 via a logic circuit 263. The setting of the IWREC flip-flop 162 causes the recirculation of the LC bit to be broken. However, with both the IWREC flip-flop 162 and the MINERP flip-flop 219 set, and with the MERP flip-flop 261 reset, the LC bit is rewritten in memory via the logic circuit 251. In a similar manner as just described, with both the MINERP flip-flop 219 and the INSCH flip-flop 160 set, the detection of an M bit without an LC bit with the M-bit counter 188 having a count of 2 therein [these conditions corresponding to Cases IV-VI, FIGS. 11(d) – 11(f), respectively], causes the IWREC flip-flop 162 to be set at T4 via a logic circuit 264. The setting of the IWREC flip-flop 162 in this instance also causes the recirculation of the M bit to be broken. However, with both the IWREC flip-flop 162 and the MINERP flip-flop 219 set, and with the MERP flip-flop 261 reset, and with the M-bit counter 188 having a count of 2 therein, the M bit is rewritten into memory via a logic circuit 265. An LC bit (a propagated LC bit) is also written into memory, by the logic circuit 251, to restore the memory to its condition (with a propagated LC bit) prior to the errant segment being written. At T6, after the IWREC flip-flop 162 has been set, the INSCH flip-flop 160 is reset, in the same manner as before, by means of the logic circuit 171.

The IWRE flip-flop 168 is set, as usual, on the next T3 after the IWREC flip-flop 162 has been set. With both the IWRE flip-flop 168 and the MINERP flip-flop 219 set, the MERP flip-flop 261 is set at T6 by means of a logic circuit 266, and erasure now proceeds. When the last data character to be erased is reached, that is, the character with an LC bit and an M bit has been detected by the M-bit and LC-bit detector 225, and with the MERP flip-flop 261 set, the LCD flip-flop 156 is set, at T5, by means of a logic circuit 267. Since this M bit will be erased, the detection of the LC bit and the M bit of the last character (by the M-bit and LC-bit detector 225) with the MERP flip-flop 261 set causes the MERA flip-flop 228 to be set at T6 by means of a logic circuit 269. The last character is erased and, with the MERA flip-flop 228 set, the M-bit counter 188 is decremented at T2 (by means of the logic circuit 230). With both the LCD flip-flop 156 and the MERP flip-flop 261 set, the IWREC flip-flop 162 and the IWRE flip-flop 168 are reset at T3 by means of a logic circuit 271. These same conditions of the LCD flip-flop 151 and the MERP flip-flop 258 also cause another transfer of the memory quadrant register MQR to the memory quadrant counter MQC, (by means of logic circuit 271) to return the address of the memory quadrant counter MQC to the reference quadrant. With the MERP flip-flop 261 set and the IWREC flip-flop 162 reset, the LCD flip-flop 156 is reset at T4 by means of the logic circuit 255. The MERA flip-flop 228 is also reset at T4. At T6, with both the IWREC flip-flop 162 and the OVFL flip-flop 239 reset, the MERP flip-flop 261 is reset by means of a logic circuit 268.

The M-bit counter 188 may now have a count of either 0 (in the cases where the first segment was in error) or 1 (in the cases where a segment subsequent to the first segment was in error). The 0-count condition of the M-bit counter 188 indicates that no data of the message being acted upon remains in the memory and that the input module logic should be made ready to accept a new message. To accomplish this, the LIP flip-flop 83, FIG. 7(a), is reset, by means of a logic circuit 272, if the M-bit counter 188 has a count of 0 (MCNTR=0) and the MERA flip-flop 228 is set. These conditions of the M-bit counter 188 and the MERA flip-flop 228, with the LCD flip-flop 156 set, also cause the RECOVER flip-flop 242 to be set, by means of a logic circuit 274, to guard against the same possible printer module hang-up condition discussed hereinbefore. With the M-bit counter 188 having a count of 0, the MINERP flip-flop 219 is reset at the next T1 by means of a logic circuit 275. After a recover condition has been effected, an ALLOW signal will be generated (by the space availability) arrangement 55, FIG. 6) so that a new message may be accepted.

In the abovementioned situation where the M-bit counter 188 has a count of 1 therein, the memory quadrant counter MQC must be allowed to progress from the reference quadrant to that quadrant which contains the remaining M bit and the propagated LC bit, so that the next half slot of data may be correctly loaded into the memory. With both the MERP flip-flop 261 and the MERA flip-flop 228 set, and the M-bit counter 188 having a count of 1 therein, the FINDM flip-flop 232 is caused to be set at T3 by means of the logic circuit 233. The setting of the FINDM flip-flop 232 causes the LOCATE flip-flop 223 to be jammed set whereby the INLOOK condition is enabled to permit the memory quadrant counter MQC to be incremented each time the central system timing advances to a new quadrant. When the remaining M bit (with an LC bit) is located, by the M-bit and LC-bit detector 225, and with the FINDM flip-flop 232 set, the MINERP flip-flop 219 is reset at T5 by means of a logic circuit 276 and, similarly, the FINDM flip-flop 232 is reset by means of the logic circuit 235. The LOCATE flip-flop 223 is reset at the next T1. The input module logic is now ready to load a new half slot of data.

PRINTER MODULES — GENERAL — FIG. 13

Figure 13:
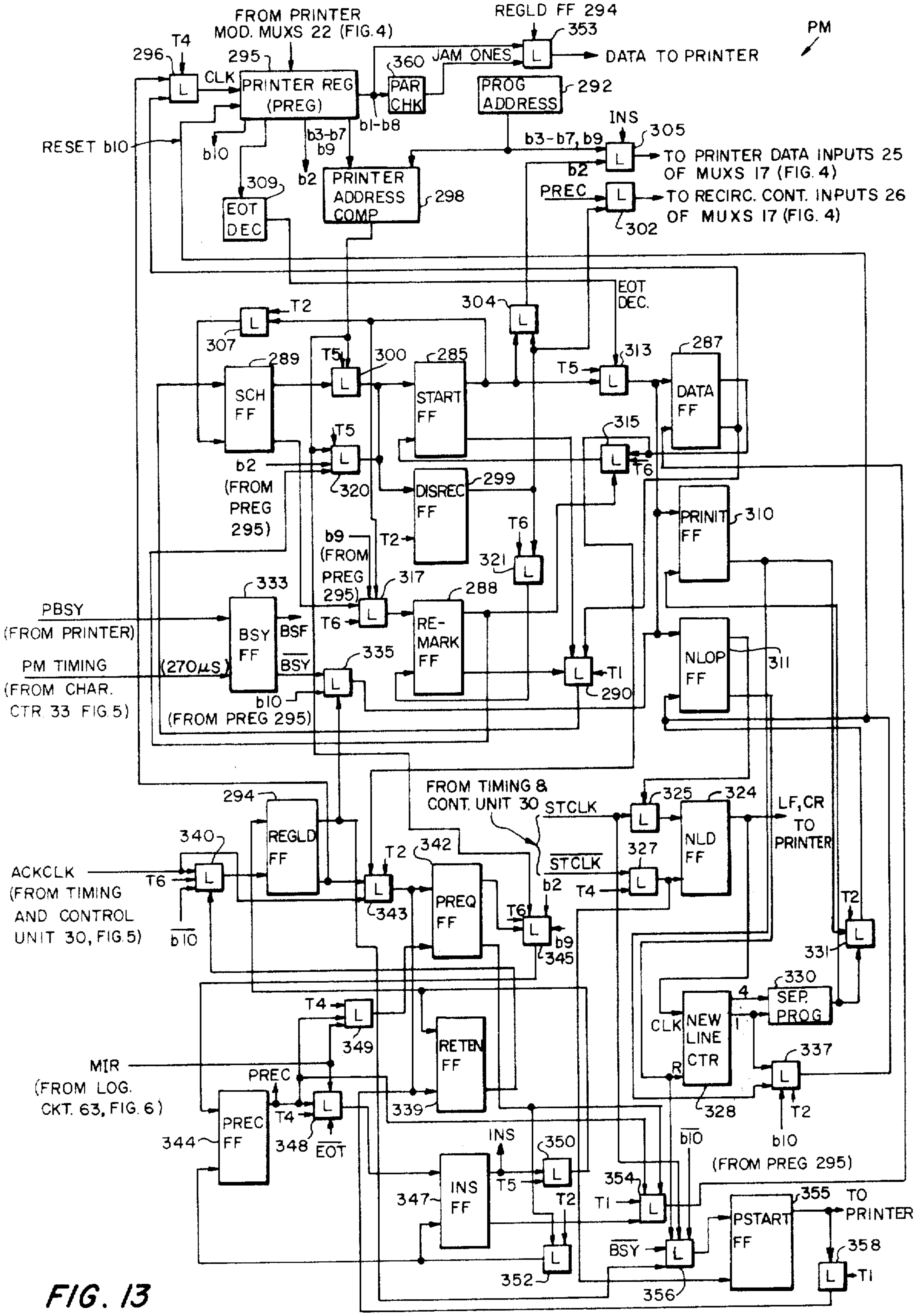
* and FIG. 13 is a block diagram of a printer module employed in accordance with the invention.

Referring now to FIG. 13, there is shown one of the printer modules PM*l*–PM*m* such as provided in the printer controller 5 in accordance with the invention. The printer modules PM*l*–PM*m* control all print operations for the associated printers P*l*–P*m*. In accomplishing this control, all of the printer modules PM*l*–PM*m* use clocking signals produced by the timing and control unit 30 (FIG. 5) but they operate totally independently of each other.

As mentioned previously, each printer module operates to remove, or extract, messages from memory intended for its associated printer. Each time a character is removed from memory by a printer module to be printed, the START character is moved into the vacated character position and used as a cursor character. In this manner, the START character is precessed down the message, freeing memory space for the space availability arrangement 55 (FIG. 6) on a real-time basis. The simple illustration below shows a message in the memory (left) and the result (right) when the first character is removed for printing.

| | |
|---|---|
| START | |
| A | START |
| B | B |
| C | C |
| EOT | EOT |

When the printer module "sees" the EOT character after the START character in memory, the START character is not rewritten with the result that the memory space used by the message has been fully emptied.

At any given time there may be more than one message in the memory addressed to a given printer. To distinguish a message with which a printer module is working from all other messages intended for the same printer, the printer module sets a so-called "Start Mark" (SM) bit (bit *b*2) in the START character of that particular message. This operation will be described in detail hereinafter.

The use of LC bits (reference LC bits) insures that the input module IM of the printer controller 5 loads messages into the memory in a sequential manner. Each printer module prints out its messages in a like manner. This is accomplished by letting a printer module search the memory for the START character of its next message as soon as it removes the EOT character from the memory for the message it has just printed.

The operation of the printer module (PM) shown in FIG. 13 will now be described in greater detail.

START SEARCH

When the printer module (PM) is not busy performing an operation, three flip-flops employed therein, namely, a START flip-flop 285, a DATA flip-flop 287, and a REMARK flip-flop 288 are in their reset states. The reset state of the START flip-flop 285 indicates that a START character has yet to be detected in the memory, and the reset state of the DATA flip-flop 187 indicates that no printing operation (by a printer) is in process. The reset state of the REMARK flip-flop 288 indicates that a Start Mark bit of a START character in memory is not being deleted, an operation which will be more fully apparent hereinafter. With the abovementioned flip-flops in their reset states, a SCH (*SearCH*) flip-flop 289 is caused to be set at T1 by means of a logic circuit 290. The setting of the SCH flip-flop 289 causes an examination of the memory characters to be initiated to locate a START character for the printer associated with the printer module PM. Specifically, a search is made to find a START character having a printer address, represented by bit *b*3–*b*7 (see FIG. 9), which is the same as the address of the printer module and, therefore, its associated printer. The printer module address is achieved by programming a program address circuit 292 to contain the appropriate printer address. Other printer modules are, of course, arranged to have different printer addresses.

With the DATA flip-flop 287 reset, or with a REGLD (*REG*ister *L*oa*D*ed) flip-flop 294 reset, a printer register (PREG) 295 is clocked at each T4, by means of a logic circuit 296, to permit a character from one of the printer module multiplexers 22 (FIG. 4) to be received and stored therein. The printer register 295 has a capacity of one character (of 10 parallel bits). The abovementioned reset state of the REGLD flip-flop 294 indicates that a character is not "frozen" in the printer register 295 to be presented to a printer. When a START character is presented to the printer register 295 and it has a printer address which is the same as that of the program address circuit 292, as determined by a printer address comparator 298, and the SCH flip-flop 289 is set, the aforementioned START flip-flop 285 and a DISREC (*DIS*able *REC*irculation) flip-flop 299 are caused to be set at T5 by means of a logic circuit 300. The setting of the DISREC flip-flop 299 causes a logic circuit 302 to apply a signal to the printer recirculation control input 26 of the input data and printer data multiplexer 17 (FIG. 4) then being addressed by the input module to disable the recirculation of the addressed register therein (from which the START character in the printer register 295 was derived). With both the START flip-flop 285 and the DISREC flip-flop 299 set, a logic circuit 304 operates to produce a Start Mark (SM) bit, represented by bit *b*2, which is then combined in a logic circuit 305 with a START character, comprising bits *b*3–*b*7 and b9, from the program address circuit 292. The above Start Mark bit denotes the particular message then being processed by the printer module PM and distinguishes that message from others in the memory intended for the same printer. The logic circuit 305 then operates to write this START character with the Start Mark bit *b*2 into the memory position from which the START character in the printer register 295 was derived. This is accomplished by applying the START character with the Start Mark bit *b*2 to the printer data input 25 of the input data and printer data multiplexer 17 then being addressed by the system timing (PMEN and MQ signals). Once the START character with the Start Mark bit has been stored in memory, the DISREC flip-flop 299 is unconditionally reset at T2 and, with the START flip-flop 285 set, the SCH flip-flop 289 is reset at T2 by means of a logic circuit 307.

A search may now be made for the EOT character for the above message as will next be described.

EOT Search/REMARK

A printer module may only being to print a message if that message is completely loaded into memory. If this were not the case and an error condition were to cause the input module to erase the START character marked by the printer module, the printer module could hang with part of a bad message having been printed out. To prevent this condition from happening, and before printing is allowed, an EOT character is sought for a message the START character of which has just been marked. If, after a START character of a message has been detected (in the printer register 295) an EOT character is found in memory before an S bit is found (either the marked S bit of the same message or the S bit of another message), this is an indication that the message is completely contained in the memory. If an EOT character is not found in memory before an S bit, this in an indication that the message is not completely contained in memory. In this latter case, the printer module must locate the marked START character and remove the mark. The printer module then resumes searching the memory for a START character. It is possible, therefore, for a printer module to alternately mark and remove the mark of a START character several times before it finally begins, to print a message.

The decoding of an EOT character in the printer module PM of FIG. 13 is accomplished by an EOT decoder 309, which detects the presence of an EOT character in the printer register 295. With the START flip-flop 285 set, as described in the previous section, and with an EOT character decode by the EOT decoder 309 (before detecting an S bit), the aforedescribed DATA flip-flop 287, a PRINIT (*PRIN*ter *I*ni*T*ialize) flip-flop 310, and a NLOP (*N*ew *L*ine *OP*eration) flip-flop 311 are all caused to be set at T5 by means of a logic circuit 313. The setting of the DATA flip-flop 287 indicates that a printing operation may begin, and the setting of the PRINIT flip-flop 310 allows the printer associated with the printer module to be initialized, as will be described hereinafter. The setting of the NLOP flip-flop 311 prepares the printer for a new line operation, as will also be described hereinafter. As the abovementioned flip-flips are set, the REGLD flip-flop 294 is not set and, accordingly, the printer register 295 may still be loaded with characters at T4 (due to operation of the logic circuit 296). The set condition of the DATA flip-flop 287 causes the START flip-flop 285 to be reset at T6 by means of a logic circuit 315.

If, after a START character in the printer register 295 has caused the START flip-flop 285 to be set and the SCH flip-flop 289 to be reset (indicating that the marked message is not complete in the memory), an S bit is noted in the printer register 295 before the EOT character corresponding to the marked START character, the mark accompanying the START character in memory must be removed. At T6, therefore, with the START flip-flop 285 set and with the SCH flip-flop 289 reset, and with the noting of an S bit (bit *b*9) in the printer register 295, the REMARK flip-flop 288 (rather than the DATA flip-flop 287) is caused to be set by means of a logic circuit 317. The setting of the REMARK flip-flop 288, like the setting of the DATA flip-flop 287, causes the resetting of the START flip-flop 285 by means of the logic circuit 315. New characters being loaded into the printer register 295 are continuously examined until the marked START character has been found. The detection of the marked START character is accomplished by the printer address comparator 298 and by noting the Start Mark bit *b*2 in the printer register 295. Once the marked START character has been detected, with the REMARK flip-flop 288 set, the DISREC flip-flop 299 is caused to be set at T5 by means of a logic circuit 320 (in order to break recirculation of the memory). The setting of the DISREC flip-flop 299 at this time will not cause a Start Mark bit

*b*2 to be enabled (by the logic circuits 304 and 305) to be rewritten into the memory (with a START character from the program address circuit 292) since the START flip-flop 285 is not set concurrently with the DISREC flip-flop 299. The logic circuit 305, however, is operated to load a START character (without a Start Mark bit) into memory.

With the DISREC flip-flop 299 set, the REMARK flip-flop 288 is reset at T6 by means of a logic circuit 321. The DISREC flip-flop 299 itself is reset at T2 after the START character (without a Start Mark bit *b*2) is rewritten in memory. The next T1 will result in the SCH flip-flop 289 being set and the printer module will again perform the necessary operations for locating a START character of a message intended for its printer (as described in the previous section).

NEW LINE OPERATIONS

A new line operation may be performed in either of two ways. It may be performed at the beginning of the printing of a message (as a printer initialization) or when an F bit (bit *b*10) is included in a data character.

To perform a new line operation, the NLOP flip-flop 311 must first be set. The NLOP flip-flop 311 may be set in either of two ways. One way has already been discussed in which the decoding of an EOT character (by the EOT decoder 309) with the START flip-flop 285 set causes the NLOP flip-flop 311 to be set via the logic circuit 313. The setting of the NLOP flip-flop 313 in this case, representing a printer initialization operation, together with a STCLK (*ST*art *CL*oc*K*) signal from the timing and control unit 30 (FIG. 5), causes a NLD (*N*ew *L*ine *D*iscrete) flip-flop 324 to be set by means of a logic circuit 325. When set, the NLD flip-flop 324 produces line-feed (LF) and carriage-return (CR) signals which are then used by the printer associated with the printer module to return to the starting point of the next line. When the STCLK signal is no longer present, as indicated in FIG. 13 by the logic designation $\overline{STCLK}$, the NLD flip-flop 324 is reset at T4 by means of a logic circuit 327. The resetting of the NLD flip-flop 324 causes a new line counter 328 to be incremented. The new line counter 328 may be programmed, by means of a separation program circuit 330, to establish a desired number of lines separating messages printed out by the printer, for example, four lines. In this case, the NLD flip-flop 324 is permitted to be set and reset four times, via the logic circuits 325 and 327 (with the NLOP flip-flop 311 set), whereby four successive sets of line-feed and carriage-return signals are caused to be produced by the NLD flip-flop 324 when set and the new line counter 328 is incremented to a count of four. The separation program circuit 330 then operates to reset the PRINIT flip-flop 310 directly and, after the PRINIT flip-flop 310 has been reset, to reset the NLOP flip-flop 311 at T2 by means of a logic circuit 331. The resetting of the NLOP flip-flop 311 prevents further STCLK signals from causing the NLD flip-flop 324 to produce additional line-feed and carriage-return signals.

The second way for setting the NLOP flip-flop 311 occurs whenever a character is "frozen" in the printer register 295 which contains an F bit (bit *b*10). In this case, the F bit, together with the set condition of the REGLD flip-flop 294 (indicating that a character is, in fact, "frozen" in the printer register 295 to be printed out by the printer), and with a $\overline{BSY}$ (not busy) signal from a BSY (*B*u*SY*) flip-flop 333, causes the NLOP flip-flop 311 to be set via a logic circuit 335. The BSY flip-flop 333 is strobed by PM Timing signals (270 μs) produced by the character counter 33, FIG. 5, and produces a $\overline{BSY}$ signal when the printer is not busy with a printing operation and a BSY (busy) signal when it is busy with a printing operation. This latter condition is indicated to the BSY flip-flop 333 by a busy signal, PBSY, from the printer. When the NLOP flip-flop 311 is set, the presence and absence of a STCLK signal from the timing and control unit 30 respectively cause the NLD flip-flop 324 to be set and reset via the logic circuits 325 and 327. When set, the NLD flip-flop 324 produces a set of line-feed and carriage-return signals for use by the printer, for the same purpose as earlier described. As the NLD flip-flop 324 is reset, the new line counter 328 is incremented to a count of 1, this count corresponding to the number of spaces separating successive lines of a printed message. The count of 1 of the new line counter 328, together with the F bit (*b*10) from the printer register 295 and with the PRINIT flip-flop 310 in its reset state (having been reset following printer initialization), causes the NLOP flip-flop 311 to be reset at T2 by means of a logic circuit 337. The latter conditions also cause the logic circuit 337 to reset the F bit (bit *b*10) in the printer register 295 to prevent additional line-feed and carriage-feed signals from being produced by the NLD flip-flop 324 (via the logic circuit 335 and the NLOP flip-flop 311).

ACKCLK

An ACKCLK signal is generated by the timing and control unit 30 (FIG. 5) for the purpose of allowing the printer module to retrieve a new character from the memory if the previous STCLK signal has caused a character to be sent to the printer (as will be later described). If a character present in the printer register 295 has been printed out, which situation is indicated either by the reset condition of a RETEN (*RETEN*tion) flip-flop 339 or by the lack of an F bit ($\overline{b10}$) in the printer register 295, an ACKCLK signal causes the REGLD flip-flop 294 to be reset at T6 by means of a logic circuit 340. At T2, with the REGLD flip-flop 294 reset and with the DATA flip-flop 287 set (in the manner earlier described), and with an ACKCLK signal present, a PREQ (*P*rinter *REQ*uest) flip-flop 342 is caused to be set by means of a logic circuit 343. The setting of the PREQ flip-flop 342 enables the printer module to now perform data retrieval operations as will next be described.

DATA RETRIEVAL

With the REGLD flip-flop 294 reset, due the aforementioned ACKCLK signal, characters from the memory are allowed to be clocked into the printer register 295 at times T4. With the PREQ flip-flop 342 set (also due to the aforementioned ACKCLK signal), an examination may now be made of the characters entering the printer register 295 to locate the marked START character. When the marked START character has been found by the printer address comparator 298 and by noting the Start Mark bit b2, with the PREQ flip-flop 342 set, a PREC (*PREC*ess) flip-flop 344 is caused to be set at T6 by means of a logic circuit 345. Setting of the PREC flip-flop 344 causes a signal PREC to be produced thereby. This signal is applied to the logic circuit 302 which then operates to cause recirculation of the memory register in which the marked START character was present to be broken, with the result that the marked START character is erased from memory.

The next character to be loaded into the printer register 295 would normally be the next character to be printed. Two exceptions to this situation may exist. The first of these is if the character is an EOT character. This would signal the end of the message and would cause the printer module to return to its search operation for finding a START character of the next message. This first exception will be covered later in this section. The second exception occurs if the START character was located in the last character position of the last memory module present in the system and the memory goes "out of range" before the next data character can be found in the first character position of the first memory module. If this condition occurs, operations are suspended until the memory again becomes in range (i.e., the PMENO signal becomes active) and the MIR signal is produced. When the memory is in range, as indicated by the MIR signal (see logic circuit 63, FIG. 6), and with the PREC flip-flop 344 set and with an EOT character not present in the printer register 295, an INS (*INS*ert) flip-flop 347 is caused to be set at T4 by means of a logic circuit 348. When set, the INS flip-flop 347 produces a signal INS which is applied to the logic circuit 305. The logic circuit 305 then operates to recreate the START character (S bit, printer address, and Start Mark bit) and to apply this recreated START character to the memory so that it may be rewritten into the memory in the character position previously occupied by the data character just extracted. With the PREC flip-flop 344 set and with an MIR signal present, the PREQ flip-flop 342 is caused to be reset at T4 by means of a logic circuit 349 inasmuch as a data character is no longer required from the memory. At T5, the set condition of the INS flip-flop 347 causes the REGLD flip-flop 294 to be set by means of a logic circuit 350, thereby causing the logic circuit 296 to discontinue clocking the printer register 295 and "freezing" the data character therein. The logic circuit 350 also causes the RETEN flip-flop 339 to be set at T5. At the next T2, with the PREQ flip-flop 342 reset, the PREC flip-flop 344 and the INS flip-flop 347 are caused to be reset by means of a logic circuit 352. If the F bit (*b*10) is not present in this new data character, a print operation is initiated. Otherwise, the NLOP flip-flop 311 is first caused to be set, to allow a new line operation to be performed, as earlier described, after which a print operation may be performed.

If an EOT character is detected in the printer register 295 immediately after the START character (a possibility noted above), the INS flip-flop 347, the REGLD flip-flop 294 and the RETEN flip-flop 339 are not caused to be set. The START character is, therefore, not reinserted into the memory. With the INS flip-flop 347 and the PREQ flip-flop 342 reset, and with the PREC flip-flop 344 set, the DATA flip-flop 287 is caused to be reset at T1 by means of the logic circuit 354. At the next T1, the SCH flip-flop 289 is set (via the logic circuit 290), so that if the character immediately following the EOT character is another START character for this printer it will not be missed and will, in fact, be marked as described hereinbefore. This insures that messages are printed out sequentially.

PRINT OPERATION, PARITY

With the REGLD flip-flop 294 set, a character "frozen" in the printer register 295 may be applied to the data lines of the printer via a logic circuit 353. Also, with the REGLD flip-flop 294 set, and with no new line operation to be performed, that is, no F bit is in the printer register 295 and the NLOP flip-flop 311 is reset, the first STCLK signal after the BSY flip-flop 333 has been reset ($\overline{BSY}$) causes a PSTART (*P*rinter *START*) flip-flop 355 to be set by means of a logic circuit 356. When set, the PSTART flip-flop 355 produces a signal which is then applied to the printer to instruct the printer to print the character applied to its data lines at that time by the logic circuit 353. With the PSTART flip-flop 355 set, the RETEN flip-flop 339 is caused to be reset at T1 by means of a logic circuit 358. The RETEN flip-flop 339 is reset since, by the time the next ACKCLK signal arrives, the RETEN flip-flop 339 is no longer required to retain the data character now in the printer register 295 and a new character may be sought from the memory. The first T4 after the STCLK ends resets the PSTART flip-flop 355, via the logic circuit 327, thereby ending the print operation for that character.

As the various characters are entered into the printer register 295, they are examined by a parity check circuit 360 to determine whether they satisfy the even ones parity requirements of the system. In the event a character fails to meet parity, the parity check circuit 360 causes the data lines to the printer to be jammed to ones via the logic circuit 353. In this case, the printer prints out a special character (indicating that a memory parity error has occurred) such as a character comprising five parallel horizontal lines (≣).

While there has been shown and described what is considered to be a preferred embodiment of the present invention, it will be obvious to those skilled in the art that various changes and modifications may be made therein without departing from the invention as defined in the appended claims.

What is claimed is:

1. Data processing apparatus comprising:

a plurality of printers for printing data characters in messages received thereby;

source means for producing messages each including address information identifying a printer, data characters to be printed by the printer, and end of transmission information indicating the end of the message;

storage means for storing messages produced by the source means;

input control means for receiving messages produced by the source means and for loading said messages into the storage means in sequence whereby the messages are stored in sequence in the storage means;

cycling means operable to cause the contents of the storage means to be applied cyclically to an output connection;

a plurality of extraction circuit means equal in number to the number of printers, each of the extraction circuit means being coupled to the output connection of the cycling means and to a corresponding one of the printers, each of the extraction circuit means comprising:

first means for producing address information identifying the printer to which the extraction circuit means is coupled;

comparator means operative to compare the address information of each message at the output connection of the cycling means with the address information produced by the first means and to produce an output signal in response to the address information of a message matching the address information produced by the first means;

second means operative in response to each output signal produced by the comparator means to modify the address information providing an aforesaid match and to re-insert the modified address information into the storage means where the address information providing the aforesaid match was stored prior to removal, said modified address information distinguishing the message being processed from any other messages in the storage means intended for the same printer;

third means operative to detect the end of transmission information of each message at the output connection of the cycling means and in response thereto to produce an output signal;

fourth means operative in response to an output signal produced by the comparator means indicating a match between address information in a message and address information produced by the first means and in response to an output signal produced by the third means indicating the detection of end of transmission information of the same message to produce an output signal; and fifth means coupled to the fourth means and to a printer and operative in response to the output signal produced by the fourth means to cause the data characters in the aforesaid message appearing at the output connection of the cycling means to be applied to the printer, whereby said data characters are printed by the printer.

2. Data processing apparatus in accordance with claim 1 wherein each extraction circuit means includes:

sixth means operative to detect the modified address information of a message and in response thereto to produce an output signal;

seventh means operative in response to an output signal produced by the third means indicating the detection of end of transmission information of the same message and in response to an output signal produced by the sixth means to produce an output signal; and eighth means operative in response to the output signal produced by the seventh means to cause the modified address information of the message to be erased from the storage means.

3. Data processing apparatus in accordance with claim 1 wherein:

the source means includes a plurality of video display terminals.

4. Data processing apparatus in accordance with claim 1 wherein:

the source means includes a computer.

5. Data processing apparatus comprising:

a plurality of printers for printing data characters in messages received thereby;

source means for producing messages each including address information identifying a printer, data characters to be printed by the printer, and end of transmission information indicating the end of the message;

storage means for storing messages produced by the source means;

input control means for receiving messages produced by the source means and for loading said messages into the storage means in sequence whereby the messages are stored in sequence in the storage means;

cycling means operable to cause the contents of the storage means to be applied cyclically to an output condition;

a plurality of extraction circuit means equal in number of the number of printers, each of the extraction circuit means being coupled to the output connection of the cycling means and to a corresponding one of the printers, each of the extraction circuit means comprising:

first means for producing address information identifying the printer to which the extraction circuit means is coupled;

comparator means operative to compare the address information of each message at the output connection of the cycling means with the address information produced by the first means and to produce an output signal in response to the address information of a message matching the address information produced by the first means;

second means operative in response to each output signal produced by the comparator means to modify the address information providing an aforesaid match and to re-insert the modified address information into the storage means where the address information providing the aforesaid match was stored prior to removal, said modified address information distinguishing the message being processed from any other messages in the storage means intended for the same printer;

third means operative to detect the end of transmission information of each message at the output connection of the cycling means and in response thereto to produce an output signal;

fourth means operative to detect the modified address information of a message and in response thereto to produce an output signal;

fifth means operative in response to an output signal produced by the third means indicating the detection of the end of transmission information of a message and in response to an output signal produced by the fourth means indicating the detection of the modified address information of the same message to produce an output signal;

sixth means operative in response to the output signal produced by the fifth means to cause the modified address information to be erased from the storage means;

seventh means coupled to the sixth means and to a printer and operative to cause the data characters in the message in which the modified address information was erased in the storage means to be applied to the printer, whereby the data characters are printed by the printer; and eighth means operative when each data character is applied to the printer to be printed thereby to recreate the modified address information of the message and to insert the recreated modified address information back into the storage means in the location in which the data character was stored, whereby recreated modified address information is precessed along the locations of the storage means vacated by the data characters extracted therefrom.

6. Data processing apparatus comprising:

a plurality of printers for printing data characters in messages received thereby;

source means for producing messages each including address information identifying a printer, data characters to be printed by the printer, and end of transmission information indicating the end of the message;

a plurality of recirculation-type storage units for storing messages produced by the source means, each of said storage units having an input and an output;

input control means operative to receive messages produced by the source means and including means for enabling the inputs of the storage units in sequence to sequentially receive and store, via their inputs, the messages produced by the source means;

first control means operative to repetitively and simultaneously clock the contents of the storage units between their outputs and inputs whereby to cause the contents to recirculate between their outputs and their inputs;

second control means operative to enable the outputs of the storage units in sequence and to apply the contents of the storage units so enabled in sequence to an output connection;

a plurality of extraction circuit means equal in number to the number of printers, each of the extraction circuit means being coupled to the output connection of the second control means and to a corresponding one of the printers, each of the extraction circuit means comprising:

first means for producing address information identifying the printer to which the extraction circuit means is coupled;

comparator means operative to compare the address information of each message at the output connection of the second control means with the address information produced by the first means and to produce an output signal in response to the address information of a message matching the address information produced by the first means;

second means operative in response to each output signal produced by the comparator means to modify the address information providing an aforesaid match and to re-insert the modified address information into the storage unit where the address information providing the aforesaid match was stored prior to removal, said modified address information distinguishing the message being processed from any other messages in the storage units intended for the same printer;

third means operative to detect the end of transmission information of each message at the output connection of the second control means and in response thereto to produce an output signal;

fourth means operative in response to an output signal produced by the comparator means indicating a match between address information in a message and address information produced by the first means and in response to an output signal produced by the third means indicating the detection of end of transmission information of the same message to produce an output signal; and fifth means coupled to the fourth means and to a printer and operative in response to the output signal produced by the fourth means to cause the data characters in the aforesaid message appearing at the output connection of the second control means to be applied to the printer, whereby said data characters are printed by the printer.

7. Data processing apparatus in accordance with claim 6 wherein each extraction circuit means includes:

sixth means operative to detect the modified address information of a message and in response thereto to produce an output signal;

seventh means operative in response to an output signal produced by the third means indicating the detection of end of transmission information of the same message and in response to an output signal produced by the sixth means to produce an output signal; and eighth means operative in response to the output signal produced by the seventh means to cause the modified address information of the message to be erased from the storage unit in which it was inserted.

8. Data processing apparatus comprising:

a plurality of printers for printing data characters in messages received thereby;

source means for producing messages each including address information identifying a printer, data characters to be printed by the printer, and end of transmission information indicating the end of the message;

a plurality of recirculation-type storage units for storing messages produced by the source means, each of said storage units having an input and an output;

input control means operative to receive messages produced by the source means and including means for enabling the inputs of the storage units in sequence to sequentially receive and store, via their inputs, the messages produced by the source means;

first control means operative to repetitively and simultaneously clock the contents of the storage units between their outputs and inputs whereby to cause the contents to recirculate between their outputs and their inputs;

second control means operative to enable the outputs of the storage units in sequence and to apply the contents of the storage units so enabled in sequence to an output connection;

a plurality of extraction circuit means equal in number to the number of printers, each of the extraction circuit means being coupled to the output connection of the second control means and to a corresponding one of the printers, each of the extraction circuit means comprising:

first means for producing address information identifying the printer to which the extraction circuit means is coupled;

comparator means operative to compare the address information of each message at the output connection of the second control means with the address information produced by the first means and to produce an output signal in response to the address information of a message matching the address information produced by the first means;

second means operative in response to each output signal produced by the comparator means to modify the address information providing an aforesaid match and to re-insert the modified address information into the storage unit where the address information providing the aforesaid match was stored prior to removal, said modified address information distinguishing the message being processed from any other messages in the storage units intended for the same printer;

third means operative to detect the end of transmission information of each message at the output connection of the second control means and in response thereto to produce an output signal;

fourth means operative to detect the modified address information of a message and in response thereto to produce an output signal;

fifth means operative in response to an output signal produced by the third means indicating the detection of the end of transmission information of a message and in response to an output signal produced by the fourth means indicating the detection of the modified address information of the same message to produce an output signal;

sixth means operative in response to the output signal produced by the fifth means to cause the modified address information to be erased from the storage unit in which it is stored;

seventh means coupled to the sixth means and to a printer and operative to cause the data characters in the message in which the modified address information was erased in the storage unit to be applied to the printer, whereby the data characters are printed by the printer; and eighth means operative after each data character has been applied to the printer to recreate the modified address information of the message and to insert the recreated modified address information back into the storage unit in the location in which the data character was stored, whereby recreated modified address information is precessed along the locations of the storage units vacated by the data characters extracted therefrom.

* * * * *